United States Patent
Muhammad et al.

(10) Patent No.: US 6,650,649 B1
(45) Date of Patent: Nov. 18, 2003

(54) EXTENSION INTERFACE UNITS IN A COMMUNICATION SYSTEM

(75) Inventors: Tariq Muhammad, Gaithersburg, MD (US); Mike S. Lohman, Gaithersburg, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/359,832

(22) Filed: Jul. 23, 1999

Related U.S. Application Data

(60) Provisional application No. 60/094,106, filed on Jul. 24, 1998.

(51) Int. Cl.[7] ............................................. H04L 12/56
(52) U.S. Cl. ..................... 370/402; 370/463; 710/300
(58) Field of Search ................................. 370/364, 465, 370/352, 401, 363, 228, 395.4, 360, 489, 466, 419, 402, 463; 710/300

(56) References Cited

U.S. PATENT DOCUMENTS

| | | | |
|---|---|---|---|
| 6,178,180 B1 * | 1/2001 | Eng et al. .................... | 370/466 |
| 6,272,151 B1 * | 8/2001 | Gupta et al. ................. | 370/489 |
| 6,285,673 B1 * | 9/2001 | Blackburn et al. .......... | 370/360 |

* cited by examiner

*Primary Examiner*—John Pezzlo
(74) *Attorney, Agent, or Firm*—John T. Whelan; Michael Sales

(57) ABSTRACT

An extension system, and related methods, for extending the location of interfaces and expanding the number of interface modules that interface with a communications system. The system includes a communications terminal including a first multi-transport mode bus that carries signals comprising a plurality of transport mode signals, a plurality of interface ports coupled to the first multi-transport mode bus, and a first extension interface mode coupled to one of the plurality of interface ports, wherein the first extension interface module converts the transmission format of the signals to a transmission format of an extension communications link. The system further includes the extension communications link coupled to the first extension interface module, wherein the extension communications link functions as an extension of the first multi-transport mode bus, a second extension interface module coupled to the extension communications link, an extension unit coupled to the second extension interface module containing a second multi-transport mode bus, wherein the second multi-transport mode bus carries the signals, and a plurality of expansion interface ports coupled to the second multi-transport mode bus of the extension unit.

9 Claims, 42 Drawing Sheets

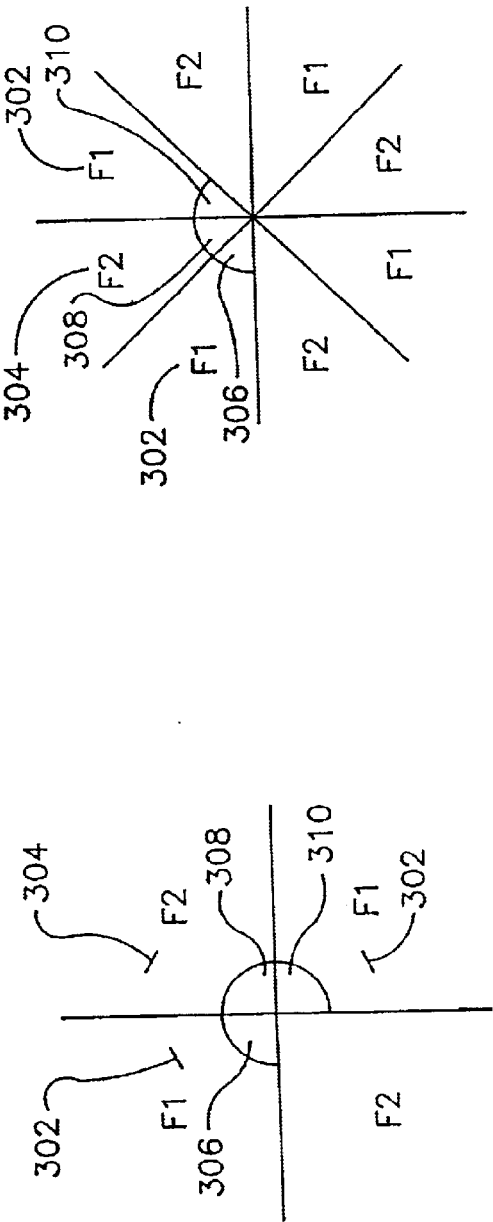

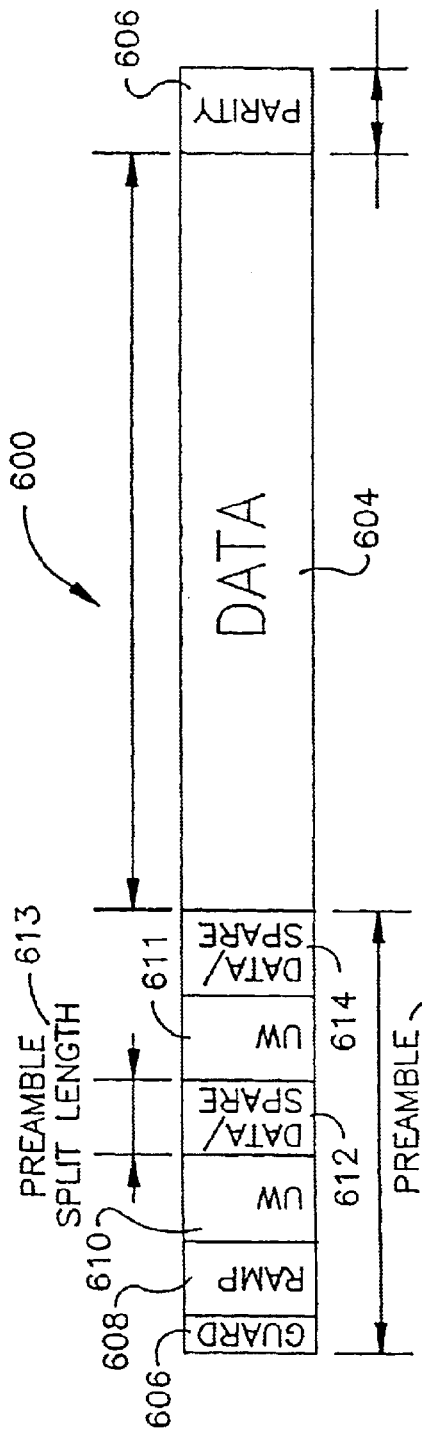
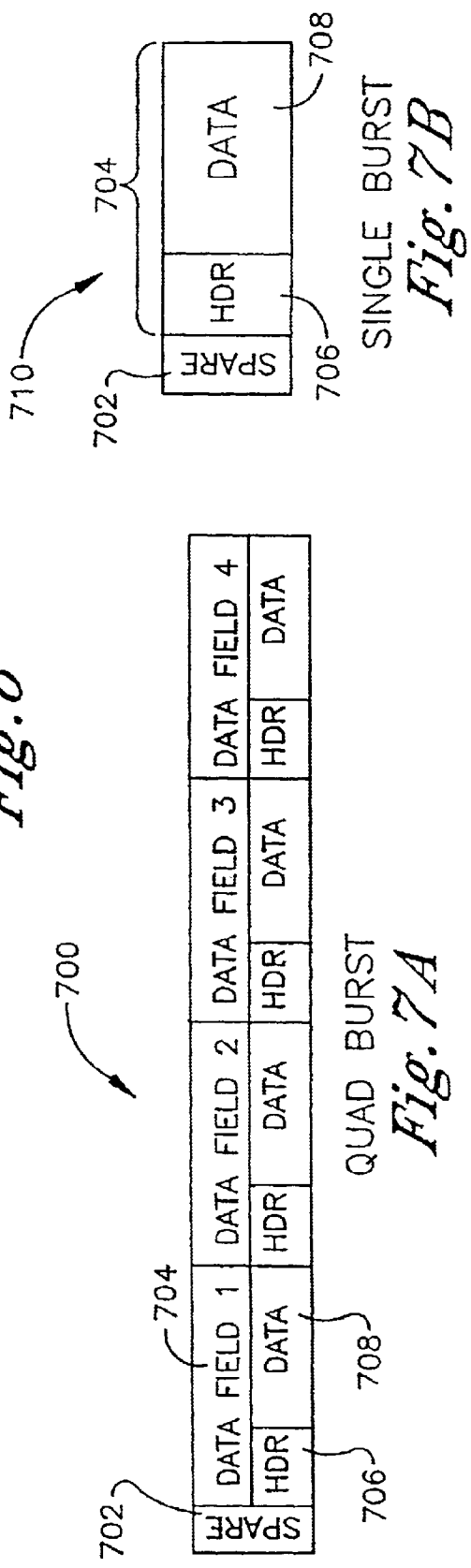

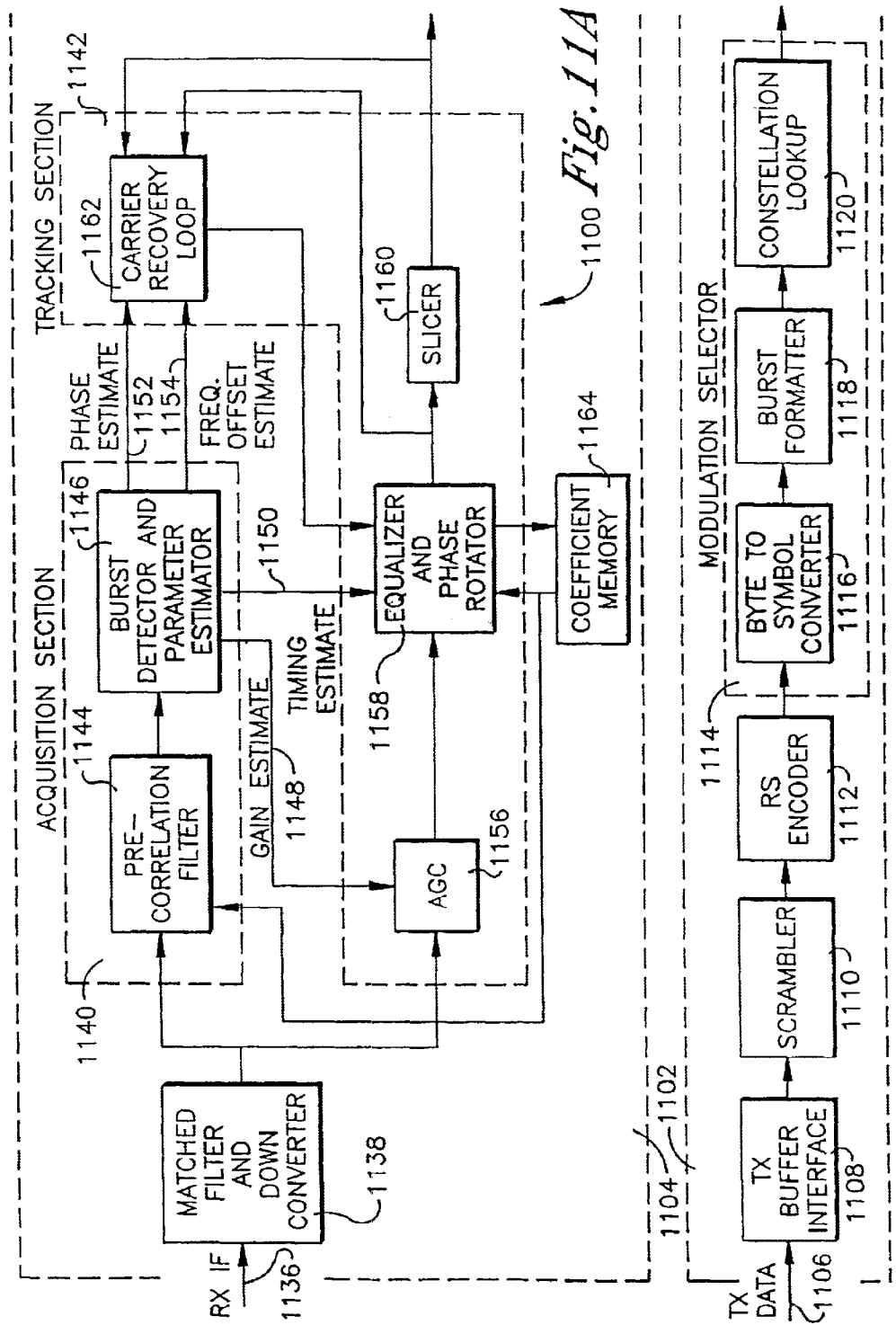

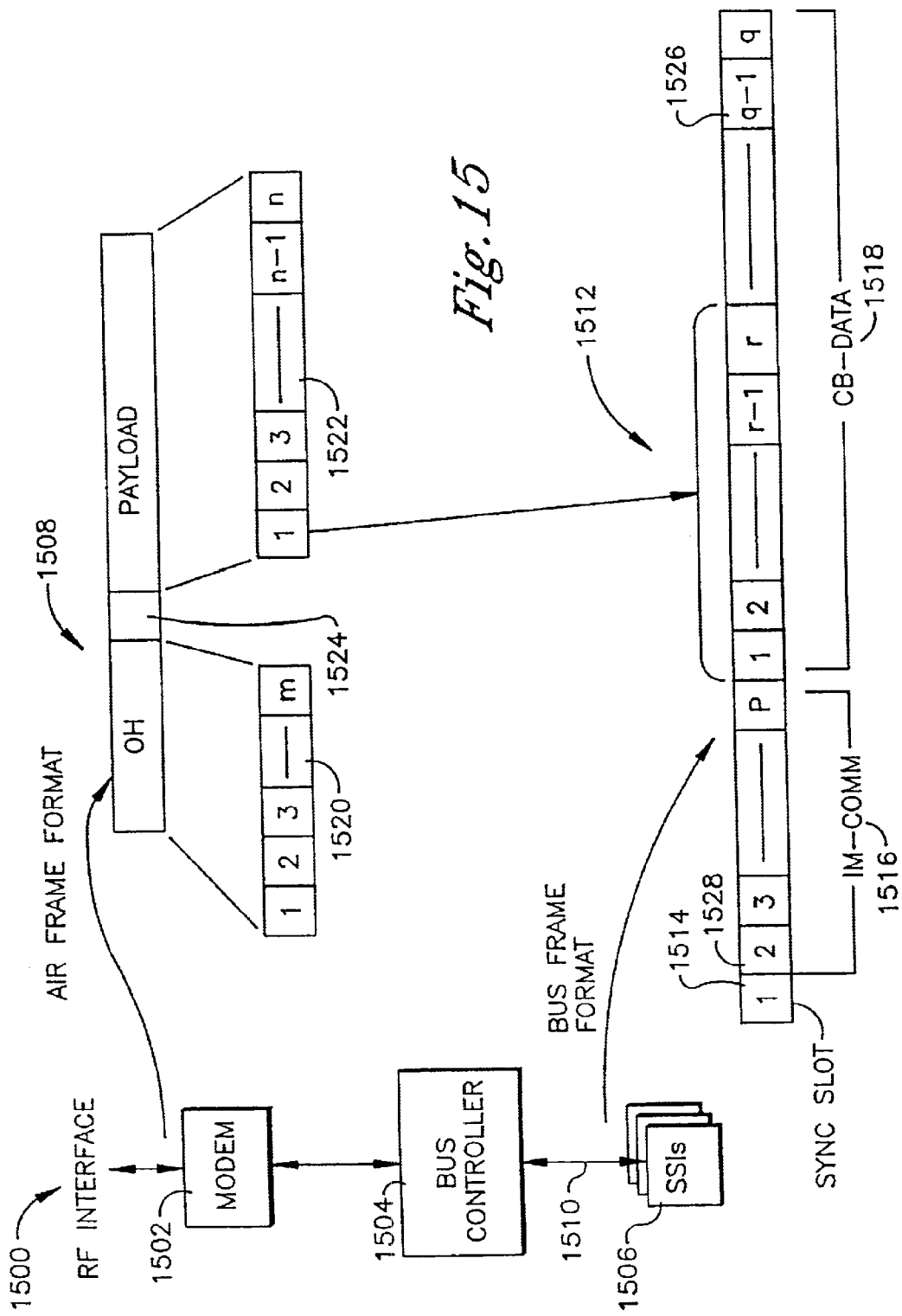

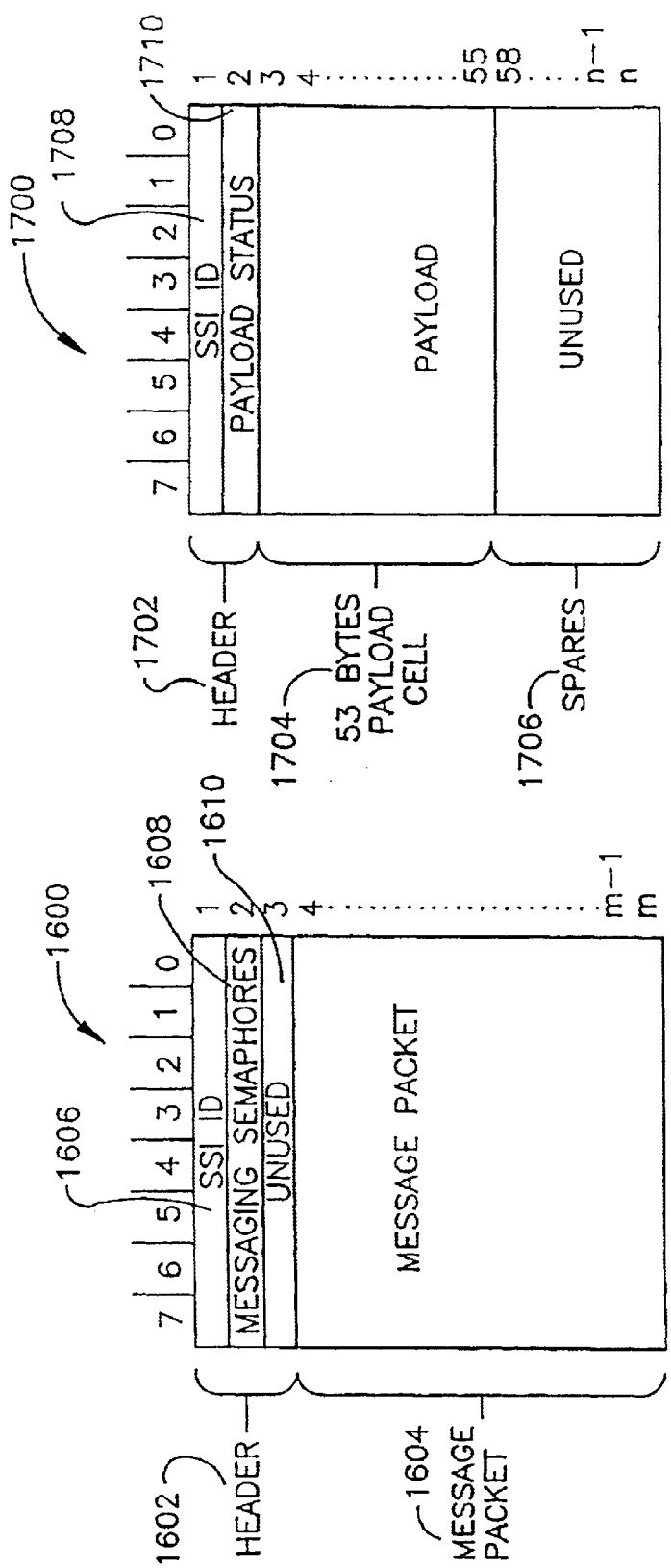

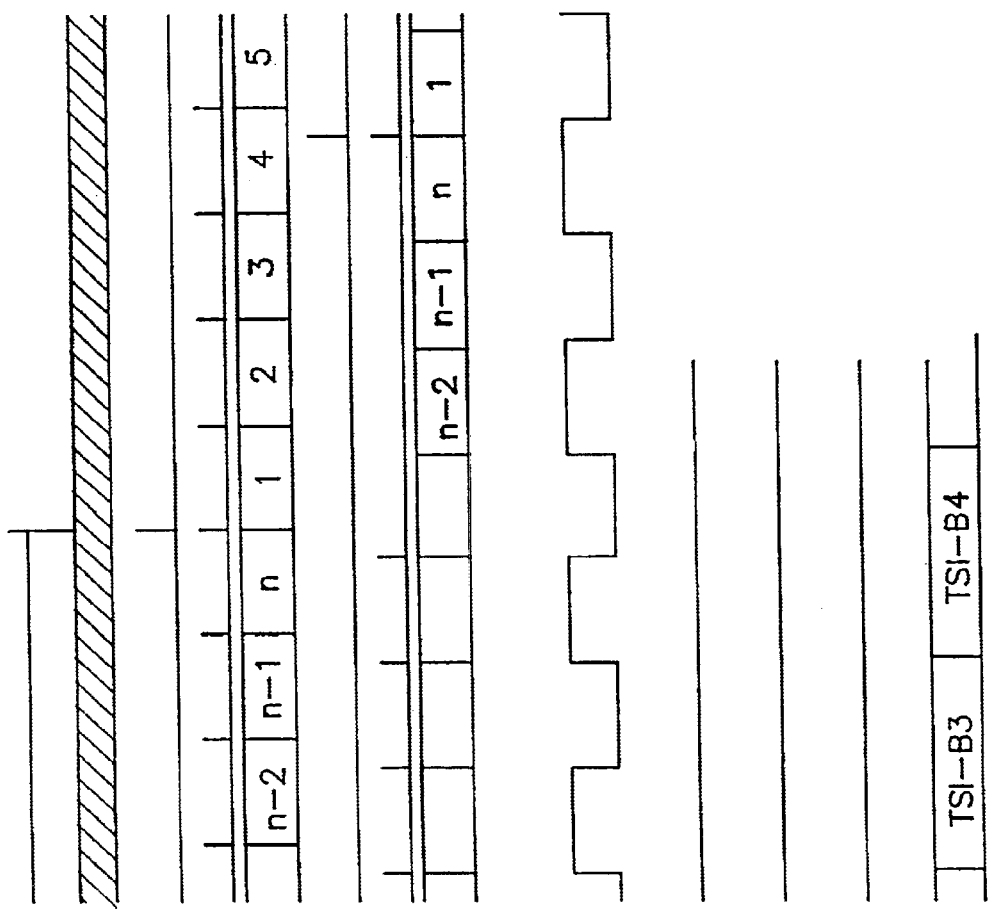

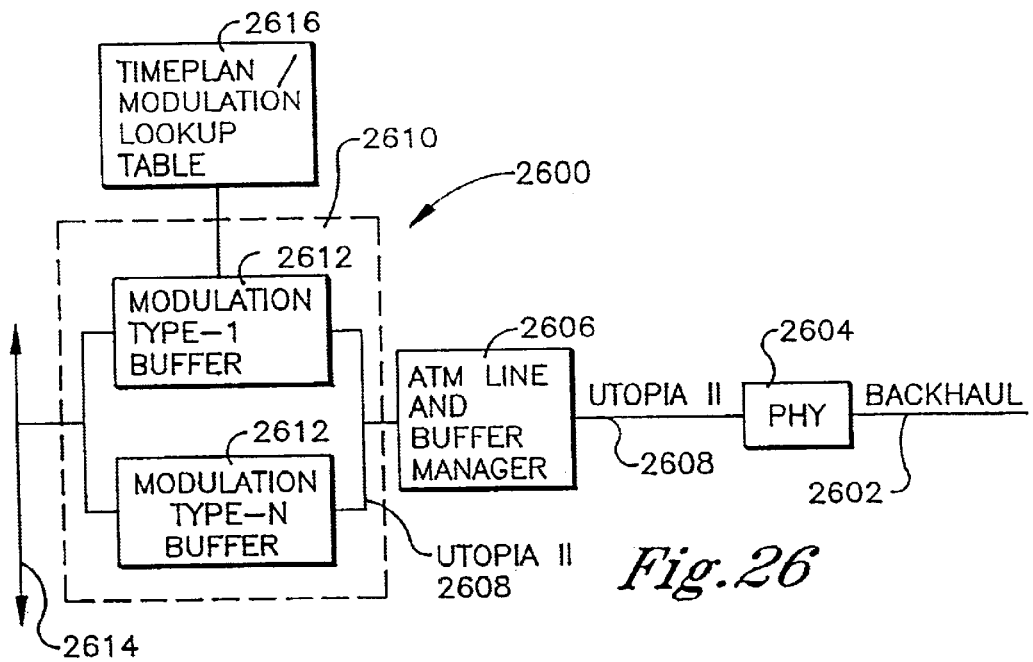
Fig.26
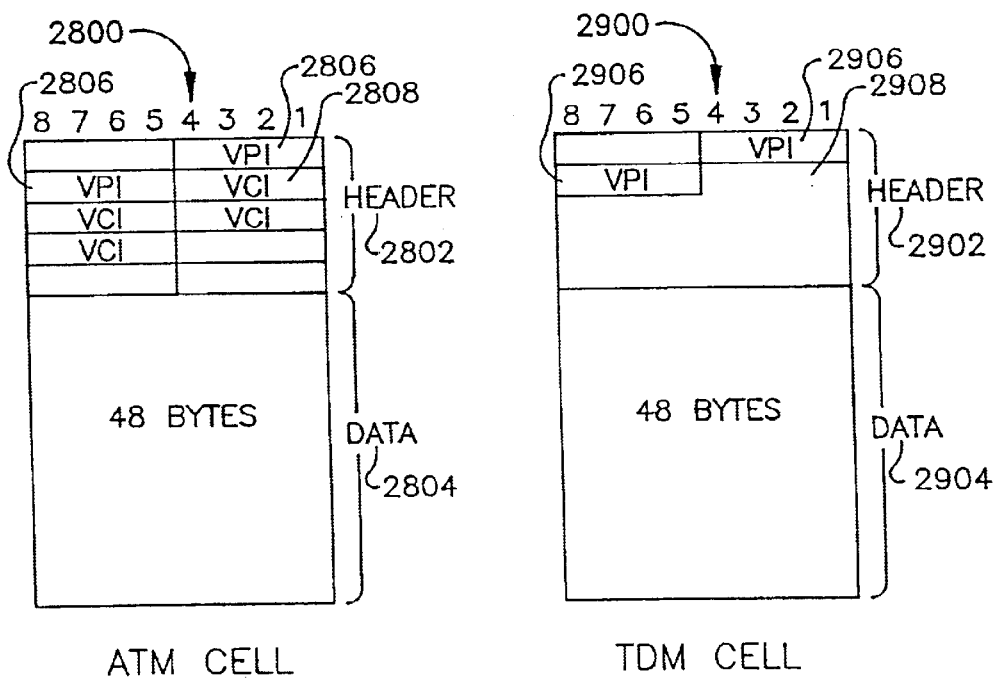
ATM CELL
Fig.28
TDM CELL
Fig.29

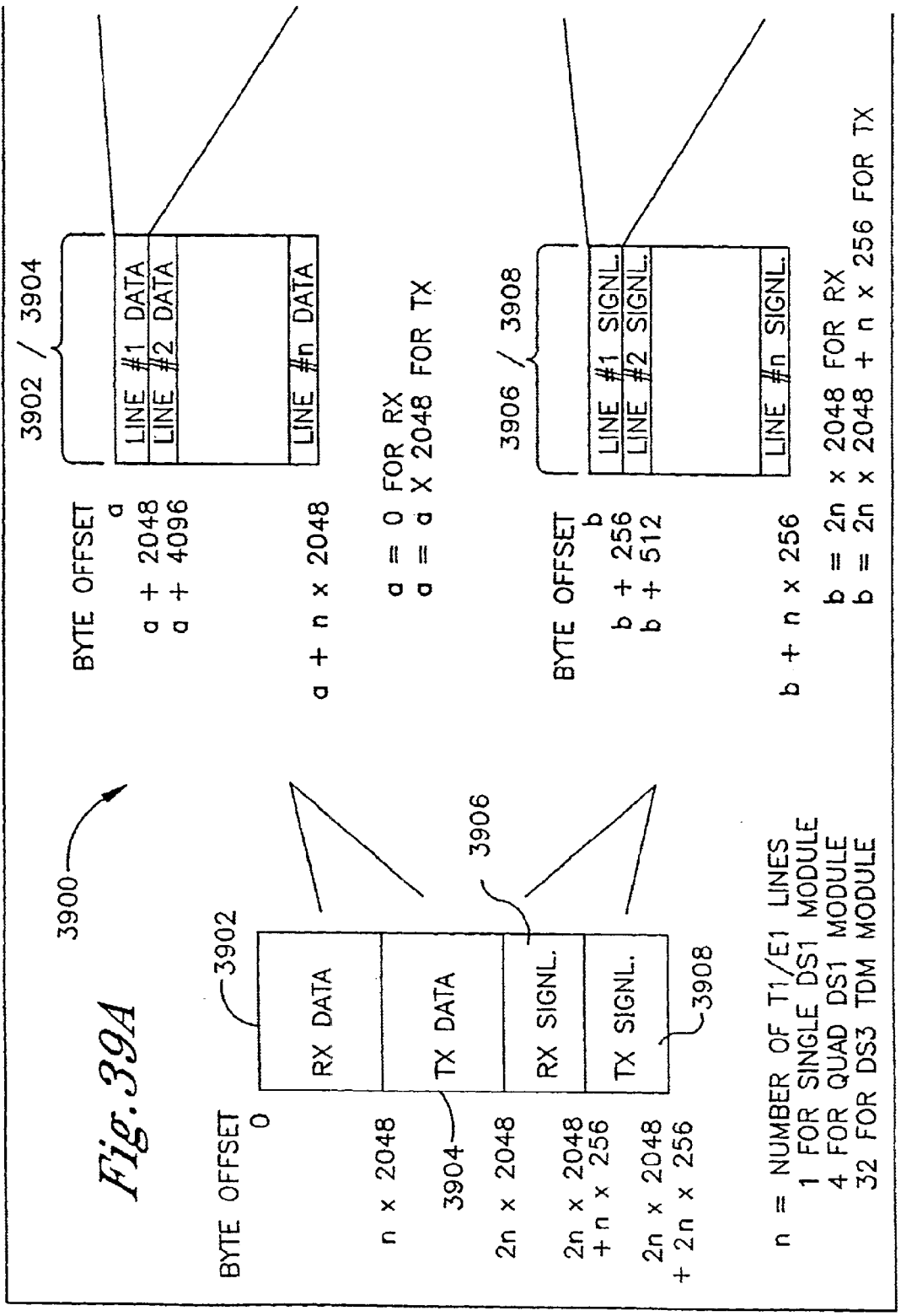

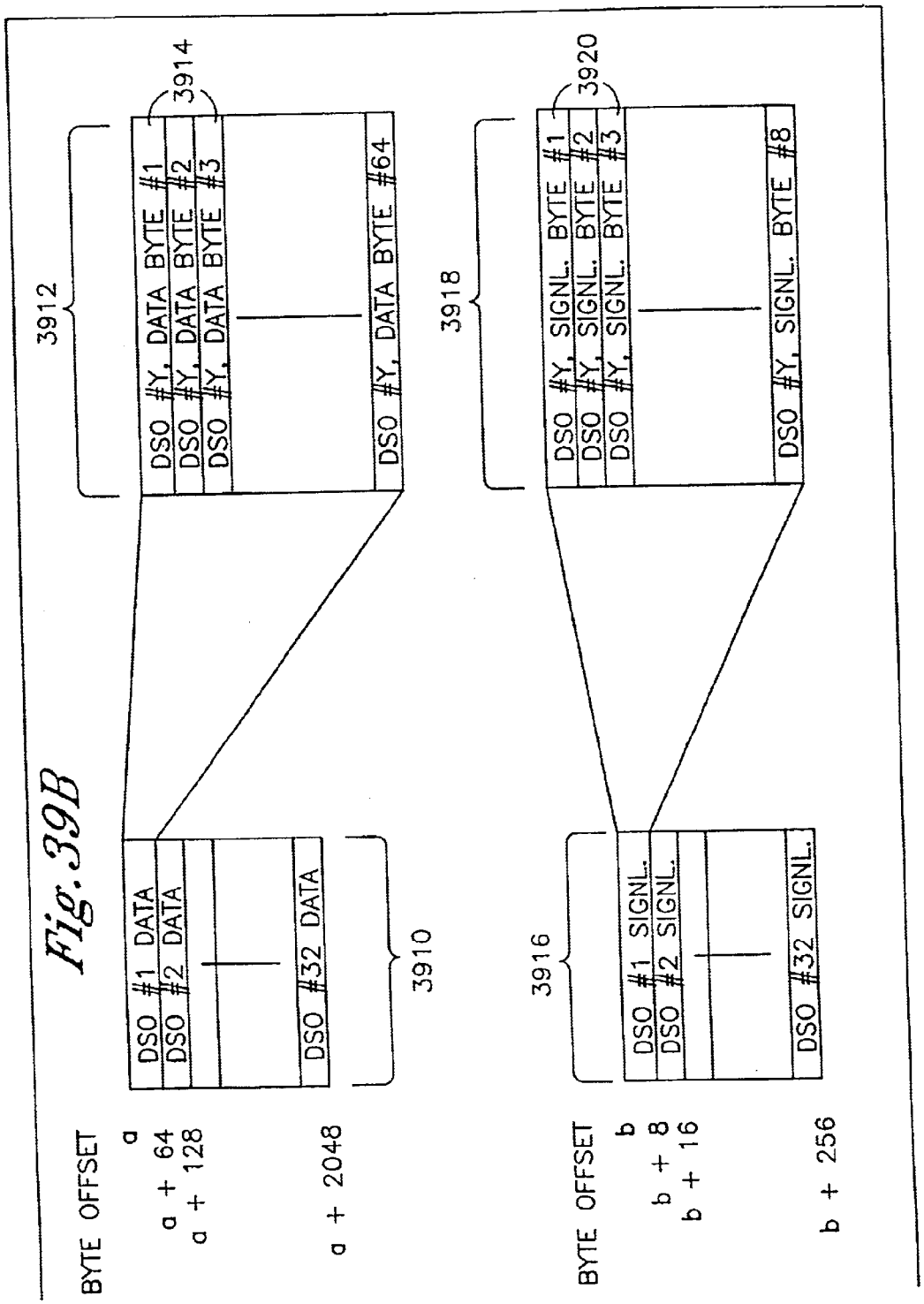

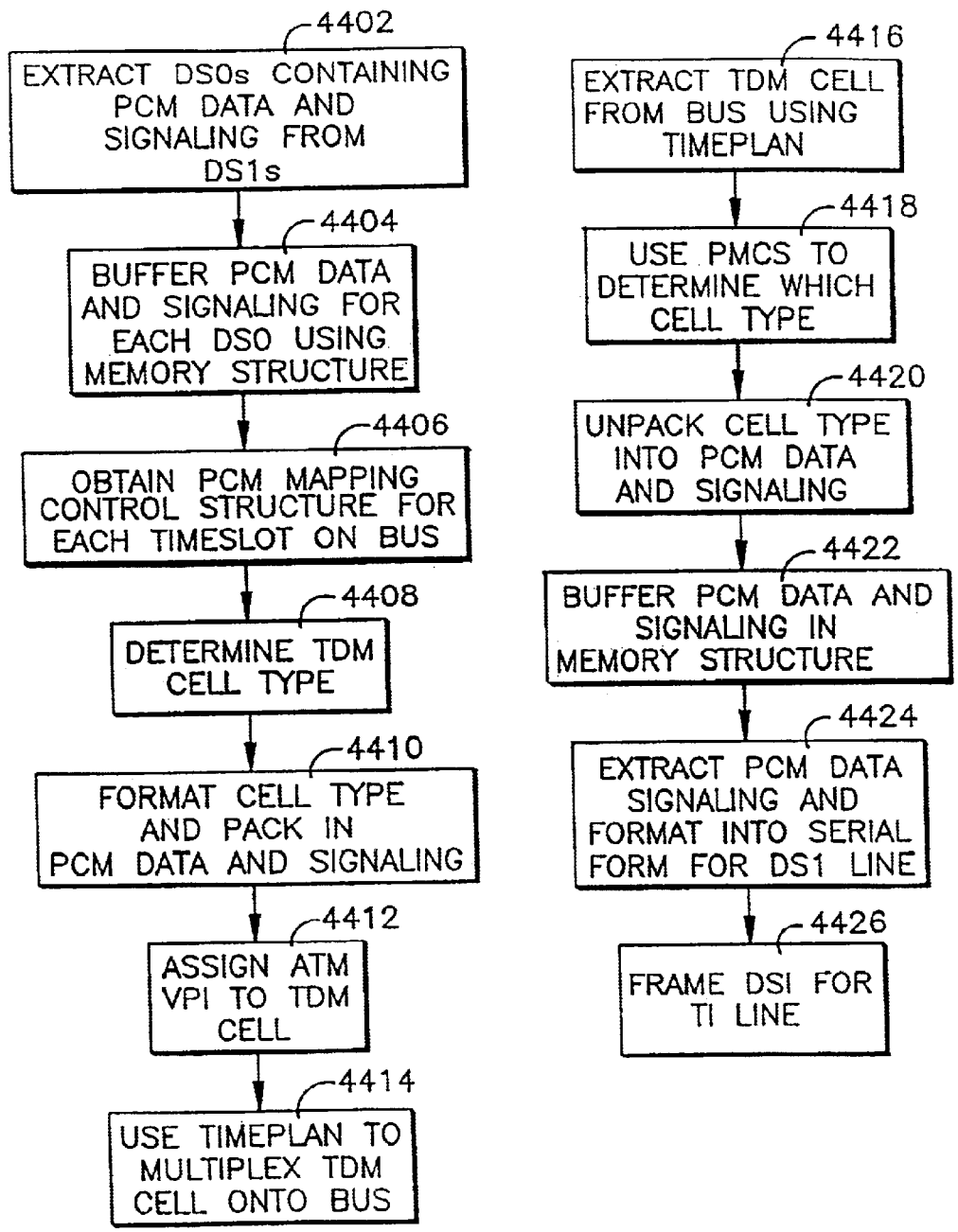
*Fig. 44A*    *Fig. 44B*

EXTENSION INTERFACE UNITS IN A COMMUNICATION SYSTEM

This application claims priority under 35 U.S.C. §119(e) to U.S. Provisional Patent Application Ser. No. 60/094,106, filed Jul., 24, 1998, of Kay, et al., for MULTI-MODE, MULTI-MODULATION POINT TO MULTIPOINT MICROWAVE RADIO SYSTEM, which U.S. Provisional Patent Application is incorporated herein by reference.

This patent document relates to a point to multipoint communications system described in the following patent documents filed concurrently herewith. Related patent applications are:

U.S. patent application Ser. No. 09/360.063, filed Jul. 23, 1999, of Kay, et al.; for MULTI-MODE, MULTI-MODULATION POINT TO MULTIPOINT COMMUNICATIONS;

U.S. patent application Ser. No. 09/360,209, filed Jul. 23, 1999, of Kay, et al.; for MULTI-MODULATION RADIO COMMUNICATIONS;

U.S. patent application Ser. No. 09/359,605, filed Jul. 23, 1999, of Corrigan, et al.; for MULTI-TRANSPORT MODE RADIO COMMUNICATIONS HAVING SYNCHRONOUS AND ASYNCHRONOUS TRANSPORT MODE SUPPORT CAPABILITY;

U.S. patent application Ser. No. 09/359,840, filed Jul. 23, 1999, of Lohman, et al.; for SERVICE SPECIFIC INTERFACING IN POINT TO MULTIPOINT COMMUNICATIONS;

U S. patent application Ser. No. 09/359,838, filed Jul. 23, 1999, of Kay, et al.; for AIR INTERFACE FRAME FORMATTING;

U.S. patent application Ser. No. 09/360,064, filed Jul. 23, 1999, of Kay, et al.; for DEMAND ASSIGNED MULTIPLE ACCESS TECHNIQUES;

U.S. patent application Ser. No. 09/359,839, filed Jul. 23, 1999, of Muhammad, et al.; for MULTI-TRANSPORT MODE BUS COMMUNICATIONS; now abandoned;

U.S. patent application Ser. No. 09/360,241, filed Jul. 23, 1999, of Wendling, et al.; for 1:N REDUNDANCY IN A COMMUNICATIONS SYSTEM; now abandoned; and U.S. patent application Ser. No. 09/360,210, filed Jul. 23, 1999, of Muhammad, et al.; for TDM BUFFERING; now abandoned; all of which are incorporated herein by reference.

BACKGROUND OF THE INVENTION

The present invention relates communications networks, and more particularly to digital communications networks. Even more particularly, the present invention relates to extension interface units of fixed-wireless networks including point to multipoint radio communications sites.

Point to multipoint radio communication networks are generally known in the art. A competitive local exchange carrier uses the point to multipoint system to provide services to subscribers within remote geographic regions from backhaul facilities. Generally, the point to multipoint system comprises a hub site containing several hub terminals, a plurality of remote terminals, and a central office. The central office manages the system and is coupled to each hub terminal of the hub site via a backhaul infrastructure, such as a fiber network built throughout a city. The central office is coupled to several other networks; such as, Public Switched Telephone Networks (PSTN), interexchange carriers (IXC), Internet Service Providers (ISP), and other data delivery systems. Each hub terminal contains a radio system that communicates with the remote terminals at the remote subscribers within the geographic area surrounding the hub terminal. The remote terminals provide an interface to the network for the remote subscribers. Thus, the point to multipoint radio system provides its subscribers with voice, video, and data connections to other networks that are available through the backhaul facilities.

Typically, a remote terminal of a point to multipoint communications system has a limited number of interface ports wherein subscribers may interface. The subscribers interface with a subscriber interface card or interface module. The subscriber interface card interfaces with a bus system that carries traffic between the remote terminal and the subscriber interface card. Commonly, there may be more subscribers that wish to interface with the communications system than there are interface ports. A prior art solution is to provide an extension interface module, such as a bus repeater, which is placed into an interface port of the remote communications terminal.

The prior art extension interface module couples to an extension communications link, such as a ribbon cable, which extends to an extension interface unit having more interface ports. Thus, more interface ports are provided so that more subscribers can interface to the remote terminal. However, disadvantageously, the bus repeater and the ribbon cable can only extend the bus system a few feet. Thus, subscribers at different locations within the subscribers' premises have to provide additional wireline connections to the extension interface unit, since it is typically located in one location with the subscribers' premises.

Furthermore, in a typical prior art point to multipoint system, most of the current backhaul infrastructure supports time division multiplexed (TDM) or "synchronous" modes of transportation. Most voice communications use TDM. A relatively new technology, asynchronous transfer mode (ATM), is gaining popularity as a high speed, packet switched architecture that integrates voice, data, video, and multimedia. ATM outperforms TDM as a high speed data carrier, but the quality of service of voice is less known than TDM. ATM is desirable for large companies, universities, and financial institutions that have a wide variety of communications needs.

The prior art point to multipoint systems support only TDM (synchronous) or only ATM (asynchronous) transport modes. ATM networks are not as widespread as TDM networks since the infrastructure is costly and not fully in place; thus, most subscribers obtain TDM services, while a growing number obtain ATM services through separate networks. And therefore, the bus systems, bus repeaters, ribbon cables, and extension interface units carry either TDM traffic or ATM traffic, depending on how the communications system is configured. Thus, disadvantageously, if a subscriber wishes to obtain both TDM and ATM services, the subscriber must subscribe to different communications networks (TDM and ATM), each having different subscriber interface cards, different bus repeaters, different ribbon cables and different extension interface units.

SUMMARY OF THE INVENTION

The present invention advantageously addresses the needs above as well as other needs by providing an extension module and extension interface unit that extend a bus greater than just a few feet and expand the number of interfaces to the communications system. Advantageously, the extension system supports both TDM traffic and ATM traffic.

In one embodiment, the present invention can be characterized as an extender interface module for expanding a number of interface modules that may interface with a communications system includes a multi-transport mode bus interface that couples to a multi-transport bus and the multi-transport mode bus interface carries signals to and from a communications terminal. The signals comprise a plurality of transport mode signals. Also included are a signal formatter coupled to the multi-transport mode bus interface, a converter coupled to the signal formatter, wherein the converter converts the signals from a multi-transport mode bus format to a format suitable for transmission over an extension communications link, a transceiver coupled to the converter for transmitting the signals over the extension communications link, and the extension communications link coupled to the transceiver.

In another embodiment, the present invention can be characterized as an extension system for expanding the number of interface modules that interface with a communications system. The system includes a communications terminal including a first multi-transport mode bus that carries signals comprising a plurality of transport mode signals, a plurality of interface ports coupled to the first multi-transport mode bus, and a first extension interface mode coupled to one of the plurality of interface ports, wherein the first extension interface module converts the transmission format of the signals to a transmission format of an extension communications link. The system further includes the extension communications link coupled to the first extension interface module, wherein the extension communications link functions as an extension of the first multi-transport mode bus, a second extension interface module coupled to the extension communications link, an extension unit coupled to the second extension interface module containing a second multi-transport mode bus, wherein the second multi-transport mode bus carries the signals, and a plurality of expansion interface ports coupled to the second multi-transport mode bus of the extension unit.

In an additional embodiment, the present invention can be characterized as a method of extending a bus of a communications system through an extension link comprising the steps of: receiving signals from the bus, wherein the signals comprise a plurality of transport mode signals; buffering the signals; converting the signals from a bus transmission format to an extension link transmission format of an extension link; and transmitting the signals having been converted through the extension link, wherein the extension link functions as an extension of the bus.

In a further embodiment, the present invention can be characterized as a method of expanding the number of interfaces and providing an extension interface unit of a communications terminal comprising the steps of: coupling a first interface module to a first bus of the communications terminal, wherein the first bus carries signals comprising a plurality of transport mode signals, wherein the first bus carries the signals from the communications terminal to the first interface module; providing an extension communications link; coupling a first end of the extension communications link to the first interface, wherein the extension communications link carries the signals; coupling a second interface module to a second end of the extension communications link; coupling a second bus of an extension unit to the second interface module, wherein the second bus carries the signals; and coupling a plurality of expansion interface ports to the second bus of the extension unit.

BRIEF DESCRIPTION OF THE DRAWINGS

The above and other aspects, features and advantages of the present invention will be more apparent from the following more particular description thereof, presented in conjunction with the following drawings wherein:

FIGS. 3A and 3B are diagrams of the channelization used in one embodiment of the point to multipoint system shown in FIG. 2 illustrating the frequency reuse with multiple channels that support multiple modulation modes;

FIG. 4 is a diagram of the TDMA superframe air interface format used by the point to multipoint system of FIG. 2;

FIG. 6 is a diagram of a traffic burst that is formatted for use in the air interface frame format of FIG. 5 illustrating a split preamble in accordance with one embodiment of the present invention;

FIGS. 7A and 7B are diagrams of a quad burst and single burst, respectively, that are part of the data section of the traffic burst shown in FIG. 6;

FIG. 15 is a diagram of the multi-transport mode cell bus frame format used by one embodiment of the multi-transport mode cell bus and how it relates the air interface frame format of FIG. 5;

FIG. 16 is a diagram of an intermodule communication cell format transmitted on the multi-transport mode cell bus of FIG. 15;

FIG. 17 is a diagram of a cell bus data cell format transmitted on the multi-transport mode cell bus of FIG. 15;

FIG. 26 is a diagram of an ATM switch used in the ATM OC3c SSI module of FIG. 17, configured for the multi-modulation environment of the point to multipoint system of FIG. 2 illustrating a demand assigned multiple access (DAMA) technique as well as an ATM address filtering technique;

FIG. 28 is a diagram of the structure of a standard ATM cell;

FIG. 29 is a diagram of the structure of a TDM cell formatted to include: a header section containing an ATM specific header and signaling data; and a data section containing pulse-code-modulated data used in accordance with one embodiment of the point to multipoint system;

FIG. 39 is a memory structure for buffering pulse-code-modulated (PCM) data and signaling for use within the TDM-based service specific interface modules described in FIGS. 20, 21, 25A, and 25B in one embodiment of the present invention;

FIGS. 44A and 44B are flowcharts illustrating the TDM buffering as described in FIGS. 39 through 43, done at the TDM-based SSI modules of the point to multipoint system for traffic flow both in and out of the TDM-based service specific interface modules;

Corresponding reference characters indicate corresponding components throughout the several views of the drawings.

DETAILED DESCRIPTION OF THE PREFERRED EMBODIMENTS

The following description of the presently contemplated best mode of practicing the invention is not to be taken in a limiting sense, but is made merely for the purpose of describing the general principles of the invention. The scope of the invention should be determined with reference to the claims.

Figure 1:
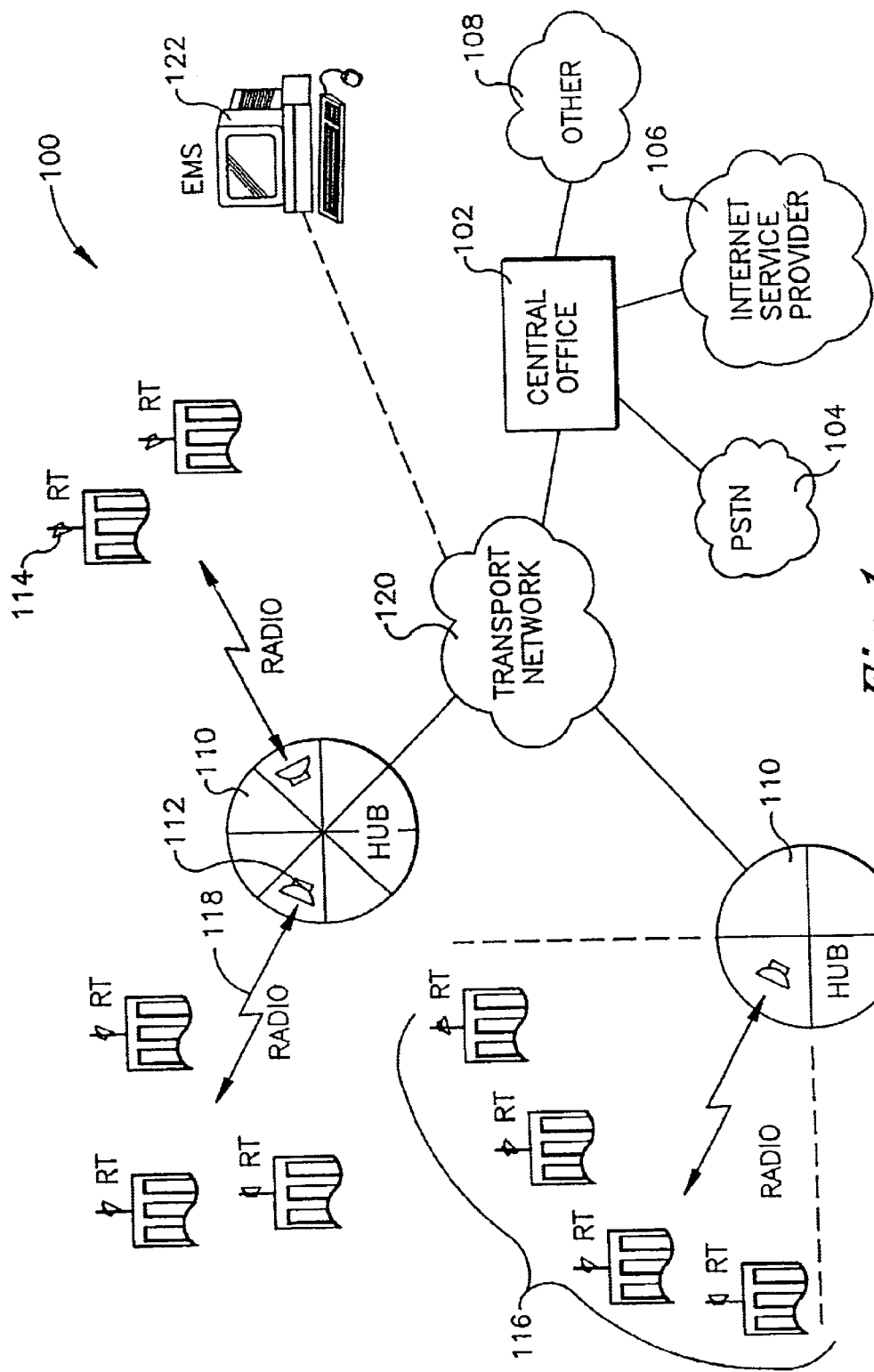
FIG. 1 is diagram of a point to multipoint microwave radio system architecture in accordance with one embodiment of the present invention.

Referring first to FIG. 1, a diagram of a multi-transport mode, multi-modulation point to multipoint microwave radio system (hereinafter referred to as the point to multipoint system) architecture in accordance with one embodiment of the present invention is shown. The point to multipoint system 100 includes a central office 102, a public switched telephone network (PSTN) 104, an Internet service provider 106, and other networks 108. The point to multipoint system 100 also includes hub sites 110 each having multi-mode hub terminals 112 (hereinafter referred to as hub terminals) and multiple multi-mode remote terminals 114 (hereinafter referred to as remote terminals) associated therewith. The multiple remote terminals 114 are located within multiple sectors 116 ("pie slices"). The hub terminals 112 are coupled to the multiple remote terminals 114 via multiple communications links 118. The point to multipoint system 100 further includes a transport network 120, and an element management system (EMS) 122.

The public switched telephone network 104, the Internet service provider 106, the transport network 120 (also referred to as the backhaul), and the other networks 108 are coupled to the central office 102. The transport network 120 couples the central office 102 to the hub sites 110 and to the element management system 122. Each hub terminal located at a hub site 110 communicates with respective remote terminals 114 in a sector by a communications link 118.

Throughout the specification, terminology is used to describe a particular device or aspect of the point to multipoint communications system. When using the phrase "multi-modulation (device)", the capability of the device to use multiple modulations is referred to. When using the phrase "multi-transport mode (device)", the capability of the device to support multiple transport mode signals, such as synchronous signals (e.g. TDM signals) and asynchronous signals (e.g. ATM signals) is referred to. When using the phrase "multi-mode (device)", both multi-modulation and multi-transport mode features are being referred to. Furthermore, the terminology of signals is used to generically describe the different types of traffic transported through the point to multipoint system.

In accordance with this embodiment of the present invention, a competitive local exchange carrier (CLEC) uses the point to multipoint system 100 to provide a variety of services to subscribers who interface with the point to multipoint system at the remote terminals 114. The central office 102 provides the voice and data switches, as well as multiplexing equipment, for services to and from the point to multipoint system 100 while the element management system 122 (hereinafter referred to as the EMS) manages the point to multipoint system, controlling the switches in the central office 102 and the various elements at the hub sites 110 and the remote terminals 114. Thus, the central office 102 couples to the services provided to the subscribers including public switched telephone services 104, Internet services, and other networks 108, such as other exchange carriers or data delivery systems. Thus, the point to multipoint system 100 provides multimedia services including data, voice, and video to the subscribers at the remote terminals 114. The transport network 120 distributes the information between the central office 102 and each hub terminal 112 at the hub site 110.

Figure 2:
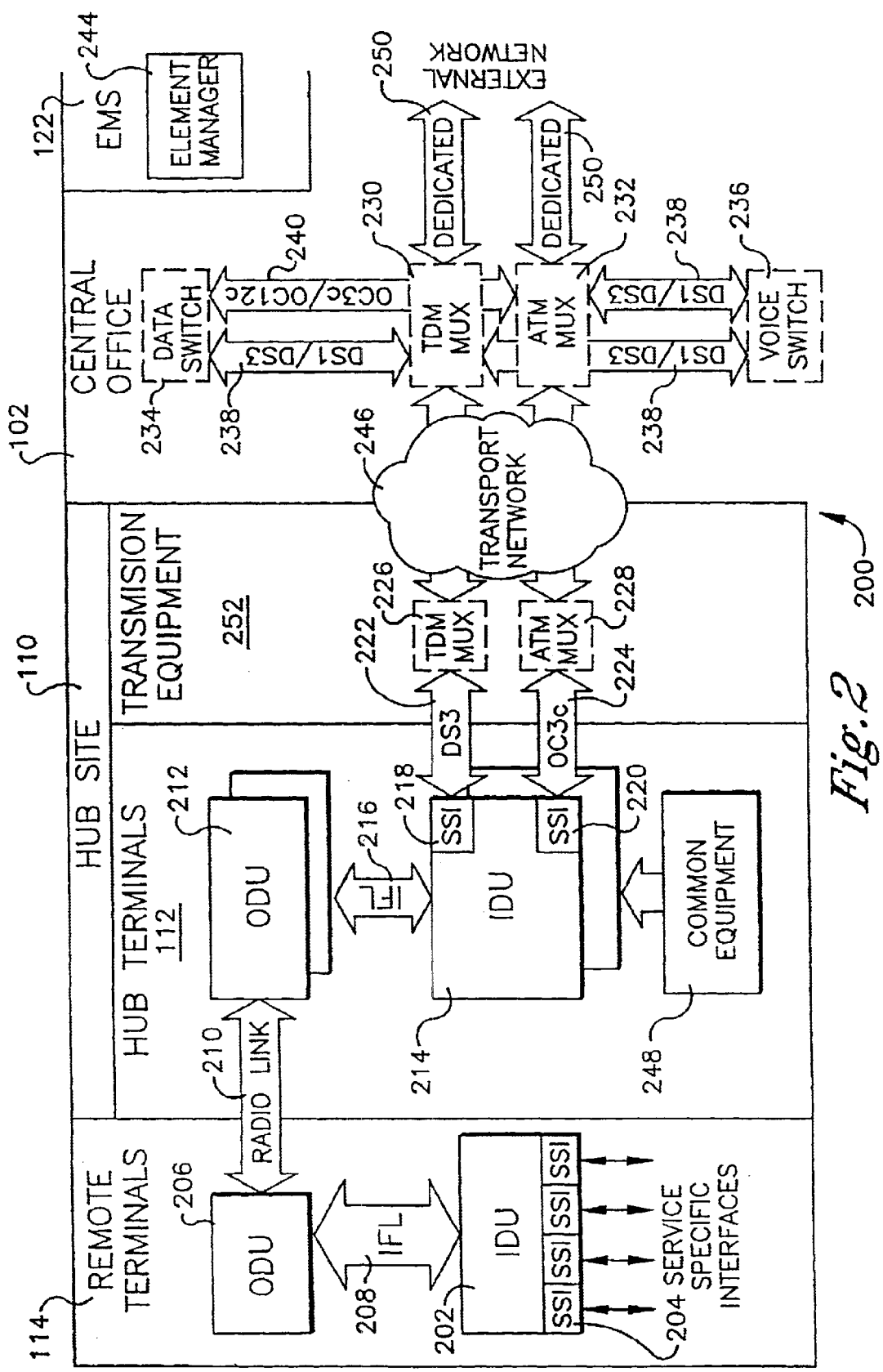
FIG. 2 is block diagram of network elements of the embodiment of the point to multipoint microwave radio system shown in FIG. 1.

The point to multipoint hub site 110 comprises one or more hub terminals 112 for each sector 116 depending on multiple channels and location of the subscriber premises containing the remote terminals 114 (described further in FIG. 2). Each hub terminal supports one subchannel of the channel. Each subchannel is a subset of the total freqeuncy bandwidth or channel bandwidth. For simplicity of illustration, only one hub terminal 112 (also referenced to as a sector radio) is shown per sector 116 in FIG. 1. Each hub terminal 112 is a sector radio used to communicate with the remote terminals 114 within its particular sector 116. Each hub terminal 112 (sector radio) communicates via the communications link 118 with the remote terminals 114, which are also sector radios. The subscribers are able to connect to the remote terminal 114 through a subscriber interface or service specific interface module (hereinafter referred to as an SSI module). T1 or E1 lines, as well as other communications lines further described below, extend from the SSI modules to the subscribers' equipment. T1 and E1 lines are well known in the art of telecommunications and thus, no further explanation is made herein.

The point to multipoint system 100 of the embodiment shown advantageously transmits over the communications link 118 in a time division multiple access/time division multiple access fashion (TDMA/TDMA). This means that in the downlink direction (from the hub terminal 112 to the remote terminal 114), the radio interface is a time division multiple access link, and that in the uplink direction (from the remote terminal 114 to the hub terminal 112), the radio interface is a time division multiple access link. This is a departure from prior art point to multipoint systems that transmit in a time division multiplexed (TDM) manner or that transmit continuously in the downlink direction. Use of TDMA in the downlink (also referred to as discontinuous transmission) facilitates the deployment of switched beam antennas (which may be sectored antennas) at the hub terminals. Switched beam antennas reduce interference and increase the transmission range as described in more detail with reference to FIGS. 3A, 3B and 14.

Alternatively, the point to multipoint system 100 may use a continuous transmission in the downlink; however, disadvantageously, switched beam antennas could not be used as are ideally used in the preferred embodiment.

In addition to operating in a TDMA fashion in the downlink, the point to multipoint system of the present embodiment is configured to carry signals using multiple transport modes. Specifically, the point to multipoint system of the present embodiment is able to interface with asynchronous signals, i.e. signals transmitted asynchronously, such as asynchronous transfer mode (ATM) as well as synchronous signals, i.e. signals transmitted synchronously, such as time division multiplexed (TDM). Asynchronous signals are sent without regard to a specific time and are routed based upon header information, while synchronous signals are sent according to specific time and are routed based upon the time received. Prior art point to multipoint systems are either all synchronous (e.g. TDM) or all asynchronous (e.g. ATM), and thus, two redundant sets of infrastructure are required in accordance with the prior art when both TDM and ATM are to be employed. It is particularly advantageous to have a system that services both transport modes because not only can a subscriber now take advantage of well established TDM-based voice services, but can also utilize high speed data and multimedia ATM services. Advantageously, these transport modes can both be employed using a single infrastructure making up the point to multipoint system 100. The details of how the point to multipoint system is able to carry both ATM-based and TDM-based communication are discussed further below.

The hub terminals 112 (which are sector radios) and the remote terminals 114 (which are also sector radios) of the point to multipoint system of the present embodiment also, advantageously contain multi-modulation modems creating an air frame format capable of transmitting using multiple modulation modes on a burst-by-burst basis. Thus, a single hub terminal 112 may transmit one burst using one modulation mode and the next burst using another modulation mode. This enables the hub terminal 112 to transmit to all of the remote terminals 114 in its particular sector 116, regardless of what modulation mode is employed by each of the remote terminals 114 or which region it is in.

In prior art point to multipoint systems, n radios (hub terminals 112) are needed for n modulation modes within a sector 116, whereby each of the n radios transmits using a different modulation mode. And, the use of multiple modulation modes within a given sector is an exception to general practice. To the contrary, higher order modulation modes can be used only when channel conditions are of high quality. So, these higher order modulation modes are typically used to effect communications with remote terminals 114 that are relatively close to the hub terminal 112 on the other hand, when the remote terminal 114 is in a region farther away, a more robust modulation mode is needed to reduce the bit error rate. And, two or more regions may be defined within each sector 116 with remote terminals 114 in each region employing the highest order modulation mode (most bits/second/Hz) available with sufficiently a low bit error rate. As a result, prior art point to multipoint systems require not only multiple hub terminals 112 per sector 116 for multiple transport modes, but, further require multiple hub terminals 112 Per sector 116 in order to support multiple modulation modes. Thus, for example, six hub terminals 112 per sector 116 may be required to support two transport modes and three modulation modes per sector (not withstanding redundancy considerations, which would double the number of hub terminals if, for example, a 1:1 redundancy system is used). The various components of the point to multipoint system of the present embodiment are configured to handle the multi-transport mode and multi-modulation mode capabilities and are described throughout the specification.

Thus, the hub terminals 112 and the remote terminals 114 are capable of transmitting and receiving signals using both asynchronous (ATM) and synchronous (TDM) transport modes. Furthermore, the hub terminals 112 and remote terminals 14 can modulate and demodulate these signals using multiple modulation modes, such as quadrature phase shift keying (QPSK), 16-quadrature amplitude modulation (16-QAM), and 64-quadrature amplitude modulation (64-QAM), on a burst-by-burst basis within the TDMA/TDMA air interface frame format. The system is not limited to these modulations and could be configured for BPSK, 32-QAM, 128-QAM, and 256-QAM, for example.

Typically, the point to multipoint system operates within a city or a business park of a metropolitan area, or other defined area. In such an area, there is a concentration of potential subscribers. A transport network 120, such as a high speed Synchronous Optical Network (SONET) ring, is spread throughout the defined area. The SONET ring is well known in the art. The hub sites 110 are also spread throughout the defined area and connect to the transport network 120. The central office 102 switches the services to be provided to the hub terminals 112 at the hub sites 110 via the SONET ring. Each hub terminal 112 has an indoor unit (also referred to as a channel processing unit) located within a hub site building that houses the hub site 110 and couples to the transport network 120. Each hub terminal 112 also has an outdoor unit (also referred to as a transceiver unit), typically located on the roof top of the hub site building. The outdoor unit of the hub terminal 112 communicates with a corresponding outdoor unit of a remote terminal 114 typically located on the roof top of the subscriber's premises. The outdoor unit of the remote terminal 112 communicates with an indoor unit of the remote terminal 114 within the subscriber's premises. The subscribers interface to the point to multipoint system through one of a plurality of service specific interface modules (SSI modules) installed into the indoor unit of the remote terminal 114.

The communications link 118 between each hub terminal 112 and its respective remote terminals 114 is a line of sight microwave radio communications link, so the communications link 118 is limited by distance depending on the modulation mode selected by the hub terminal 112. For example, a signal modulated with QPSK will typically travel only about 3 km with an acceptable bit error rate (BER), i.e. about $10^{-12}$ or less. A signal modulated with 64-QAM will travel even less distance (i.e., 1000 m) with the acceptable bit error rate. Furthermore, the microwave radio signals are limited by the transmit power output of the outdoor units or transceiver units. Although the communications link 118 in the present embodiment is a microwave radio signal, the present embodiment should be understood, in other variations as not limited to microwave signals, but rather potentially comprising other mediums (or combinations of mediums) such as those known in the art, such as wireline, cable, and power line communications links. Furthermore, the point to multipoint system 100 is not limited to terrestrial applications. The point to multipoint system may include hub sites and remote terminals that are earth stations having satellite link between them. Thus, the concept of multi-transport mode, multi-modulation communication extends to all forms of point to multipoint communication.

Referring to FIG. 2, a block diagram of the point to multipoint microwave radio system 200 in accordance with the present embodiment of FIG. 1 is shown. Each remote terminal 114 (multi-mode remote terminal) in the point to multipoint system 200 includes: an indoor unit 202, service specific interface modules (hereinafter referred to as SSI modules) 204, outdoor unit 206, intrafacility link 208, and a communications link 210. The hub terminals 112 (multi-mode hub terminals) of the hub site 110 include: outdoor unit 212, hub indoor unit 214, intrafacility link 216, a Digital Signal 3 TDM SSI module 218 (hereinafter referred to as a TDM-DS3 SSI module), an ATM optical carrier level 3c SSI module 220 (hereinafter referred to as an ATM-OC3c SSI module), a DS3 line 222, an OC3c line 224, a DS3 transparent SSI module (not shown and also included at the hub site 110), and optional transmission equipment 252 including a TDM multiplexer (TDM MUX) 226, and an optional ATM multiplexer (ATM MUX) 228. The transmission equipment 252 is coupled through the transport network 246 (also known as the backhaul) to the central office 102. The central office 102 includes: an optional TDM multiplexer 230, an optional ATM multiplexer 232, data switch 234, voice switch 236, DS1/DS3 lines 238, OC3c/Oc12c lines 240, dedicated lines 250, and an element manager 244 within the EMS 122. The common equipment 248 includes the remaining hub terminals 112.

The subscriber interfaces with the point to multipoint system 200 through the remote terminals 114 located at the subscriber's premises. An SSI module 204 is inserted into a service specific interface port or slot (hereinafter referred to as an SSI port) that is built into the chassis of an indoor unit 202 (or channel processing unit) of the remote terminal 114.

The indoor unit 202 (channel processing unit) of the remote terminal is located within the subscriber's premises. The indoor unit 202 of the remote terminal 114 multiplexes traffic to and from the subscriber and the point to multipoint system through the SSI module 204. The indoor unit 202 is coupled to the intrafacility link 208 and includes a multi-modulation modem, air frame formatting logic (within the multi-modulation modem and bust controller of FIG. 9) and a subscriber interface multiplexer function in one unit. Each indoor unit 202 (channel processing unit) of the remote terminal 114 has four SSI ports to allow for several different subscriber interfaces or service specific interface modules 204, to T1 or E1 lines for example, as discussed with reference to FIGS. 20–25B. It is the SSI modules 204 in connection with the processors of the indoor unit 202 that multiplex the synchronous signals (e.g.,TDM) and asynchronous signals (e.g.,ATM) into the indoor unit 202. The SSI modules 204 multiplex the TDM and ATM traffic onto a multi-transport mode cell bus (see FIGS. 15–18). Additionally, the SSI modules perform unique TDM buffering techniques (see FIGS. 39–44B) and ATM address filtering techniques (see FIGS. 30–31B) to enable the SSI modules to format the ATM and TDM traffic for the multi-transport mode cell bus. The multi-transport mode cell bus has a bus frame format (see FIG. 15) to allow for both TDM cells and ATM cells to be placed thereon interchangeably.

Thus, the rest of the point to multipoint system does not need to be modified to transfer signals using both TDM and ATM transport modes. Cell formatters (also referred to as signal formatters) of the SSI modules (at the remote terminal 114 and the hub terminal 112) format the TDM traffic or signals into TDM cells that are the same size as a standard ATM cell (i.e., 53 bytes). Thus, the cell formatters of the SSI modules 204 format the TDM cells and ATM cells in such a way that they appear to be the same type of cell to the rest of the point to multipoint system; however, the SSI modules have formatted the TDM cells and the ATM cells such that they are distinguished at the SSI modules of the receiving communications terminal. Thus, the multi-transport mode cell bus carries cells, such that it does not distinguish between whether the cells are TDM cells or ATM cells. The mixed traffic (TDM and ATM cells) on the multi-transport mode cell bus is mapped directly to a corresponding air interface frame format (see FIGS. 5 and 15) for transmission over the communications link 210. The mixed traffic is received over the communications link 210 and mapped back to the multi-transport mode cell bus frame format from the air interface frame format (See FIG. 15). The multi-transport mode cell bus carries the mixed traffic to the SSI modules 204 wherein the cell formatters (i.e., signal formatters) of the SSI modules 204 sort and separate the TDM cells from the ATM cells. The TDM cells are sorted according to time slots with a time plan as is conventionally done in a TDM system, while the ATM cells are sorted according to header information. Therefore, the point to multipoint system 200 is able to carry both ATM and TDM by formatting the TDM data and the ATM cells in a unique frame structure and multiplexing them in and out of the point to multipoint system 200 at the SSI modules 204 (See FIGS. 20–25B for more details on SSI modules). The details of this operation are discussed throughout the specification.

The indoor unit 202 of the remote terminal 114 further supports a fiber extender module that plugs into one of the SSI ports to allow connection to an extension indoor unit. This allows for linear growth in the number of subscriber interfaces (i.e., SSI modules) that can be supported by the indoor unit 202 of the remote terminal 114. The fiber extender module and extension indoor unit are discussed with reference to FIGS. 32–34.

The outdoor unit 206 (ODU) (or transceiver unit) of the remote terminal 114 is mounted, typically, on the roof top of the subscribers premises. The outdoor unit 206 of the remote terminal 114 communicates with the indoor unit 202 of the remote terminal 114 via the intrafacility link 208 and communicates with the hub terminal 112 with the communications link, which is a microwave radio communications link 210. The outdoor unit 206 of the remote terminal 114 comprises an antenna, power amplifier, low noise receiver, converters, intrafacility link interface, and alignment features and is further described in FIG. 9.

The intrafacility link 208 (IFL) comprises a single coaxial cable that connects the indoor unit 202 (also referenced as the channel processing unit) of the remote terminal 114 to the outdoor unit 206 (also referenced as the transceiver unit) of the remote terminal and is further described with reference to FIG. 7. The intrafacility link 208 carries DC power to operate the outdoor unit 206 of the remote terminal 114 control signals, and a reference frequency. The intrafacility link 208 uses a frequency of 70 MHz from the outdoor unit 206 of the remote terminal 114 to the indoor unit 202 of the remote terminal 114, and a frequency of 160 MHz from the indoor unit 202 of the remote terminal 114 to the outdoor unit 206 of the remote terminal 114.

The communications link 210 or air interface 210 is a 38 GHz microwave radio channel. The point to multipoint system 200 of the present embodiment supports the following frequencies: 5.2 GHZ, 24 GHz, 28 GHz, and 38 GHz although a wide range of frequency bands may be employed. The channelization of the present embodiment divides a 50 MHz channel into 4 subchannels, each with 12.5 MHz and each operating at a symbol rate of 10 Msps. Additionally, the point to multipoint system may use multiple 50 MHz channels such that more than one hub terminal 112 is within each sector and uses the same symbol rate of 10 Msps. The channelization is not limited to 50 MHz channels divided into 4 subchannels using specific symbol rates. A wide variety of channel bandwidths could be selected and divided into a wide variety of subchannels using various symbols rates. Also, frequency reuse capabilities may be used for multiple frequency channels as described in FIGS. 3A and 3B.

As mentioned above, the point to multipoint system 200 operates through the communications link 210 in a TDMA/TDMA format in both uplink and downlink directions. Signals transmitted include both TDM and ATM traffic which are mixed within the same air interface frame format. The signals are modulated using multiple modulation modes on a burst-by-burst basis. This embodiment transmits using Quadrature Phase Shift Keying (QPSK), 16-Quadrature Amplitude Modulation (16-QAM), and 64-Quadrature Amplitude Modulation. The point to multipoint system supports all three burst types in the same TDMA frame. In practice, QPSK operates at a slower bit rate and is used to increase the range of the system; 64-QAM is used for closer remote terminals for better spectrum efficiency; and 16-QAM is ideally used for mid-range remote terminals 114. (Note that the feature of the present embodiment, however, such as the availability of multiple modulation modes is particularly advantageous in the microwave range, as channels in this range tend to rapidly degrade with distance during rain fades and require line of sight to function.) Furthermore, the bursts on the air interface frame format are differently sized to be mixed and matched within the air interface frame format (see FIG. 5).

The hub site 110 of the point to multipoint system 200 supports a multi-sector, multi-frequency cell, with each sector being serviced by at least one hub terminal 112 (sector radio) using a subchannel. It consists of two main components: the hub terminals 112 (also referenced as multi-mode hub terminals) and transmission equipment 252. The hub terminals 112 are further discussed with reference to FIGS. 9 and 10. One hub terminal 112 is shown in FIG. 2 while the remaining hub terminals are represented as common equipment 248. Each hub terminal 112 transmits and receives multiple transport mode signals (e.g. ATM and TDM) using multiple modulation modes (QPSK, 16-QAM, and 64-QAM) just as the remote terminals 114 transmit and receive signals using multiple transport modes and using multiple modulation modes. Each hub terminal 112 (sector radio) and has one channel processing unit 214 (indoor unit 214) and one transceiver unit 212 (outdoor unit 212). A hub terminal 112 having an outdoor unit 212 can communicate with all of the remote terminals 114 within the particular sector, regardless of in which region (i.e., radial distance) the remote terminal 114 is located from the hub terminal 112. This is an improvement over traditional point to multipoint systems that need one radio per region per sector. Thus, n radios are needed for a prior art point to multipoint system, where n equals the number of sectors times the number of regions in the sector. The present embodiment requires only 1 radio per sector regardless of the number of regions.

A region within a sector ("pie slice") can generally be thought of as an area between two distances from the hub terminal. However, regions are more accurately defined by the channel quality that can be achieved at the receivers of the remote terminals and the receivers of the hub terminals. The remote terminals may thus be "grouped" according to channel quality, with remote terminals receiving higher channel quality being referred to as being in "closer" regions and remote terminals receiving lower channel quality being referred to as being in regions that are "farther" away. As channel quality generally corresponds with radial distance, the terms are used interchangeably with reference to the term "regions". For example, a remote terminal very close (e.g. up to 1000 m) to the hub terminal may be in one region while a remote terminal farther away (e.g. 3 km) is in another region. Both remote terminals are in the same sector but are at a different "distance" from the hub terminal. Thus, a higher order modulation (which requires more bits/second/Hz) is possible between the close remote terminal 114 and the hub terminal 112 while a hub terminal 112 using a lower order modulation (requiring fewer bits/second/Hz) is needed to communicate with the farther remote terminal.

The present embodiment improves prior art systems in that the present embodiment does not require one hub terminal 112 for each region within each sector. Instead, each hub terminal 112 may transmit using multiple modulation modes and; thus, can communicate with all remote terminals 114 within its sector regardless of the regions in which the remote terminals are located.

The hub site 110 may also include transmission equipment 252 including a TDM multiplexer 226 and an ATM multiplexer 228, to the transport network 246. The transmission equipment 252 is optional in this embodiment, and if the transmission equipment 252 is not located at the hub site, similar equipment is located at the central office 102.

Additionally, a concentrator is not needed in the present design of the hub terminal 112. In prior art systems, a concentrator splits concentrated traffic into separate traffic streams, each stream going to a differently modulated hub terminal 112. Because a single hub terminal in the present embodiment transmits using multiple modulations on a burst-by-burst basis, a concentrator is not needed. The "concentrated" traffic is simply sent directly to the hub terminal 112 which transmits the traffic multiplexed over the air.

The outdoor unit 212 (transceiver unit) of the hub terminal 112 is the same as the outdoor unit 206 of the remote terminal 114. The outdoor unit 212 of the hub terminal comprises an integrated 38 GHz transceiver and antenna. Transmit and receive bands are swapped with respect to the transmit and receive bands of the outdoor unit 206 of the remote terminal 114. The outdoor unit 212 of the hub terminal 112 is typically located on top of the building that contains the hub site 110.

Similar to the indoor unit 202 of the remote terminal 114, the indoor unit 214 (channel processing unit) of the hub terminal 112 is connected to the outdoor unit 212 (transceiver unit) of the hub terminal 112 by an intrafacility link 216. The intrafacility link 216 is a single coaxial cable that carries power for the outdoor unit 212, a reference frequency, uplink and downlink intermediate frequency signals, and a telemetry link.

The indoor unit 214 at the hub terminal 112 is similar to the indoor unit 202 of the remote terminal 114. The indoor unit 214 also supports multiple transport mode signals using multiple modulation modes. The indoor unit 214 includes the intermediate frequency transceiver section, a channel and control processor, and three types of interfaces to transmission equipment 252. The first type of interface is a TDM-DS3 SSI module 218, described in FIG. 21, to support the DS3 connection to a TDM multiplexer 226 for carrying TDM traffic. The second type is a DS3 transparent SSI module (not shown). The DS3 transparent SSI module, described in FIG. 23, is intended for point to point links between the hub terminal 112 and the remote terminal 114. This point-to-point link uses the entire bandwidth of the radio (e.g. 12.5 MHz) and is unique in the fact that a point to point link can be created within a point to multipoint system (see FIG. 23). And the third type is an ATM-OC3c SSI module 220, described in FIG. 22, used for carrying traffic with ATM cells to an ATM multiplexer 228. The hub site 110 and hub terminals 112 are described in more detail with reference to FIGS. 13 and 14. Note that a DS3 is a digital signal level 3 and an OC3c is an optical carrier level 3 concatenated, both of which are known in the art of telecommunications.

Figure 13:
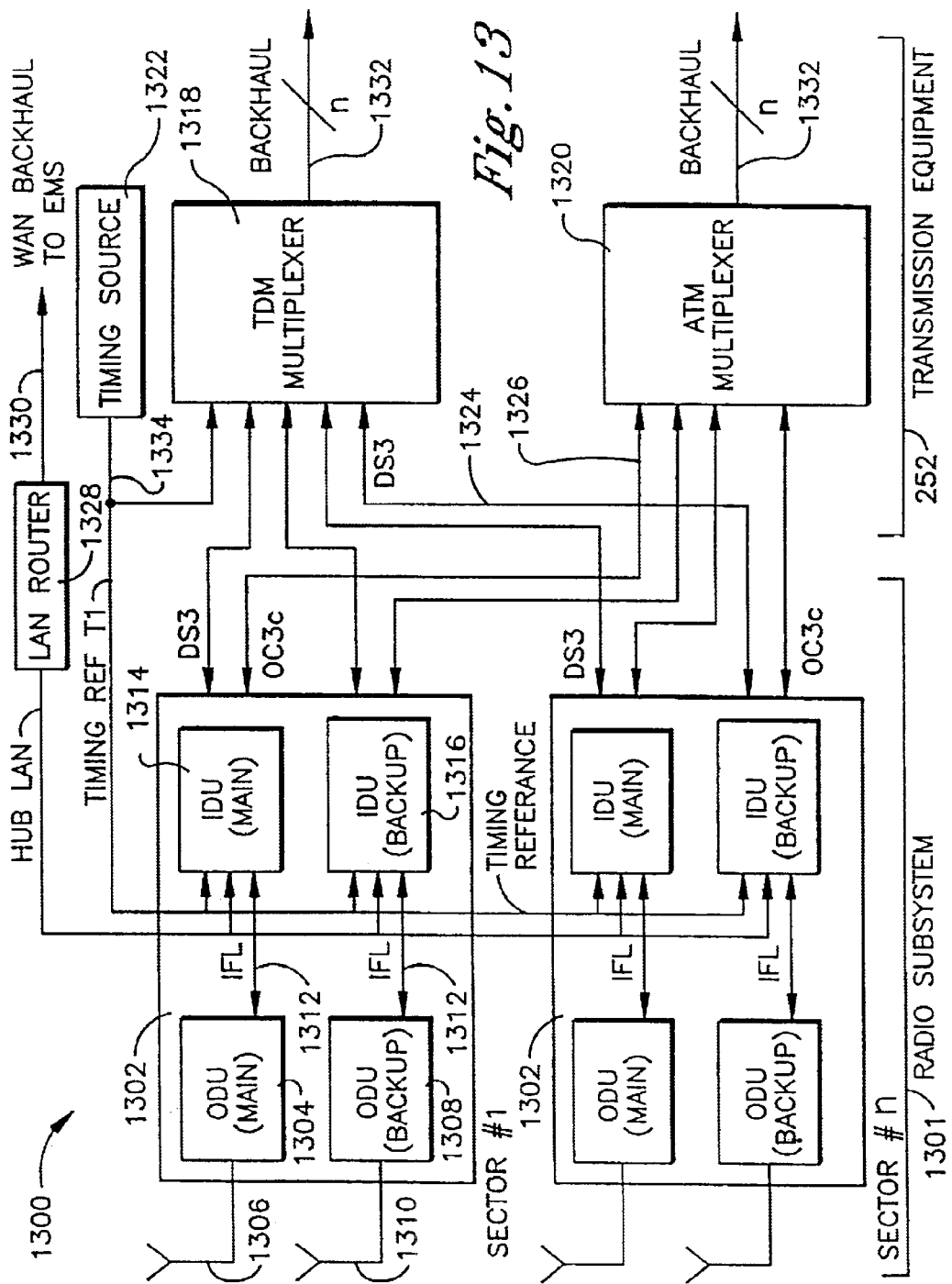
FIG. 13 is a block diagram of the hub site of the embodiment described in FIG. 2 containing multi-mode hub terminals and transmission equipment.

The hub terminals 112 are supported by 1:1 redundancy switching. For each hub terminal 112, there is a one for one redundant outdoor unit (206, 212) and indoor unit (202, 214). For example, if either the indoor unit 214 of the hub terminal 112 or the outdoor unit 212 of the hub terminal 112 fails, a backup hub terminal (not shown) including a outdoor unit (not shown) and indoor unit (not shown) are automatically switched in to replace the failed hub terminal 112. Thus, one backup hub terminal is needed for each hub terminal 112. The 1:1 redundancy system is shown in FIG. 13.

Alternatively, a novel 1:N redundancy system may be used for hub terminals 112 within the same sector and having the same antenna profile as described with reference to FIG. 37.

The transmission equipment 252 multiplexes traffic from all the indoor units 214 of the hub terminals 112 to and from the transport network 246. Both TDM-based and ATM-based multiplexing are achieved by using the TDM multiplexer 226 and the ATM multiplexer 228. As mentioned above, the transport network 246 may be a Synchronous Optical Network (SONET) ring. The SONET ring is a ring of fiber optic cable that runs underground throughout a defined area. It is a high speed carrier, that carries synchronous (TDM) or asynchronous (ATM) traffic.

In another embodiment, backhaul wirelines could be replaced by a wireless communications link (not shown) from the transmission equipment 252 to the transport network 246 (or backhaul infrastructure). The wireless communications link could be a microwave radio communications link very similar to the communications link 210 between the hub terminals 112 and the respective remote terminals 114. An antenna, e.g. a first 12" antenna, is coupled to the transmission equipment 252 and a corresponding antenna, e.g. a second 12" antenna, is coupled to the transport network 246. The antenna would have a very narrow beamwidth (e.g. 2–3 degrees) allowing for much greater range than a wider angle antenna. This embodiment allows for a distance of about 5 to 10 miles between the hub site 110 and the transport network 246.

The central office 102 provides the switching for the point to multipoint system 200 and contains the element management system 122 (EMS). Transmission equipment is alternatively located at the central office and is implementation dependent. Alternatively, the EMS 122 is not contained in the central office 102. The transmission equipment at the central office 102 is a TDM multiplexer 230 used for TDM traffic, an ATM multiplexer 232 used for ATM traffic, a data switch 234, a voice switch 236, DS1 or DS3 lines 238, OC3c/OC12c lines 240, and STM-1 lines (not shown). Other dedicated lines 250 couple to other data delivery systems such as PSTN, Internet service providers and inter-exchange carriers. The data switch 234 and voice switch 236 control which data and voice signals go to the TDM multiplexer 230 and the ATM switch 232. The DS1 line 238 is a T1 line or E1 line, while the DS3 line 238 carries a group of 28 T1streams. The OC3c and OC12c lines 240 are ATM specific lines. STM-1 lines are also used in the European version of the point to multipoint system 100. STM-1 lines are configured to run in either ATM or TDM mode. For example, TDM STM-1 lines would replace DS3 lines 222 and 238, while ATM STM-1 lines would replace OC3c lines 224 and 240. This transmission equipment and the various lines are well known in the art.

The element manager system (EMS) 122 of the central office 102 contains the element manager 244 which performs off-the-network management functionality for the point to multipoint system. Physically, the element manager 244 is a UNIX based workstation typically used for point to multipoint systems including a large geographical display. An operator can configure and monitor the point to multipoint system network from the EMS 122. In one embodiment, the EMS 122 uses a Wide Area Network (WAN) to communicate with all of the hub sites 110 in the point to multipoint system. The WAN communicates with each hub site 110 through a local area network (LAN) router located at each hub site 110 which couples the WAN to the LAN of each hub site 110. This is the conventional way in which the EMS 122 manages the hub sites 110. The LAN router is shown in FIG. 13. The LAN of the hub site communicates with the individual indoor units 214 of the hub terminals 112 (see FIG. 13). The transport from the hub LAN to the WAN is often a separate landline T1 line, or, alternatively, it can be multiplexed into the DACS 230 as discussed below.

In another embodiment, the element management system 122 uses an in-band network to communicate with the hub site 110 of the point to multipoint system 200 through messaging sent through the transport network 246 (backhaul). The messaging is sent as either TCP/IP or frame relay data using AAL5 (ATM adaptation layer level 5) through the transport network 246 and the ATM multiplexer 228. The ATM OC3c SSI module 220 receives the messaging as described in FIG. 22. This approach is a departure from prior art systems that communicate through a separate landline. It is more economical and eliminates the need to maintain separate landlines to the hub site 110 for the wide area network to communicate with the LAN of the hub site 110.

Furthermore, it should be noted that the point to multipoint system is described throughout the specification as having both multiple transport mode capabilities and multi-modulation capabilities in the preferred embodiment. The point to multipoint system is not intended to be limited to point to multipoint systems having both capabilities. For example, one embodiment of the point to multipoint system could be configured to transmit and receive multiple transport mode signals (e.g. synchronous and asynchronous) without having multi-modulation capabilities. This embodiment would not require the multi-modulation modem and could contain a single modulation modem known in the art.

In another embodiment, the point to multipoint system may have multi-modulation capability and not multi-transport mode capabilities. In such an embodiment, the specially designed SSI modules and multi-transport mode cellbus could work without modification. Thus, the hub terminals and remote terminals could comprise multi-transport mode radios in one embodiment and multi-modulation radios in another embodiment.

The present embodiment is fully compatible with conventional equipment, such as the components of the transmission equipment 252, transport network 246, and central office 102. The point to multipoint system 200 further supports existing services and interfaces; however, the conventional SSI modules must be modified to interface with the multi-transport, multi-modulation system. The individual aspects of this embodiment of the point to multipoint system that enable the use and operation of the system are described below.

Referring next to FIGS. 3A and 3B, diagrams are shown of the channelization used in one embodiment of the point to multipoint system shown in FIG. 2 illustrating the frequency reuse with multiple channels at the hub site that support multiple modulation modes. FIG. 3A illustrates frequency reuse of two channels (e.g. 50 MHz frequency channels) indicated by a first frequency 302 and a second frequency 304. The first frequency 302 and the second frequency 304 are used in adjacent sectors, e.g. first sector 306 and second sector 308 by respective hub terminals at the hub site. Then, the first frequency 302 is reused in alternate sectors, e.g. the third sector 310, and so on. An alternate sector refers to a sector next to the adjacent sector. For example, the third sector 310 using the first frequency 302 is an alternate sector of the first sector 306 while the second sector 308 using the second frequency 304 is adjacent to the first sector 306. The first sector 306 and the second sector 308 shown in FIG. 3A are 90 degree sectors.

Advantageously, each sector, e.g. the first sector 302 and the second sector 304, supports respective frequency sub-channels of the first frequency channel and the second frequency channel. Each subchannel supports multiple modulation modes (e.g. QPSK, 16-QAM, and 64-QAM, but is not limited to these modulation modes) within the 90 degree sector. In contrast, a prior art frequency reuse only supports one modulation mode per subchannel and does not support more than one modulation mode being reused in alternate sectors using the same frequency.

The frequency reuse in this embodiment supports 64-QAM modulation which poses a special problem since the 64-QAM modulation is extremely sensitive to interference. In order to accomplish the frequency reuse with a high order modulation, such as 64-QAM, a sectored antenna must be used at each hub terminal using a subchannel within each sector in order to transmit without interfering with alternate subchannel transmissions in the adjacent sectors. The sectored antenna is used as the same antenna shown at the outdoor units of the hub terminals in FIGS. 1 and 2. Additionally, the sectored antenna must have reduced or low level sidelobes so as to transmit the narrow beam without causing interference with alternate sectors using the same frequency. The sidelobes of the sectored antenna must be sufficiently reduced to support use of the 64-QAM modulation. Thus, the sidelobes are reduced at 1.5 times the sectored antenna beamwidth. Also, the sidelobes must be at a low level, such as no greater than 35 dB below the peak gain of the sectored antenna so as not to interfere with the 64-QAM signals in the frequency being used in the alternate sectors. Thus, the sidelobe characteristics enable use of the frequency reuse with a high order modulation, such as 64-QAM.

The diagram in FIG. 3B shows the same frequency reuse for 2 channels; however, the first sector 306 and the second sector 308 are 45 degree sectors. Again, the hub terminals in each sector must has a sectored antenna with sufficiently reduced sidelobes to transmit using multiple modulation modes, including 64-QAM, into the 45 degree sector without causing interference into the alternate sectors using the same frequency.

Alternatively, this embodiment is not limited to only 90 degree and 45 degree sectors, and other sector sizes may be selected, e.g. a 22.5 degree sector. Furthermore, both subchannels using the different frequencies could be located in the same sector. Thus, two hub terminals would be in each sector, each transmitting over subchannels of the different frequency channels.

Air Interface

Referring next to FIG. 4, a diagram of the TDMA superframe air interface format 400 of the present embodiment is shown. The point to multipoint superframe format 400 used in both the uplink and downlink directions comprises N frames 402. The significance of the frames 402 is explored below. The superframe format is created in the multi-modulation modem described in FIG. 11.

Figure 5:
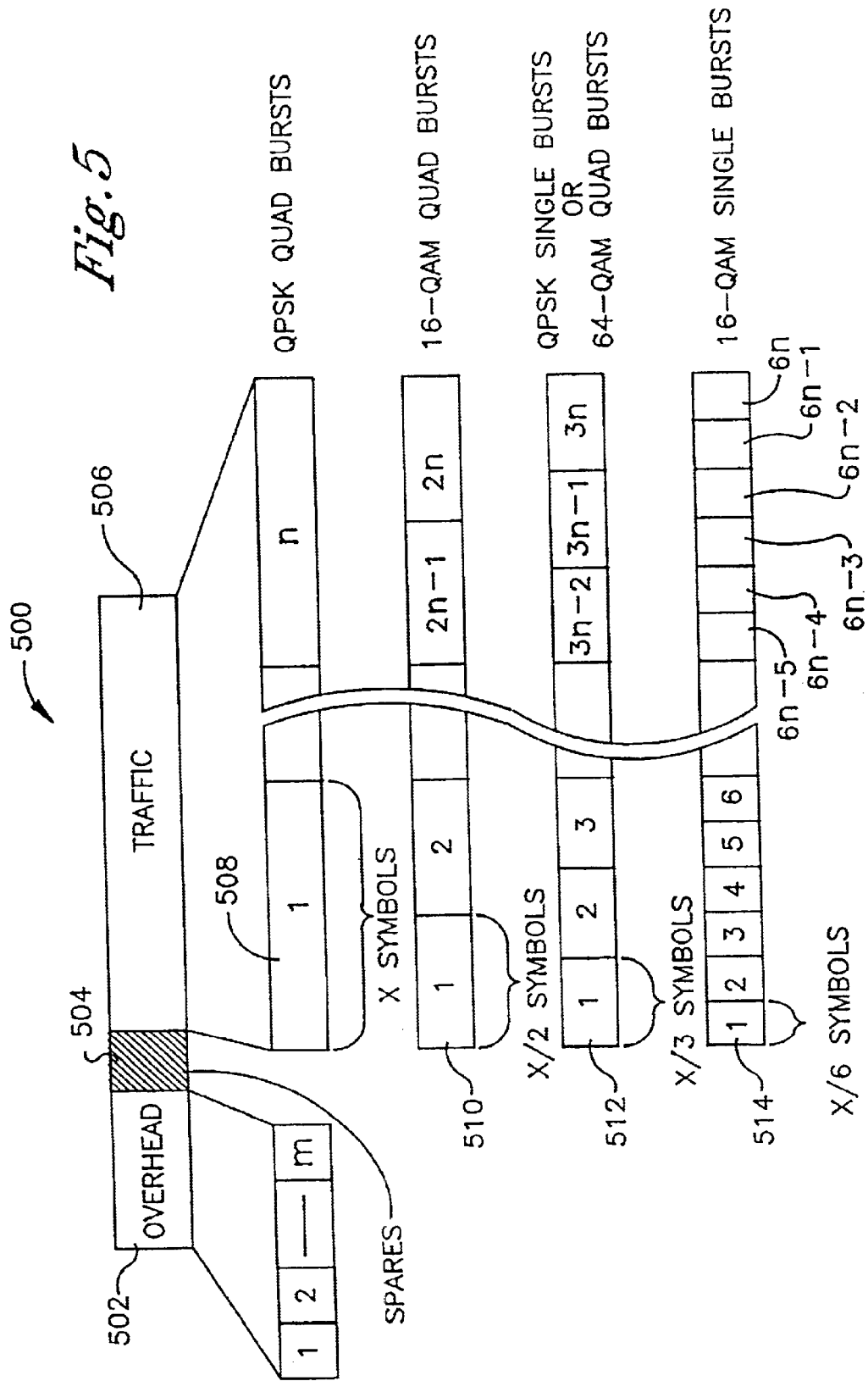
FIG. 5 is a diagram of an air interface frame format for a single frame of the superframe format of FIG. 4.

Referring next to FIG. 5, a diagram of an air interface frame format corresponding each of the N frames of the superframe format of the present embodiment FIG. 4 is shown. The air interface frame format 500 includes an overhead section 502, a spare section 504, and a traffic section 506. The traffic section 506 may contain QPSK Quad Bursts 508, 16-QAM Quad Bursts 510, QPSK Single Bursts 512, 64-Qam Quad Bursts 512, and 16-QAM Single Bursts 514.

The TDMA air interface frame format 500 in FIG. 5 corresponds to one of the N frames in the superframe format shown in FIG. 4. Advantageously, in the present embodiment, the air interface frame format 500 is designed to provide for both TDM and ATM transport. The key for providing both TDM and ATM transport on the same air interface frame format 500 is that the TDM traffic is formatted into TDM cells having the same size as ATM cells (see FIGS. 28 and 29). This formatting is done at the SSI modules of the indoor units of both the remote terminals and the hub terminals. The TDM cells and ATM cells both contain header information to distinguish them. Thus, the TDM cells and ATM cells are multiplexed onto a bus frame format which maps directly to the air interface frame format 500 (see FIG. 15). The uniquely designed air interface frame format 500 provides the necessary structure to transport the mixed traffic (ATM and TDM) as well as a unique structure to interchange differently modulated traffic bursts.

Furthermore, the capacity of the radio communication link is a function of the modulation modes selected for the respective traffic bursts since the air interface frame format 500 has differently sized bursts depending on the modulation used. The multi-modulation modems and the bus controllers of the indoor units of both the hub terminals and the indoor units of the remote terminals contain the air interface frame formatting logic necessary to create the air interface frame format 500 and is further described in FIGS. 9 and 11.

In practice, the air interface frame format 500 is the same in the uplink and downlink, whereas prior art point to multipoint systems use an air frame format supporting continuous transmission the downlink (TDM) and discontinuous (TDMA) in the uplink. The air interface frame format 500 has an overhead section 502 for system management and dynamic bandwidth allocation purposes. The overhead section 502 contains m time slots containing QPSK bursts. The overhead section 402 contains QSPK bursts since QPSK is the lowest order modulation (least bits/second/Hz) of the modulation modes used by the present embodiment; thus, having the farthest range. Thus, all remote terminals in the point to point system are designed to receive at least QPSK modulated bursts so that they can receive the overhead messaging. The overhead section 502 is further discussed with reference to FIG. 8. The spare section 504 separates the overhead section 502 from the traffic section 506.

The traffic section 506 of the TDMA air frame format 500 carries the payload (ATM cells and TDM cells) to and from the remote terminals and the hub terminal. The TDMA air frame format is used in both the uplink and the downlink and supports burst-by-burst modulated traffic. The point to multipoint system of the present embodiment supports QPSK Quad Bursts 508, 16-QAM Quad Bursts 510, QPSK Single Bursts 512, 64-QAM Quad Bursts 512, and 16-QAM Single Bursts 514. The present embodiment is not limited to the above modulations and could also be configured to support other modulations known in the art, such as BPSK, 128-QAM, 256-QAM, and 32-QAM.

The traffic bursts within the traffic section 506 are differently sized and are conveniently designed as integer multiples of each other depending on the modulation selected for a particular burst. Alternatively, the bursts could be designed as multiples of each other without being integer multiples. The air interface frame format generally holds n QPSK Quad bursts in the traffic section 506. The number of bursts n is a function of the frequency used as described further below. Thus, the Quad QPSK burst 508 is x symbols in length and supports a quad DS0 as known in the art. The 16-QAM quad burst 510 is x/2 symbols in length and supports a quad DS0. The QPSK single bursts 512 and 64-QAM quad bursts 512 are x/3 symbols in length and support a single DS0 and a quad DS0, respectively. The 16-QAM single bursts 514 are x/6 symbols in length and support a single DS0. A DS0 or digital signal level zero is a term known in the art of telecommunications; thus no further explanation is needed.

Advantageously, the relationship between the sizes of the bursts enables the point to multipoint system to mix and match different bursts using different modulation modes within the same fixed size air interface frame format 500. The QPSK Quad burst 508 is twice as long as the 16-QAM Quad bursts 510, three times as long as the QPSK Single burst 512 or the 64-QAM Quad burst 512, and six times as long as the 16-QAM Single Burst 514. Also, if the air interface frame format can hold n QPSK quad bursts 508, then it can hold 2n 16-QAM Quad bursts 510, 3n QPSK single bursts 512 or 64-QAM quad bursts 512, and 6n 16-QAM single bursts 514. These size relationships enable a very efficient use of the bandwidth available in the air interface frame format at 500. This departs from air frame format used in a conventional point to multipoint system containing fixed size air bursts that are modulated using only one modulation mode.

Furthermore, since the air interface frame format 500 transmits using proportionately sized traffic bursts using multiple modulation modes, a change in transmissions to any one remote terminal does not require that a new time plan be redistributed. In a prior art system, the remote terminals are told which timeslots to "listen" to through the use of a timeplan. Thus, if a new remote terminal is added or removed or one of the remote terminals has increased or decreased needs, then the timeplan is altered and a new time plan must be distributed to all remote terminals.

Advantageously, the present embodiment does not need to redistribute a new time plan for the respective remote terminals to receive the respective traffic bursts. Simply, the remote terminals only demodulate the portions of the traffic section 506 that they are configured to demodulate. For example, a remote terminal in the closest region will demodulate only the traffic bursts using 64-QAM and not the traffic bursts using QPSK or 16-QAM. Note that it does not matter which timeslot the 64-QAM bursts are in within the traffic section 506, since the remote terminal will receive regardless of what timeslot it is in. Therefore, a new timeplan is not needed, in fact a timeplan is not needed at all. Thus, the remote terminals are able to receive the bursts independently of a timeplan. This represents a technique of demand assigned multiple access without the use of a timeplan, or independently of a timeplan.

The present embodiment provides messaging through the QPSK modulated bursts in the overhead section 502 to route the traffic bursts once demodulated at the indoor units of the remote terminals. All remote terminals are configured to demodulate the overhead bursts. Note, however, that a new timeplan is sent in order for the SSI modules to determine which cells to take off of the multi-transport mode cell bus (see FIGS. 20–25B), but a new timeplan is not needed for each remote terminal to receive certain traffic bursts over the air interface. Additionally, one less frame for latency is needed than in a conventional time plan.

In the preferred embodiment, the length of the air interface frame format 500 is 6 msec and there are 8 frames in the 48 msec superframe format of FIG. 4. The 6 msec frame length which corresponds to 48 bytes of DS0 samples of TDM data taken every 125 μsec (at 8 kHz). As briefly stated above, and more fully explained below, in order to allow for the use of multi-transport mode features, the TDM data is formatted into TDM cells that are similar to the standard ATM cells (see FIGS. 28 and 29). Thus, 48 bytes of DS0 samples are needed to fill the appropriate data section of the TDM cell so the air interface frame format 500 must be at least 48×125 μsec=6 msec in length to gather enough TDM bytes to fill the a traffic burst. Thus, the traffic section 506 could fit 57 QPSK quad bursts 508, 114 16-QAM quad bursts 510, 171 QPSK single bursts 512 or 64-QAM quad bursts 512, or 342 16-QAM single bursts 514 total or various combinations of the above traffic bursts. Again, the given lengths are all a function of the frequency used and the length of the data cells used that are formatted into traffic bursts, and the present embodiment is not limited to these specific lengths.

Since the air interface frame format 500 supports three modulation modes in a burst-by-burst fashion, a single hub terminal (sector radio) can transmit to all remote terminals in a sector regardless of which region within the sector the remote terminals are located. For example, the hub terminal will transmit using QPSK to remote terminals in the farthest region up to 3 km, while the hub terminal will transmit to the closest remote terminals with 64-QAM, and the 16-QAM for the remote terminals in a middle region, all within the same air interface format 400. This allows the most efficient use of the communications channel by using the highest order modulation (most bits/second/Hz) possible for each remote terminal and still retain satisfactory quality. Thus, the remote terminals in the farthest region use the lowest order modulation available (e.g. QPSK) while the remote terminals in the closest region use the highest order modulation available (e.g. 64-QAM).

Referring next to FIGS. 6, a diagram of a traffic burst format used in the air interface frame format of FIG. 5 is shown including a split preamble feature. The traffic burst 600 includes: a preamble 602 containing guard 606, ramp 608, first unique word 610, second unique word 611, a first data/spare section 612, and a second data/spare section 614; data section 604; and a parity 606. Also shown is the preamble split length 613.

The traffic burst 600 is generically shown in one format, but is intended to describe the format of a QPSK quad burst, 16-QAM single burst, etc. The data section 604 and the first data/spare section 612 and the second data spare section 614 are differently divided according to what type of burst is used, as described in FIGS. 7A and 7B, and the length of the traffic burst 600 will vary depending on the modulation mode selected. Thus, the traffic burst represents a format for the traffic bursts shown in FIG. 5. In one embodiment the data section 604 and the first and second data/spare sections 612 and 614 are designed to carry small sized data cells; for example, the 53 byte ATM cells in FIG. 28 and the 53 byte TDM cells of FIG. 29.

The preamble 602 of the traffic burst 600 contains entirely known sections including the guard 606, and ramp 608. However, the preamble 602 is unique in that instead of one unique word that would be used in a prior art preamble, the preamble is a "split preamble" in which the unique word is divided into a first unique word 610 and a second unique word 611. The first unique word 610 and the second unique word 611 are separated by the first data/spare section 612.

Figure 11B:
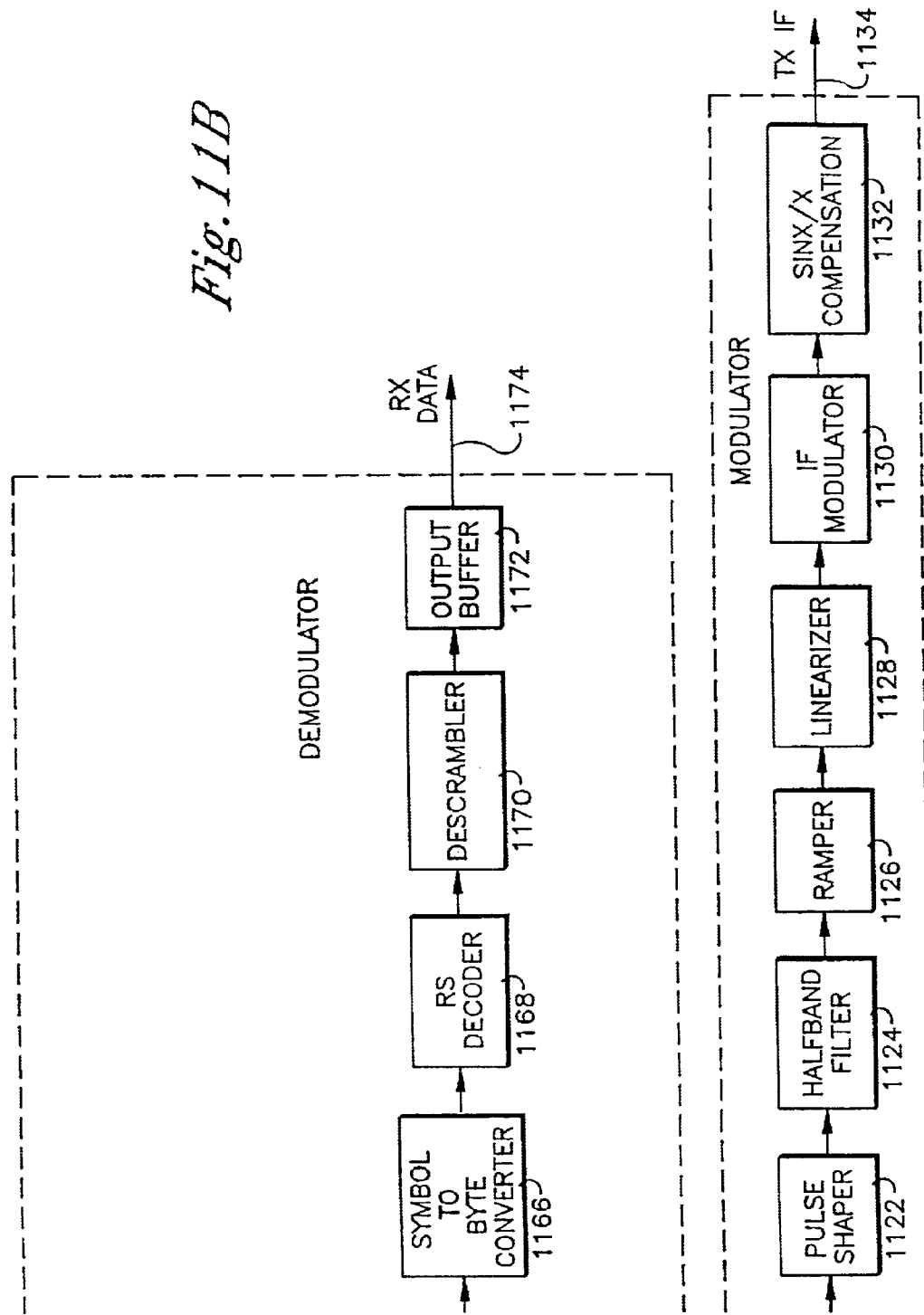
FIG. 11 is a functional block diagram of a multi-modulation modem ASIC used in the multi-mode remote terminal of FIG. 9 or the multi-mode hub terminal of FIG. 14.
Figure 12:
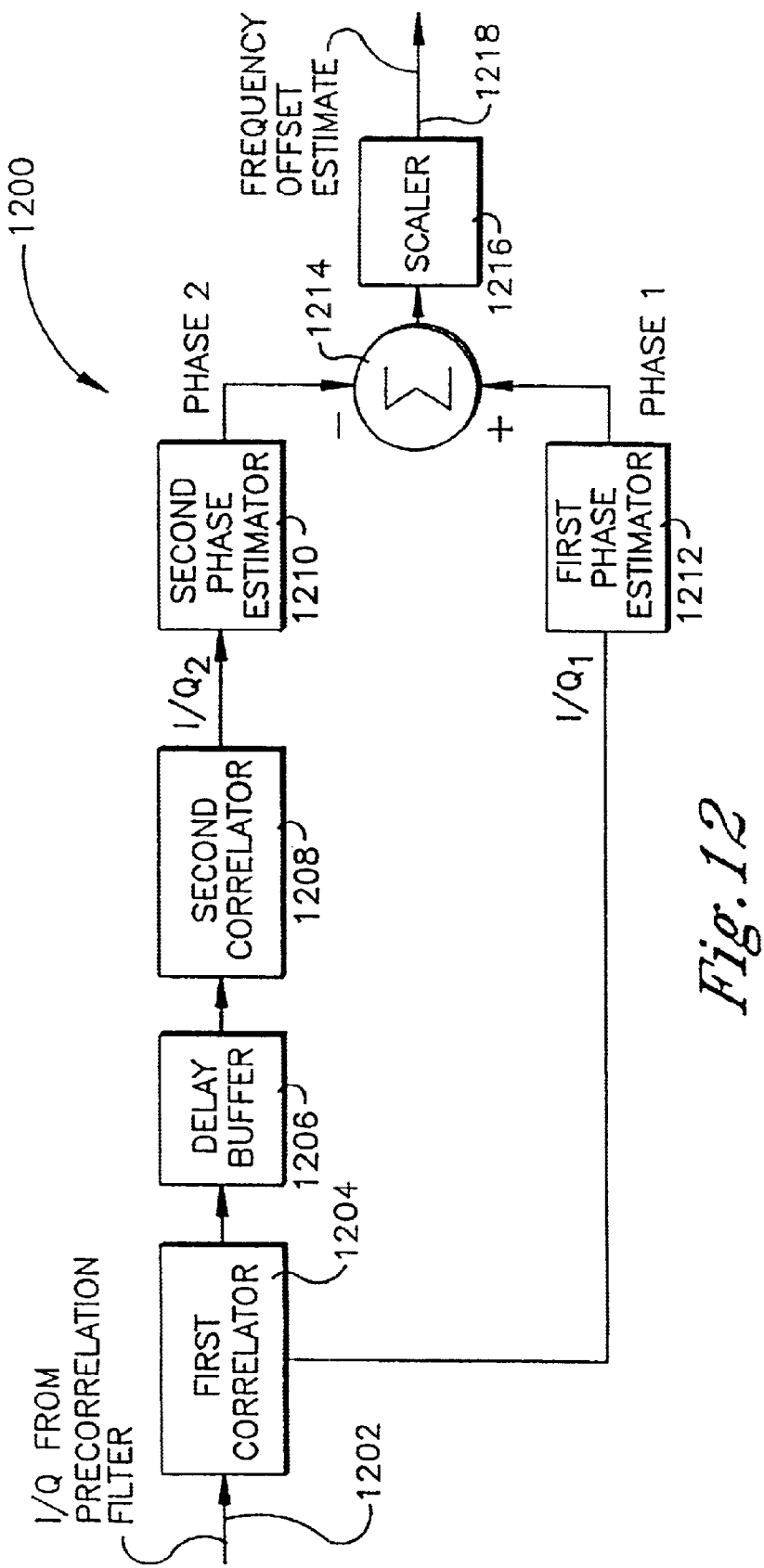
FIG. 12 is a functional block diagram of a parameter estimation performed in the multi-modulation modem of FIG. 11 and using the split preamble feature shown in FIG. 6.

The first unique word 610 and the second unique word 611 are split as shown so that the multi-modulation modem of FIG. 11 can accurately estimate the channel characteristics including the frequency offset and the phase offset in received bursts. The frequency and phase estimation are done at the multi-modulation modem and the specific functions of the first unique word 610 and the second unique word 611 are shown in FIG. 12. Advantageously, the first unique word 610 and the second unique word 611 are separated by the first data/spare section 612 making up a preamble split length 613.

The preamble 602 precedes each TDMA burst and provides synchronization symbols and guard time between uplink TDMA bursts. As discussed in FIG. 12, the traffic throughput is optimized since the traffic is contained within the data section 604, the first data/spare section 612 and the second data/spare section 614. Depending upon the specific burst type (shown in FIGS. 7A and 7B) and the size of the traffic burst (shown in FIG. 5), depending on the modulation mode used, the traffic burst 600 may not include a second data/spare section 614 or the second data/spare section 614 may only contain spares and not data. Similarly, the first data/spare section 612 may contain partial or no data, but only spares. Advantageously, the first and second data/spares sections 612 and 614 should contain data (or traffic) in order to optimize the traffic throughput. Additionally, the traffic burst 600 includes a parity 606 which may be at the end of the traffic burst 600 as shown or contained within the preamble (not shown). An additional postamble (not shown) including a ramp down and guard may be appended to the traffic burst 600. The bursts mentioned are not limited to quad bursts and single burst, but could comprise other types of bursts known in the art.

Referring next to FIGS. 7A and 7B, diagrams are shown of a quad burst and single burst, respectively, that are part of the data section and data/spare sections of the traffic burst shown in FIG. 6. The quad burst 700, shown in FIG. 7A, has a spare 702 and data fields 704 containing a header 706 and a data section 708. The single bursts 710, shown in FIG. 7B, have a spare 702 and a single data field 704 containing a header 706 and a data section 708.

In practice, the quad burst 700 shown in FIG. 7A is the first of two burst types, the second being a single burst 710 shown in FIG. 7B. The quad burst 700 has 4 data fields 704 that hold 4 data cells while the single burst 710 has 1 data field 704 that contains 1 data cell as shown in FIGS. 28 and 29. Each data cell contains the header 706 and data section 708. The data cells in the data fields 704 can be either ATM cells (FIG. 28) or specially formatted TDM cells (FIG. 29).

An important feature of the air interface frame format is that it is configured to carry both ATM and TDM data. Since a standard ATM cell is 53 bytes in length having 5 bytes for identifiers and 48 bytes of data, each data field 704 (whether in a quad burst or single burst) of the air interface frame format must be 53 bytes in length or greater. Thus, if the air interface frame format is carrying TDM data, the TDM cell that fits in the data field is also 53 bytes in length or greater. Advantageously, as will be discussed in FIG. 29, a TDM cells contained within the data fields 704 use 5 bytes for header information and 48 bytes for data similar to ATM cell. The 48 bytes of DS0 samples of TDM data needed to fill the data field 508 dictate the length of the air interface frame format. As earlier stated the length must be at least 6 msec in order to sample enough data to fill the data field 704 (corresponding to 48 125 $\mu s$ (8 kHz) pulse code modulated (PCM) frames during the 6 msec air frame). Note that the designer could alter the rate at which sample were taken and; thus, the minimum air interface frame format length would be altered. For a more detailed look at the structure and advantages of the structure and advantages of the structure of an ATM cell and specially designed TDM cell, see FIGS. 28 and 29.

It is also important to show that the data fields 704 and spare 702 occupy the space within the traffic burst of FIG. 6 including the data section 604, the first data/spare section 612 and the second data/spare section 614. As the traffic burst is received over the air interface, the data within the first and second data/spare sections 612 and 614 and the data section 604 of the traffic burst are concatenated by the multi-modulation modem and then subdivided into the quad burst 700 and single burst 710. Thus, the spare 702 and the data fields 704 of FIGS. 7A and 7B map to the data section 604 and first and second data/spare sections 612 and 614 of FIG. 6.

Furthermore, the data sections 708 (also referred to as subslots) of the data fields 704 of the quad burst 700 and the single burst 710 can carry data from multiple DS0s in one of several modes. In the embodiments shown in FIGS. 29 and 42 through 43, data from several DS0s may be carried by the TDM cells within the data fields 704. In TDM mode, 48 bytes of PCM samples of the DS0 are carried with an appropriate header 706. The header 706 contains signaling, such as channel associated signaling. Additionally, the header 706 of the TDM cell uses an ATM header (VPI) in order to distinguish it from the ATM cells and is discussed in FIG. 29. The quad burst format 700 can also carry ATM traffic as a DS0 where an ATM cell (53 bytes) is carried. Alternatively, the twenty-five data fields 704 can be aggregated to carry a DS1 in ATM Adaptation Layer 1 (AAL1). The bandwidth will be sufficient to handle a +/−200 ppm clock offset between the network frame timing and the user's (potentially different) clock rate.

As stated, the air interface frame format is formatted such that it carries both ATM and TDM traffic, whereas prior art systems require separate airframe formats for ATM and TDM communications links. The TDM data has been formatted in a specially designed TDM cell that is the same size as the ATM cell and; thus, the air frame format does not distinguish between ATM and TDM cells. The SSI modules format the TDM cells and multiplex them onto a multi-transport mode cell bus along with ATM cells. Then, the multi-transport mode cell bus frame format is then directly mapped to the TDMA air interface frame format. Thus, it is the SSI modules distinguish the ATM and TDM traffic. The details of how the ATM and TDM cells on the multi-transport mode cell bus mapped to the air interface frame format are discussed with reference to FIGS. 15 through 18. The details of how the ATM cells and TDM cells are formatted for the cell bus frame format of the multi-transport mode cell bus are discussed further in the specification. Such features provide one method of how to implement the air interface frame format within the point to multipoint system.

Figure 8:
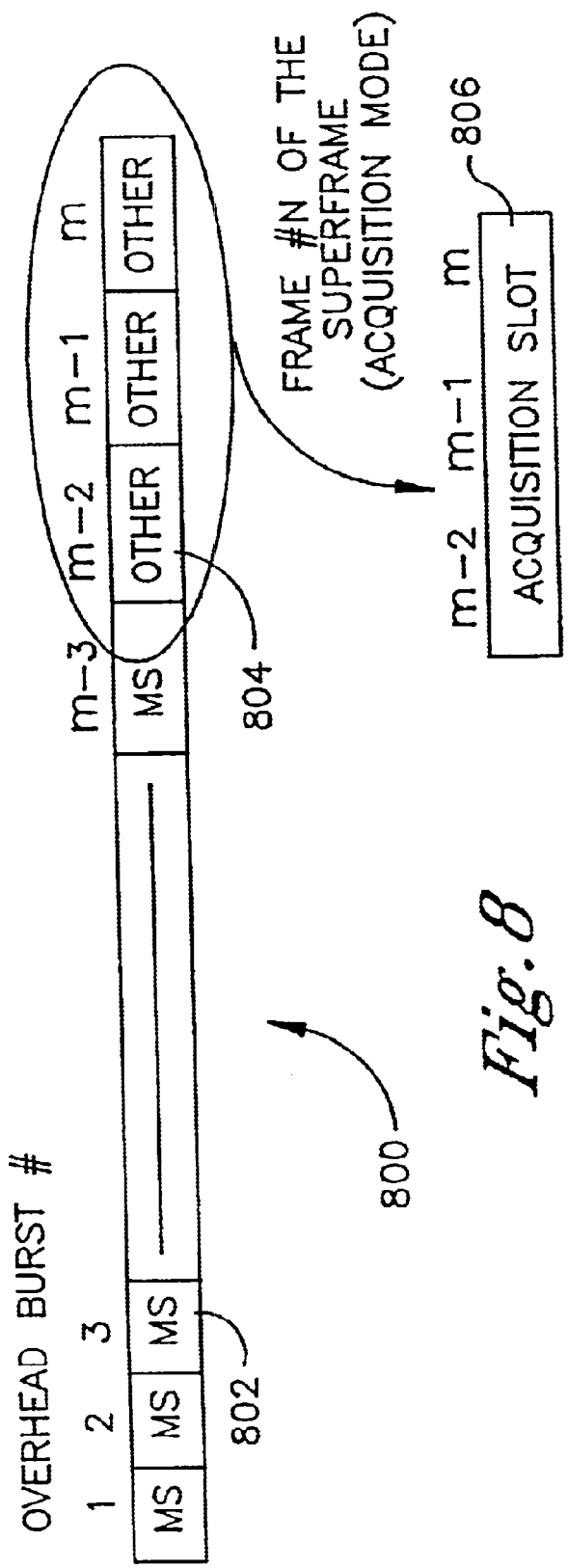
FIG. 8 is a diagram of the overhead section of the air interface frame format of FIG. 5.

Referring next to FIG. 8, a diagram of the overhead section 800 of FIG. 5 is shown. The overhead section 800 includes m timeslots containing overhead bursts. Shown are maintenance slots 802, three remaining timeslots 804 and an acquisition slot 806. Each air interface frame of the superframe has m overhead timeslots. Overhead bursts are transmitted within the various maintenance timeslots 802 using QPSK only to ensure a constant size overhead section and because QPSK offers the greatest transmission range of the presently used modulations in this embodiment. Thus, all remote terminals, even the remote terminals in the farthest region, can receive and transmit overhead bursts.

Each remote terminal is assigned one maintenance slot 802 within the superframe format of FIG. 4; thus, for example, if there are 9 maintenance slots 802 and 8 frames in a superframe, then 72 remote terminals (9 maintenance slots×8 frames) can be supported in one superframe structure. The remaining three slots 804 are used for other purposes in Frame 1 through Frame N−1 of the superframe format of FIG. 4, such as random access via the ALOHA protocol, acknowledgment, and a dedicated channel to the remote terminal. In Frame N of the superframe format of FIG. 4, the three overhead slots 804 are combined to form an acquisition timeslot 806 in the uplink direction. An acquisition burst is transmitted during this long acquisition timeslot 806 and provides a mechanism to calibrate the transmission timing for the remote terminal.

Figure 37:
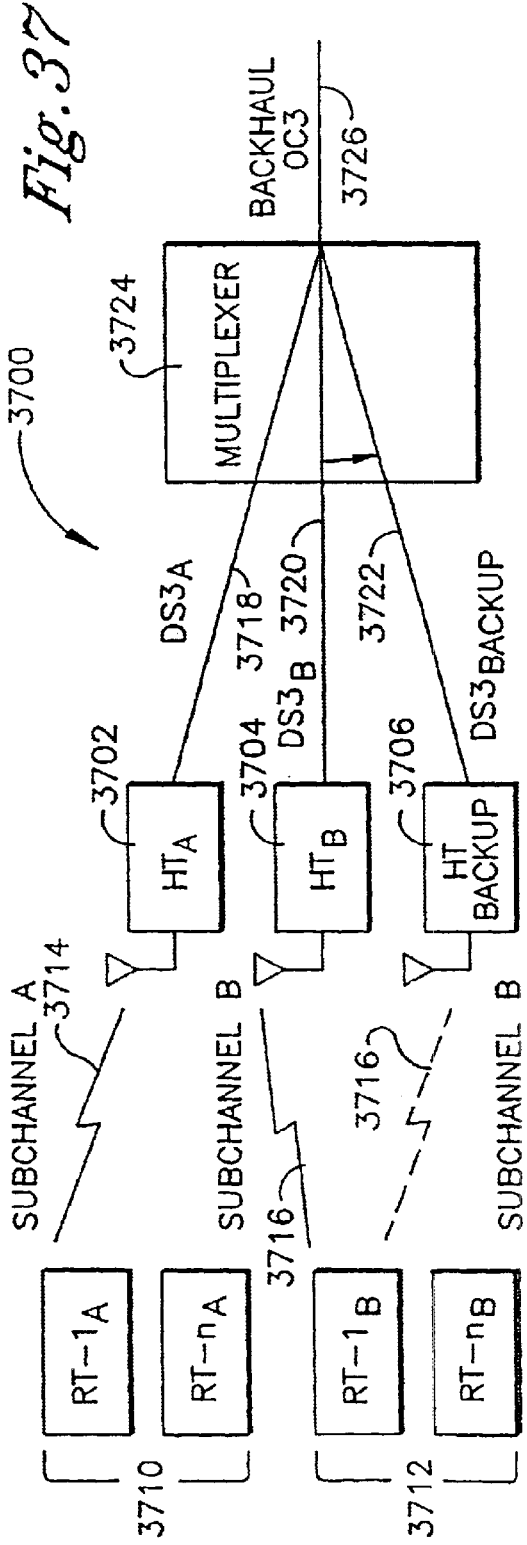
FIG. 37 is a block diagram for a 1:N redundancy system used at the hub sites in one embodiment of the point to multipoint system of FIG. 2.
Figure 38:
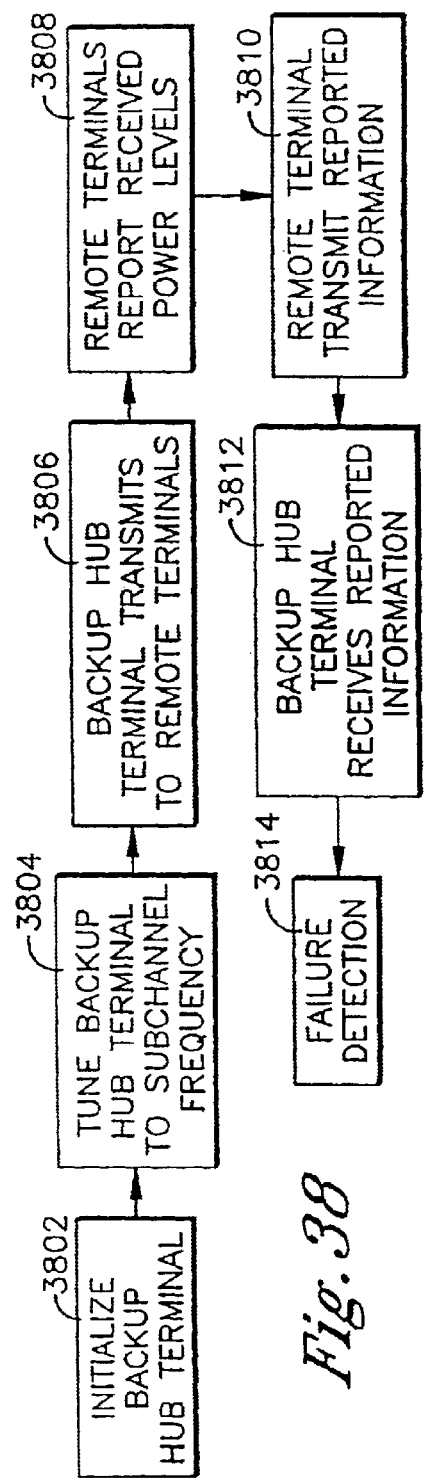
FIG. 38 is a flowchart for the steps undertaken in order for a backup hub terminal shown in FIG. 37 to detect an on-line hub terminal failure in the 1:N redundancy embodiment of the point to multipoint system of FIG. 2.

The acquisition slot 806 is also used in one embodiment of the present invention that uses a 1:N redundancy system as described in FIGS. 37 and 38.

The overhead section 800 contains several types of bursts including: maintenance bursts, random access bursts, response bursts, and a shortened calibration burst. The maintenance bursts (within the maintenance slots 802) provide a communications path between the remote terminal and the hub terminal whether or not that remote terminal is carrying traffic. The random access burst (within the remaining timeslots 804) in the uplink allows the remote terminal to request bandwidth in Demand assigned multiple access (DAMA) operation (see FIG. 35). The response burst (remaining timeslots 804) in the uplink is used by the remote terminal to acknowledge protocol messages sent by the hub terminal. And the acquisition burst (within the acquisition timeslot 606) is used by the remote terminal during installation to determine its correct timing offset.

Advantageously, the overhead section 800 allows the remote terminals to transmit control information without contention. Thus, each remote terminal is in regular contact with the point to multipoint hub terminal for reporting alarms and for performing real time power control once every superframe format.

Remote Terminal

Figure 9:
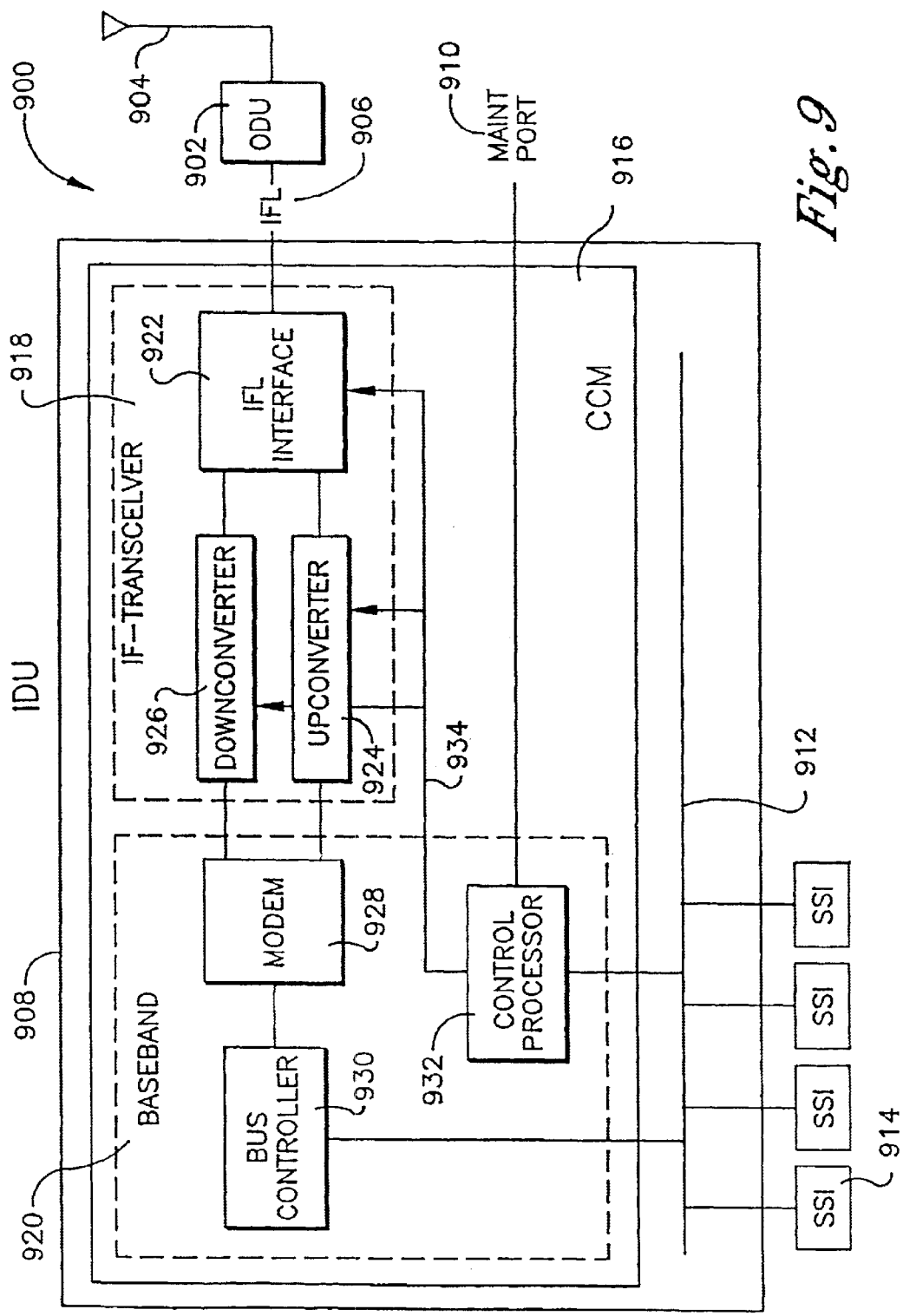
FIG. 9 is a functional block diagram of the multi-mode remote terminal as described in FIG. 2 having service specific interface modules attached.

Referring next to FIG. 9, a block diagram illustrating a remote terminal 900 (multi-mode remote terminal) as initially described in the embodiment of the present invention shown in FIGS. 1 and 2. The remote terminal 900 is a radio system and includes outdoor unit (ODU) 902 (also referred to as a transceiver unit) having an antenna 904. The remote terminal 900 also includes an intrafacility link (IFL) 906 and an indoor unit (IDU) 908 (also referred to as a channel processing unit). The indoor unit 908 contains a maintenance port 910, multi-transport mode cell bus 912, 4 service specific interface modules 914 (SSI modules), and a channel and control module 916 (CCM). The channel and control module 916 includes: an IF-transceiver section 918 and a baseband section 920. The IF-transceiver section 918 includes an IFL interface 922, upconverter 924 and downconverter 926. The baseband section 920 includes a multi-modulation modem 928, a bus controller 930, a control processor 932, and control signals 934.

The outdoor unit 902 (transceiver unit) communicates with the indoor unit 908 (channel processing unit) via the intrafacility link 906. The IF-transceiver section 918 is coupled to the intrafacility link 906 via the IFL interface 922. The upconverter 924 and downconverter 926 are coupled between the multi-modulation modem 928 and the IFL interface 922. The bus controller 930 is coupled to the multi-modulation modem 928 and the multi-transport mode cell bus 912. The multi-transport mode cell bus 912 is also coupled to the 4 SSI modules and the control processor 932. The control processor 932 is coupled to the maintenance port 910 and sends control signals 934 to the IFL interface 922, upconverter 924 and downconverter 926.

In practice, the remote terminal 900 comprises two subsystems; the outdoor unit 902 and the indoor unit 908. The outdoor unit 902 is an integrated unit having an antenna, up converter power amplifier and down converter, all of which are known in the art. The antenna is a circular antenna with a protective raydome. The outdoor unit 902 of the remote terminal 900 communicates through the antenna 904 to the outdoor unit of the hub terminal through the 38 GHz radio frequency communications channel. Thus, the outdoor unit 902 functions is a transceiver unit. There are two transmit bands for the transmit function of the outdoor unit 902. The low band is from 38.6 to 38.95 GHz and the high band is from 38.95 to 39.3 GHz. The receive bands for the outdoor unit 902 are low band at 39.3 to 39.65 GHz and the high band from 39.65 to 40.0 GHz. The outdoor unit 902 receives its timing reference from the hub terminal over the air interface. Signals are received and then downconverted to the intermediate frequency (IF) for transmission on the intrafacility link 906 (IFL) to the indoor unit 908. The intrafacility link 906 is a single cable, such as a type 3 VSAT cable made by Comscope, that is a low loss cable. The IFL 906 that supports up to 1000 feet.

The intrafacility link 906 carries the following: DC power to the outdoor unit 902 from the indoor unit 908, transmit data at the intermediate frequency, receive data at the intermediate frequency, a reference frequency and telemetry. The IFL link 906 occupies bandwidth for the uplink and downlink of 12.5 MHz in each direction, centered at 160 MHz and 70 MHz respectively.

The indoor unit 908 of the remote terminal 900 is typically mounted inside the subscriber premises, typically within a wiring closet. The indoor unit 908 consists of the following modules: the channel and control module 916 (CCM), SSI modules 914 and backplane power supply unit (not shown) and chassis (not shown). It is a stand alone unit that houses up to four service specific interface modules 914 (SSI modules). The indoor unit 908 is powered by 110 volt AC input. An optional 48 volt DC input can be included. The channel and control module 916 consists of an IF transceiver section 918 and a digital baseband section 920. The IF transceiver section 918 contains an IFL interface 922, an upconverter 924, a downconverter 926, while the digital baseband section 920 contains the multi-modulation modem 928, the bus controller 930 and the control processor 932. The multi-transport mode cell bus 912 (or SSI bus) provides the connection to the four SSI modules 914, the control processor 932 and the bus controller 930.

The IF-transceiver section 918 of the CCM 916 supports one 12.5 MHz subchannel carrying QPSK, 16-QAM or 64-QAM modulation. The upconverter 924 is in the transmit path to the outdoor unit 902 via the intrafacility link 906. The upconverter 924 receives the modulated data from the multi-modulation modem 928, converts it to analog, filters it and shifts it in frequency. The downconverter 926 receives the signal from the outdoor unit 902, filters it, provides automatic gain control, converts the signal into a digital signal, then carries the signal to the multi-modulation modem 928. The IFL interface 922 functions as a multiplexer, which allows multiple signals to be carried between the indoor unit 908 and the outdoor unit 902 on a single coaxial cable. The purpose of the IFL interface 922 is to separate the signals coming from the outdoor unit 902 to their respective circuits in the indoor unit 908. It also combines the signals coming from the indoor unit 908 onto the coaxial cable going toward the outdoor unit 908. The signals sourced by the indoor unit 908 are the synthesizer reference, DC power, telemetry, and transmit intermediate frequency. The signals received by the indoor unit are the receive intermediate frequency and telemetry. The components and implementation of the IF-transceiver section are well known in the art.

The main functions of the channel and control module 916 of the digital baseband section 920 are as follows: modem functions, air frame formatting, air interface protocol, internal SSI bus interface and multiplexing, maintenance port, control processing, SSI monitoring as well as control and operations administration and management functions.

The multi-modulation modem 928 is implemented as an ASIC (Application Specific Integrated Circuit), which includes the modulation, demodulation, air frame formatting air interface protocol, and the Reed Solomon encoder/decoder functions. The multi-modulation modem 728 supports TDMA burst types using QPSK and 16-QAM and 64-QAM on a burst-by-burst basis. The demodulator also contains a tracking section to compensate for multi-path conditions in 16-QAM and 64-QAM. The modulator houses the proper air frame formatting logic. The multi-modulation modem 928 is described in further detail with reference to FIG. 11.

The control processor 932 is a reduced instruction set code (RISC) processor and acts as the host processor of the indoor unit 908. The control processor 932 is the controller of the major functions of the indoor unit 908, such as configuration, alarm monitoring, and messaging back to the element management system (EMS) via the over the air control channel (the overhead section of FIG. 8). The control processor 932 also sends control signals, as known in the art, to the IF-transceiver section 918 to for gain control. The maintenance port 910 can be connected to customer provided modem devices for remote access to the remote terminal by the operator over a plain old telephone service (POTS) circuit. The status of the remote terminal 900 can be uploaded and reset through this interface.

The bus controller 930 is a field programmable gate array (FPGA) or custom logic. The bus controller 930 removes the overhead section from the air interface frame format once demodulated and reinserts an intermodule communication section (IM-Com) on the multi-transport mode bus 912 used for messaging between the bus controllers (e.g. formatters) and local processors (e.g. CPUS) of the SSI modules. The IM-Com message section is discussed further with reference to FIGS. 15 and 16. Thus, as described above, the bus controller 930 maps the traffic from the air interface frame format of FIG. 5 to the multi-transport mode bus frame format of FIG. 15. The bus controller 930 also maps the traffic on the multi-transport mode bus frame format of FIG. 15 to the specific burst types of FIGS. 7A and 7B for the air interface frame format of FIGS. 5 and 6. With regard to the air interface frame format, the overhead section is used for messaging between the channel and control modules 920 of the remote terminal 900 and the channel and control module of the hub terminal (described in FIG. 14). The space available on the frame format after the airframe format overhead section is removed is used advantageously for the messaging, i.e. the IM-Com section, between the channel and control module 920 of the remote terminal and the local processors of the SSI modules. The bus controller 930 also contains the time plan of the air interface frame format and the multi-transport mode cell bus 912. The air interface frame format is described above in FIGS. 4–8 and the multi-transport mode cell bus is described below with reference to FIGS. 15 through 18.

The remote terminal 900 carries both synchronous (TDM) and asynchronous (ATM) traffic on the multi-transport mode cell bus 912. The cell bus format is mapped to an air interface frame format using the bus controller 930. The details of how the different types of traffic are formatted for the same cell bus frame format are described below with reference to the SSI modules below.

Note that the ATM and TDM traffic on the air interface frame format have been routed through the remote terminal 900 without distinguishing the traffic as being mixed. The mixed traffic on the air interface frame format is mapped directly to the multi-transport mode bus frame format to be sent out of the remote terminal 900 to the SSI modules 914. The SSI modules 914 will distinguish the ATM traffic from the TDM traffic. Advantageously, the remote terminal 900 does not have to sort the mixed traffic. The remote terminal 900 transports the traffic using a unique air interface frame format and a unique corresponding multi-transport mode bus frame format to carry the mixed traffic (ATM and TDM) within the same radio system. Again, this departs from a radio system within a point to multipoint system that actually requires separate radio systems for each transport mode (ATM and TDM).

Note that not all of the functional blocks of the remote terminal are not described in further detail. Their operation and implementation is understood to those in the art.

Figure 10:
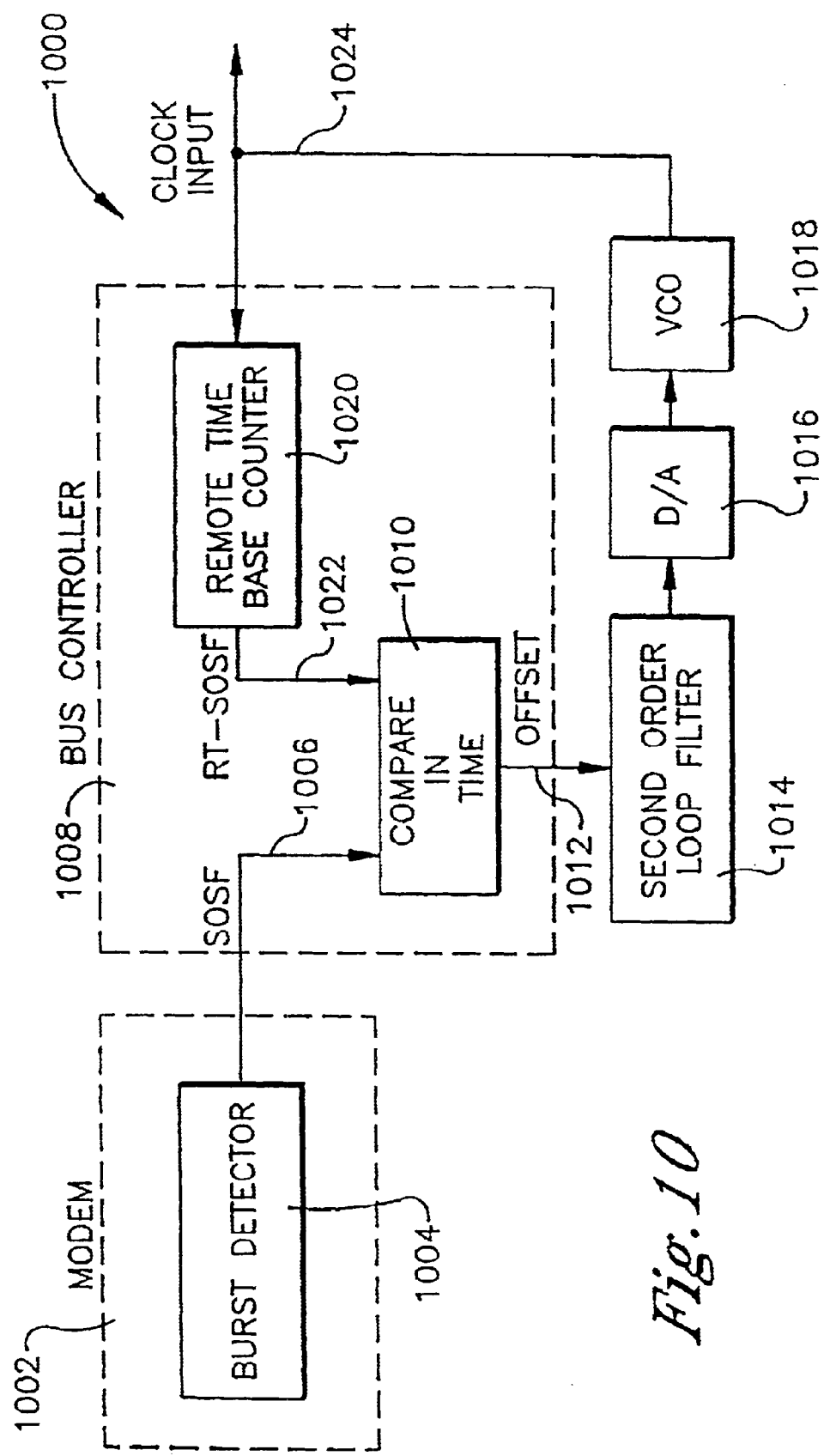
FIG. 10 is a functional block diagram of a timing recovery system used in the multi-mode remote terminal of FIG. 9 to recover the timing sent from the multi-mode hub terminal of FIG. 2.
Figure 14:
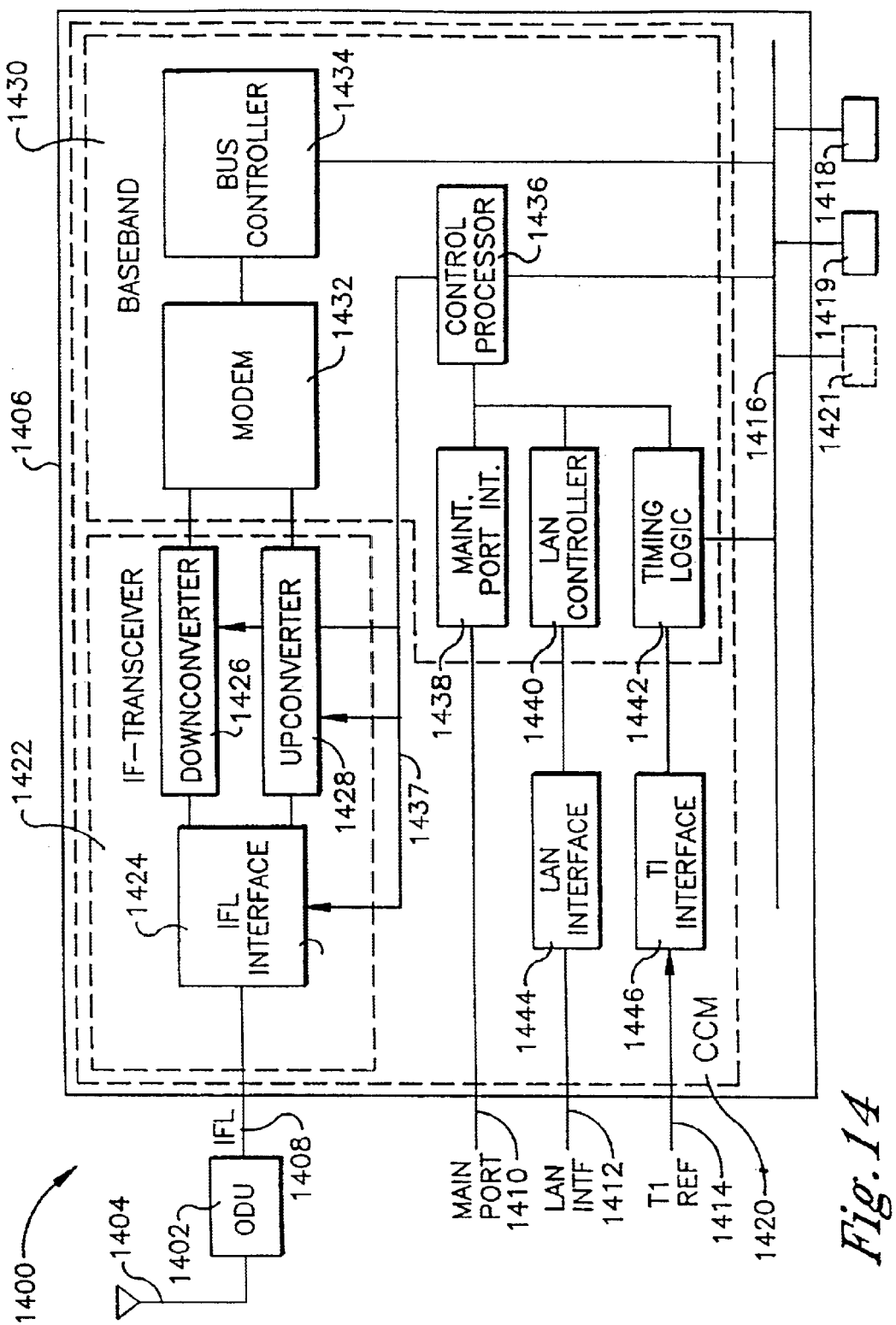
FIG. 14 is a functional block diagram of a multi-mode hub terminal as described in FIGS. 2 and 13 having service specific interface modules attached.

Referring next to FIG. 10, a functional block diagram of a timing recovery system used in the remote terminal of FIG. 9 to recover the timing sent from the hub terminal of FIGS. 2 and 14 is shown. The diagram 1000 includes the multi-modulation modem 1002 having a burst detector 1004; bus controller 1008 having a compare in time unit 1010 and a remote time base counter 1020; and a second order loop filter 1014, digital to analog converter 1016 (D/A converter), and a voltage controlled oscillator 1018 (VCO). Also shown are a start of superframe signal 1006, remote start of superframe signal 1022, timing offset signal 1012, and a clock input 1024.

The burst detector 1004 of the multi-modulation modem 1002 is coupled to the compare in time unit 1010, which is coupled to the second order loop filter 1014. The second order loop filter 1014 is coupled to the D/A converter 1014, which is coupled to the VCO 1018, which is coupled to the remote time base counter 1020. The remote time base counter 1020 of the bus controller 1008 is coupled to the compare in time unit 1010 of the bus controller 1008.

In practice, the remote terminals in the point to multipoint system recover the timing from the signals sent over the air interface by the hub terminal. Thus, the remote timing recovery is a way in which the remote terminal is able to recover the timing from the hub terminal. This timing recovery is necessary so that the indoor unit of the remote terminal can correctly demodulate bursts received from the hub terminal. Thus, no timing rate adaptation by the modem is needed for the timing at the remote terminal and the hub terminal. The timing at the remote terminal has the same frequency and phase as the timing at the hub terminal.

Furthermore, the remote terminal uses the recovered timing to transmit air bursts back to the hub terminal. Thus, advantageously, the hub terminal does not need to recover the remote timing to demodulate a burst from the remote terminal. The hub terminal only has to locate the start of the burst. Thus, there is no additional timing recovery at the hub terminal.

The remote terminal of FIG. 9, thus, uses the timing recovery system shown in FIG. 10 to recover the timing from the hub terminal. This is unique in that the timing is being recovered from a discontinuous transmission (i.e. TDMA), as opposed to a continuous transmission, from the hub terminal to the remote terminal. Thus, the hub terminal may not transmit in all timeslots in order to reduce interference or the remote terminal may be located far away from the hub terminal and may only be able to decode certain the lowest order modulated bursts (e.g. QPSK in this embodiment). Recovering the timing from a discontinuous transmission creates problems since timing is measured once per. superframe and large amounts of error accumulate in between, whereas in a continuous transmission, the timing is measured much more often and with less error between measurements.

The timing used at the hub terminal must be a very stable clock signal, such as a stratum-1 source, as known in the art, and is further discussed with reference to FIG. 13. Stratum-1 timing sources are very expensive and the point to multi-point eliminates having a separate stratum-1 source at the remote terminals, by recovering the hub terminal timing over the air interface. Therefore, the timing at the remote terminal is very accurate and stable as well.

The timing recovery is done using a phase lock loop circuit (PLL). The hub terminal transmits the first burst of every superframe in farthest reaching modulation (e.g. QPSK in this embodiment) and places a start of superframe sync word in this bursts preamble. The burst detector 1004 of the multi-modulation modem 1002 detects the start of superframe sync word and generates a start of superframe signal 1006 sent to the compare in time unit 1010. The burst detector 1004 corresponds to the burst detector and parameter estimator 1146 in FIG. 11. The remote time base counter 1020 generates a remote start of superframe signal 1022 once every superframe which is also sent to the compare in time unit 1010.

The compare in time unit 1010 counts the time offset in between the start of superframe signal 1006 and the remote start of superframe signal 1022. The time offset is sent as the timing offset signal 1012 to the second order loop filter 1014 (which is located in the control processor in the channel and control module of FIG. 9). At the second order loop filter 1014, a second order phase lock loop algorithm is run on the timing offset signal 1012. The second order loop filter 1014 slows down the filtering needed to accurately recover the timing in the discontinuous transmission, thus compensating for error in the discontinuous measurements. A timing recovery in a continuous transmission does not use a second order loop filter 1014. The use of a second order loop filter 1014 is unique in this application. The second order loop filter 1014 then outputs a digital number that gets translated to a voltage level by the D/A converter 1016. This voltage controls the VCO 1018. The output of the VCO 1018 is the clock input 1024, or the timing used at the remote terminal. The clock input 1024 is also fed back into the remote time base counter 1020 which is used to generate the remote start of superframe signal 1022. This timing (clock input 1024) is also distributed to all SSI modules to be used as their stable clock source.

Thus, advantageously, the remote terminal of the point to multipoint system recovers the timing sent from the discontinuous transmission of the hub terminal. A prior art point to multipoint system has its own timing source at the remote terminals and the transmission is continuous in the downlink. Furthermore, since the remote uses the same timing as the hub terminal, the hub terminal does not have to perform a separate timing recovery to demodulate the bursts received from the various remote terminals.

The various components and second order phase locked loop algorithms are known to those skilled in the art; and thus, no further explanation is needed.

Multi-Modulation Modem

Referring next to FIG. 8, a functional block diagram is shown for the multi-modulation modem of the indoor units of the remote terminal of FIG. 7 and the hub terminal of FIG. 10. The multi-modulation modem 1100 includes a modulator 1102 and a demodulator 1104. The modulator 1102 includes: transmit data 1106, transmit buffer interface 1108, scrambler 1110, Reed-Solomon encoder 1112, and a modulation selector unit 1114 including a byte-to-symbol converter 1116, burst formatter 1118 and constellation lookup 1120. The modulator 1102 also contains a pulse shaper 1122, halfband filter 1124, ramper 1126, linearizer 1128, IF modulator 1130, sinc distortion compensation filter 1132, and the transmit IF 1134. The demodulator 1104 includes: receive IF 1136, matched filter and downconverter 1138, an acquisition section 1140 including a precorrelation filter 1144 and burst detector and parameter estimator 1146. The burst detector and parameter estimator 1146 outputs a gain estimate signal 1148, timing estimate signal 1150, phase estimate signal 1152 and frequency offset estimate signal 1154. The demodulator 1104 also contains a tracking section 1142 including an automatic gain control 1156 (AGC), equalizer and phase rotator 1158, multi-modulation slicer 1160, and a carrier recovery loop 1162. Also shown in the demodulator 1104 is the coefficient memory 1164, symbol to byte converter 1166, Reed-Solomon decoder 1168, descrambler 1170, and output buffer 1172.

The multi-modulation modem is an application specific integrated circuit (ASIC) especially created to perform burst-by-burst modulation using three different modulations: QPSK, 16-QAM, and 64-QAM. The multi-modulation modem 1100 is not limited to these modulations, but could be configured to support BPSK, 32-QAM, 128-QAM, and 256-QAM modulations, for example. Advantageously, the multi-modulation modem is able to switch between modulations on a burst-by-burst basis. Alternatively, the multi-modulation modem could be configured to switch modulations on a frame-by-frame basis. The multi-modulation modem 1100 creates the air interface frame format as described in FIGS. 4–8 above. Thus, the multi-modulation modem switches between differently modulated traffic bursts and different types of traffic bursts. Advantageously, this enables a single hub terminal of the point to multipoint system to communicate with all of the remote terminals in its particular sector regardless of which region the remote terminal is located. Additionally, this enables efficient use of the available bandwidth since communications with remote terminals that are radially closer to the hub terminal can be accomplished using a modulation mode that requires less bandwidth (such as 64-QAM) than a modulation mode for a remote terminal located farther away (such as QPSK). Furthermore, the same multi-modulation modem 1100 can be used at the remote terminal and the hub terminal.

The multi-modulation modem 1100 has two main systems: the modulator 1102 and the demodulator 1104. The modulator 1102 operates at up to 10 Mbaud (or 10 Msps) with a design goal of 12.5 Baud. The IF center frequency is two times the baud rate, or 20 MHz nominal. As transmit data 1106 enters the modulator from the bus controller of the indoor unit (see FIGS. 9 and 14), it is input through a transmit buffer interface 1108. The transmit buffer interface 1108 is a ping-pong buffer allowing back to back bursts. Next, the data is scrambled for energy dispersion by the scrambler 1110. The scrambler is coupled to the Reed-Solomon encoder 1112 in which encodes the data. The Reed-Solomon encoder 1112 is coupled to the byte-to-symbol converter 1116 of the modulator selector unit 1114.

The modulation selector unit 1114 is the component of the multi-modulation modem 1100 that enables the multiple modulations to be used. The symbol-to-byte converter 1116, which is coupled to the burst formatter 1118. The byte-to-symbol converter 1116 is programmable and converts the bytes to modulation symbols needed for the particular modulation each burst will be modulated with (e.g. QPSK, 16-QAM, and 64-QAM). The burst formatter 1118 is coupled to the constellation lookup 1120. The burst formatter 1118 formats the symbols to a burst type, such as a quad burst or a single burst as discussed in FIGS. 7A and 7B. A preamble and post-amble can be appended to the burst by the burst formatter 1118 as well. The constellation lookup 1120 is programmable and formats the burst according to one of the three constellations it is configured for: 4 (QPSK), 16 (16-QAM), or 64 (64-QAM). The constellations are programmable and are not limited to square constellations. Constellations such as multi-level circular 64 point constellations may be used. Thus, advantageously, the modulation selector unit 1114 can format the bursts using a plurality of modulations on a burst-by-burst basis. This represents an improvement over the prior art modems which only modulate using one modulation.

Next, the symbols are passed through a programmable pulse shaper 1122, such as a root-raised cosine filter, which interpolates the signal. Next, the signal goes through the halfband filter 1124. The ramper 1126, which is a programmable ramp, applies a ramp at the start and end of the burst. The linearizer 1128 is coupled to the ramper 1126 and compensates for non-linear distortion. Next, the IF modulator 1130 modulates the signal to the intermediate frequency (IF). Next, the sinc distortion compensation filter 1132, which is an FIR filter, compensates for the sinc distortion as the transmit IF 1134 leaves the multimodulation modem 1100. The transmit IF 1134, alternatively, may go to a loopback for self-testing. The functional blocks of the modulator portion 1102 all receive burst and timing control signals and a table access interface couples to the transmit buffer interface 1108, burst formatter 1118, constellation lookup 1120, ramper 1126, and linearizer 1128. The transmit IF 1134 is destined for the IF-transceiver section of the indoor units of the remote terminals and the hub terminals (see FIGS. 9 and 14).

The demodulator 1104 is fed the complex bandpass signal samples or the receive IF 1136. These samples are filtered using a matched filter and downconverter 1138. The output of the matched filter and downconverter 1138 is a complex baseband I/Q signal. The demodulator is divided into two sections, the acquisition section 1140 and the tracking section 1142. The downconverted samples are sent to both of these sections.

The acquisition section 1140 consists of the precorrelation filter 1144 and the burst detector and parameter estimator 1146. The bursts received are one of two types: maintenance bursts (overhead) and traffic bursts. At the start of the maintenance bursts, the precorrelation filter 1144, which is an FIR filter, is loaded with default coefficients from the coefficient memory 1164. The default coefficients are default interpolation coefficients from the coefficient memory 1164. When the precorrelation filter 1144 has default coefficients, the burst detector and parameter estimator 1146 will provide the true timing offset as seen by the demodulator 1104. This timing estimate is sent as timing estimate signal 1150 to the equalizer and phase rotator 1158. The timing estimate is used by the equalizer and phase rotator 1158 of the tracking section 1142 to select a set of interpolator coefficients. These interpolation coefficients are for all possible timing offsets for the different channels (for each remote terminal) are then stored in the coefficient memory 1164 to be used for the following traffic bursts received from the different channels.

At the start of a traffic burst, the precorrelation filter 1144 is loaded with the coefficients present in the coefficient memory 1164 (determined from the maintenance bursts). This enables the burst detector and parameter estimator 1146 to provide better estimates of the parameters as the samples arriving at the burst detector and parameter estimator 1146 have been equalized for channel distortion. In the coefficient memory 1164, a separate set of interpolator coefficients is stored corresponding to each channel that each remote terminal communicates through. Thus, the precorrelation filter 1144 is loaded with the coefficients belonging to the remote terminal (or hub terminal) that the traffic burst originated.

This is a departure form the prior art in that a prior art demodulator does not typically contain a precorrelation filter at all. The I/Q signal is simply sent to a burst detector. Furthermore, the precorrelation filter is loaded with coefficients in a unique way to enable more accurate estimation of the parameters (timing, gain, frequency offset, and phase) at the burst detector and parameter estimator 1146 since the channel has been equalized for distortion.

Thus, the maintenance bursts for respective remote terminals go through the precorrelation filter 1144 with default coefficients (non-equalized) in order to select equalized coefficients, for each respective remote terminal, which are loaded back into the precorrelation filter 1144 as traffic bursts are received from each respective remote terminal. The equalized coefficients are selected based on the timing offset for the maintenance burst. This process enables the burst detector and parameter estimator 1146 to obtain better parameter estimates of the traffic bursts of the burst detector and parameter estimator 1146 since the respective channels have been equalized prior to entry into the burst detector and parameter estimator 1146 by the precorrelation filter 1144 being preloaded with respective interpolation coefficients.

The output of the precorrelation filter 1144 then goes to the burst detector and parameter estimator 1146 which detects the unique word of the preamble to signify a burst is present. The burst detector can detect the start of a burst or the start of a frame or superframe. This ensures that the demodulator 1104 will know when the start of the air interface frame format is. Once a burst is detected, the initial parameters are estimated including the timing offset, gain estimate, phase estimate, and frequency offset estimate. FIG. 11 shows the details of how the frequency offset and phase offset is determined with the use of the split preamble as shown in FIG. 6. The burst detector and parameter estimator 1146 then sends out the following signals: gain estimate signal 1148 to the automatic gain control 1156, timing estimate signal 1150 to the equalizer and phase rotator 1158, frequency offset estimate signal 1154 and phase estimate signal 1152 to the carrier recovery loop 1162.

At the tracking section 1142, the downconverted symbols are sent to the automatic gain control 1156. Using the initial gain estimate from the gain estimate signal, the automatic gain control 1156 (AGC) measures the power of the received I/Q samples and compares them to a programmable threshold level to generate the instantaneous power level. This instantaneous power error is filtered with a non-linear filter (within the AGC 1156) and then used to close a negative feedback loop which drives the received signal power level to the programmable threshold level.

The I/Q outputs from the AGC 1156 are then fed into the equalizer and phase rotator 1158. The equalizer of the equalizer and phase rotator 1158 minimizes the intersymbol interference generated by the non-ideal phase/amplitude response of the channel. Also, the equalizer and phase rotator 1158 is loaded with coefficients in two different ways depending on the burst types. During the maintenance burst, the equalizer of the equalizer and phase rotator 1158 is loaded with interpolator coefficients stored in the coefficient memory 1164. The timing estimate provided by the acquisition section 1140 is used to select a set of interpolator coefficients stored in the coefficient memory 1164. The equalizer then tracks the channel variations, and at the end of the burst, the equalizer coefficients are stored back in the coefficient memory 1164. Only the coefficients corresponding to the remote terminal to which the burst belongs will be updated. During the traffic burst, the equalizer gets loaded with the coefficients used by the precorrelation filter 1144. Thus, the equalizer and the precorrelation filter 1144 will be working on the same set of coefficients.

The equalizer coefficients are adapted using the least mean square algorithm (LMS). Other alogrithms, such as recursive least squares (RLS) could also be used. The equalizer can have only feed-forward coefficients or have both feed-forward and feed-back coefficients. Furthermore, the feed-forward coefficients can be fractional or symbol based.

The carrier recovery loop 1162 tracks the phase and frequency of the suppressed carrier quadrature amplitude modulation (QAM) signal. Thus, the demodulator can support both QAM and QPSK modulations. At the start of tracking for each burst, the carrier recovery loop 1162 is loaded with the phase estimate signal 1152 and the frequency offset signal 1154 provided in the acquisition section 1140. The carrier recovery loop 1162 tracks the phase and frequency using a second order phase lock loop. The phase error is obtained using the input to the multi-modulation slicer 1160 (output of the equalizer and phase rotator 1158) and the output of the multi-modulation slicer 1160. The output of the carrier recovery loop 1162 is then sent back to the equalizer and phase rotator 1158 in order to rotate the output prior to being sent to the multi-modulation slicer 1160. Also, this phase is used to de-rotate the error used to update the equalizer coefficients. The equalizer error is also obtained with the multi-modulation slicer 1160 input and output.

The multi-modulation slicer 1160, which is programmable, converts the equalizer and phase rotator 1158 output to demodulated bits. Thus, the multi-modulation slicer 1160 maps the received data to one of the three constellations (4, 16, and 64 points) which correspond to one of the three modulations modes (QPSK, 16-QAM, and 64-QAM, respectively). Additionally, the multi-modulation slicer 1160 supports variants of the 64-QAM modulation, such as multi-level circular constellations. Thus, the multi-modulation slicer 1160 enables the multi-modulation capabilities of the multi-modulation modem 1100. The multi-modulation slicer 1160 is analogous to the constellation lookup 1120 of the modulator 1102.

Additionally, the output of the multi-modulation slicer 1160 is converted from symbols to bytes by the symbol-to-byte converter 1166. The symbol-to-byte converter 1166 supports three constellations, one for each modulation mode used by the modulator portion 1102. The output of the symbol-to-byte converter 1166 is sent to the Reed-Solomon decoder 1168 to be decoded. The data then goes to a descrambler 1170 which undoes the scrambling inserted by the scrambler 1110 of the modulator 1102. The descrambled data bytes are then loaded into the output buffer 1172. The output buffer 1172 is a ping-pong buffer, so that while one buffer is being written to by the demodulator 1104, the other is being read by the baseband interface to the bus controller. This enables back to back bursts at the output buffer 1172. Thus, the output data 1174 is the signal output from the multi-modulation modem 1100 going to the bus controller of the digital baseband sections of the remote terminal and the hub terminal (see FIGS. 9 and 14).

It is also important to note that a table access interface provides the information about the frame formats and burst types associated with each of the modulations used by the multi-modulation modem 1100 and is coupled to the transmit buffer interface 1108, burst formatter 1118, constellation lookup 1120, ramper 1126, linearizer 1128, burst detector and parameter estimator 1146, and output buffer 1172.

The demodulator 1104 is controlled via a series a registers within a host interface. The registers are written to by a host microprocessor, i.e. the control processor of the remote terminals and hub terminals. Furthermore, the real time control of the demodulator 1104 is done by provided burst and timing controller logic.

Note that not all of the functional blocks have been fully described since their function and implementation are understood to those skilled in the art; thus, no further explanation is needed.

As shown, the multi-modulation modem 1100 advantageously modulates and demodulates a plurality of modulation modes on a burst-by-burst basis. The multi-modulation modem 1100 is able to switch modulations and switch burst types accordingly. The multi-modulation modem 1100 is implemented as an application specific integrated circuit (ASIC) as a single modem unit. Furthermore, it is designed so that it can be used at the remote terminals and the hub terminals of the point to multipoint system. The multi-modulation modem can be programmed to only demodulate certain modulation modes if the multi-modulation modem 1100 is to be used at a specific remote terminal within a specific region of a sector.

Alternatively, the multi-modulation modem 1100 could be implemented as three separate modems each supporting a single modulation and providing a switching means between each of the three separate modems. Regardless, the multi-modulation modem 1100 is a departure from prior art modems that support a single modulation and enables the multi-modulation aspect of the point to multipoint system of the embodiment shown in FIGS. 1 and 2.

Referring next to FIG. 12, a functional block diagram is shown of a parameter estimation performed in the multi-modulation modem of FIG. 11 and using the split preamble feature shown in FIG. 6. The frequency offset estimator 1200 includes the I/Q signal 1202 from the precorrelation filter (in FIG. 11), a first correlator 1204, delay buffer 1206, second correllator 1208, first phase estimator 1212, second phase estimator 1210, adder 1214, scaler 1216, and the frequency offset estimate 1218.

The I/Q signal 1202 enters the first correlator 1204 which is coupled to the delay buffer 1206 and the first phase estimator 1212. The delay buffer 1206 is coupled to the second correlator 1208 which is coupled to the second phase estimator 1210. The output of the first phase estimator 1212 and the second phase estimator 1210 is coupled to the adder 1214 which is coupled to the scaler 1216. The scaler 1216 outputs the frequency offset estimate 1218.

In practice, the embodiment reflected in FIG. 12 provides an accurate frequency offset estimate using the split preamble shown in the traffic burst of FIG. 6. The traffic burst has been optimized to have specified sizes so that differently modulated traffic bursts can be mixed and matched on the air interface frame format of FIG. 5. However, in order to maximize the traffic throughput of each individual traffic burst, it is desirable to have as small a preamble for each traffic burst as possible. In prior art demodulators, the preamble is used to estimate the frequency offset of the received traffic burst. Specifically, a unique word is typically inserted into the preamble. The phase is estimated over the length of the unique word portion of the preamble in order to determine the frequency offset. The length of the unique word may be, for example, about 32 symbols or 40 symbols. This symbol length should yield an accurate phase estimate to give an accurate frequency offset. If the unique word is considerably longer, the estimate will not be as accurate since the phase will change too much over the length of the unique word. If the unique word is much shorter, the phase estimate will not be accurate since the symbol interval is too short to accurately estimate the phase.

The embodiment shown in FIGS. 6 and 12 solves this problem by splitting the unique word into a first unique word 610 and a second unique word 611 with data (traffic) and or spares in between (the first data/spare section 612 as shown in FIG. 6). The first data/spare section 612 separates the first unique word and the second unique word by a number of symbols defined as a preamble split length 613. The first unique word 610, the second unique word 611 and the first data/spare section 612 in between comprise an overall length equal to a typical unique word. Thus, two shortened unique words with data in between replace the prior art unique word; therefore, a shorter unique word is used in the preamble and the traffic throughput of the traffic burst is increased by the amount of symbols in between. As an example, a 32 symbol unique word can be replaced by an 8 symbol first unique word, 16 symbols of data, and an 8 symbol second unique word. Also, there is no requirement that the first unique word be equal in length to the second unique word. For example, the second unique word could be 16 symbols while the first unique word is 8 symbols.

As the I/Q signal 1202 (complex baseband) enters the burst detector and parameter estimator 1146 of the demodulator, it enters a first correlator 1204. The first correlator 1204 then looks for the first unique word. For example, if the first unique word is 8 symbols, the first correlator 1204 detects the first unique word comprising 8 symbols and then sends the I/Q output for the first unique word to the first phase estimator 1212. The correlation is done at the symbol rate so that every other sample is ignored. The first correlator is really two correlators, one for the in-phase component samples (I) and one for the quadrature component samples (Q). Correlators are well known in the art; thus, no further explanation is needed.

The I/Q signal also goes to the delay buffer 1206 which accounts for the number of symbols in the first data/spare section in between the first unique word and the second unique word. The delay buffer 1206 stores the 16 symbols of the first data/spare section. The second correlator 1208 then looks for the second unique word (e.g. 8 symbol unique word) and sends the I/Q signals for the second unique word to the second phase estimator 1210. The second correlator 1208 is also really two correlators. The first phase estimator 1212 and the second phase estimator 1210, each estimate the phase for the first unique word and the second unique word, respectively. The difference is taken between the two phases at the adder 1214 and is scaled by the scaler 1216 to produce the frequency offset estimate 1218. The scaler 1216 divides the phase difference by the distance between middle of the first unique word and the second unique word. For example, the distance in the example would be 4 symbols+16 symbols of data+4 symbols=24 symbols. The symbols are multiplied by the symbol rate to get the distance. This is a departure from a prior art frequency estimator which only contains one correlator, not a first correlator 1204 and a second correlator 1208.

Thus, the frequency offset estimator 1200 uses the unique split preamble shown in FIG. 6 to estimate a frequency offset in a small preamble that approximates the Cramer-Rao bound with as little as 16 symbols total between the first unique word and the second unique word. The traffic throughput is maximized while retaining accurate frequency estimation. The functional blocks are understood to those skilled in the art; thus, no further explanation is needed.

Hub Terminal Site

Referring next to FIG. 13, a block diagram is shown for the hub site of the embodiment of the point to multipoint system shown in FIG. 2. The hub site 1300 has a radio subsystem 1301 including hub terminals 1302, each having a main outdoor unit (ODU) 1304 and antenna 1306, backup outdoor unit 1308 and antenna 1310, intrafacility link (IFL) 1312, main indoor unit (IDU) 1314, and backup indoor unit 1316. Also shown are transmission equipment 252 system including a TDM multiplexer 1318, ATM multiplexer 1320 and timing source 1322. Also shown are DS3 lines 1324 (digital signal 3) and OC3c lines 1326 (optical carrier level 3 concatenated), a LAN router 1328, a wide area network line 1330 (WAN line), backhaul lines 1332, and a timing reference signal 1334.

Each hub terminal 1302 (sector radio) includes a main outdoor unit 1304 having an antenna 1306 coupled to a main indoor unit 1314 via an intrafacility link 1312 (IFL). Also shown are the backup outdoor unit 1308 having an antenna 1310 coupled to the backup indoor unit 1316 via an intrafacility link 1312. The backup indoor unit 1316 (IDU) has the same connections as the main IDU 1314; thus, only the main indoor unit 1314 will be discussed. Each main indoor unit 1314 has one DS3 line 1324 to the TDM Multiplexer 1318 and one OC3c line 1326 to the ATM Multiplexer 1320. The TDM Multiplexer 1318 and the ATM Multiplexer 1320 each have backhaul lines 1332 allowing connection to a transport network (not shown). Each main indoor unit 1314 of each hub terminal 1302 is coupled to the LAN hub 1328 and the timing source 1322. The timing source 1322 sends the timing reference signal 1334 to each hub terminal 1302. The LAN router 1328 has an optional WAN line 930 to the EMS.

In practice, the hub site 1300 is the heart of the point to multipoint system. The hub site 1300 supports a multi-frequency, multi-sector hub. The radio channel is divided into subchannels. For example, a 50 MHz channel may be divided into 4 12.5 MHz subchannels. Each hub site 1300 supports one channel and each hub terminal 1302 supports one subchannel (sector). Furthermore, each sector ("pie slice" of FIG. 1) may contain more than one hub terminal 1302 depending on multiple channels at the hub site 1300 and the location of the remote terminals. Each hub terminal 1302 (sector radio) of the radio subsystem 1301 contains an outdoor unit 1304 having an antenna 1306, an intrafacility link 1312, and an indoor unit 1314.

The outdoor unit 1304 (also referred to as the transceiver unit) is an integrated 38 GHz transceiver and antenna 1306. The outdoor unit 1304 of the hub terminal 1302 is the same as the outdoor unit of the remote terminal as described in FIG. 9, except the transmit and receive bands are swapped with respect to the transmit and receive bands of the outdoor unit of the remote terminal. The outdoor unit 1304 upconverts the signals from the intrafacility link 1312 to the transmit frequency, and downconverts the signals from the air interface to the intrafacility frequency. It is typically located on the top of the building of the hub site 1300. Additionally, the outdoor unit 1304 may be connected to a surge protector at the entrance to the building.

Alternatively, since the hub terminal 1302 transmits using a discontinuous transmission (TDMA), the outdoor unit 1304 may include a switched beam antenna (not shown) as the antenna 1306, such that a switch is coupled to several antennas. Each antenna transmits to a narrow subsector, e.g. a 15–22 degree subsector. The switched beam antenna must switch between TDMA bursts of the air interface frame format. Thus, only one antenna transmits at a time, reducing interference in other sectors and hub terminals 1302. This also extends the range of the point to multipoint system by transmitting more energy/bit in a narrower beam than would be required for an antenna 1306 covering the entire sector. Thus, the magnitude of the multipath is reduced and the higher order modulations operate better. Similarly, a phased array antenna system would accomplish the same results.

The intrafacility link 1312 connects the outdoor unit 906 to the indoor unit 1314 and is the same as the intrafacility link 1312 used in the remote terminal and described in FIG. 9.

The indoor unit 1314 (channel processing unit) of the hub terminal 1302 is very similar to the indoor unit of the remote terminal. The indoor unit 1314 of the hub terminal 1302 also supports multiple transport modes, such as asynchronous (e.g. ATM) and synchronous (e.g. TDM), and supports multiple modulation modes, such as QPSK, 16-QAM, and 64-QAM. It interfaces the intrafacility link 1312 and includes the channel and command module (CCM) containing an IF-transceiver section, baseband section, multi-transport mode cell bus, and four SSI ports. The internal workings of the indoor unit 1314 of the hub terminal 1302 are similar to those of the indoor unit of the remote terminal and are further discussed with reference to FIG. 14. Advantageously, the indoor unit 1314 of the hub terminal 1302 uses the same multi-modulation modem as the indoor unit of the remote terminal. Thus, advantageously, only one multi-modulation modem ASIC needs to be designed for all of the hub terminals and remote terminals of the point to multipoint system.

Some differences between the indoor unit 1314 of the hub terminal 1302 and the indoor unit of the remote terminal are the types of SSI modules used in the SSI ports and there are a few additional interfaces in the indoor unit 1314 of the hub terminal 1302 (see FIG. 14). The indoor unit 1314 of the hub terminal 1302 only uses three types of interfaces to the transmission equipment: TDM-DS3 SSI module (see FIG. 21) to interface with the DS3 line 1324, ATM-OC3c SSI module (see FIG. 22) to interface with the OC3c line 1326, and DS3 transparent SSI module (see FIG. 24) to interface with the DS3 line 1324.

In this embodiment, each hub terminal 1302 uses a 1:1 redundancy system in the event there is a failure at one of the hub terminals 1302. If either the main outdoor unit 1304 or the main indoor unit 1314 fails, then the backup outdoor unit 1308 and backup indoor unit 1316 are switched into use. The interruption of service is slight to the subscribers. The backup outdoor unit 1308 and backup indoor unit 1316 are configured exactly as the main outdoor unit 1304 and main indoor unit 1314. The remote terminal of FIG. 9 also uses a 1:1 redundancy system.

Alternatively, the hub site 1300 may use a 1:N redundancy system as described in FIGS. 37–38.

The transmission equipment 252 is the same as described with reference to FIG. 2. The TDM multiplexer 1318 and ATM multiplexer 1320 are used to transport TDM and ATM traffic, respectively, to and from the transport network (not shown). Backhaul lines 1332 connect the TDM multiplexer 1318 and ATM multiplexer 1320 to the transport network and include DS3, OC3c, and OC12c lines, for example.

Additionally, a timing source 1322 provides a synchronization plan to the hub terminals 1302. It is important that the timing source be a very stable, accurate source , such as a stratum-1 level timing source, as known in the art, since the timing at the hub terminal 1302 is used at the remote terminals and the SSI modules coupled to the remote terminals. The timing source 1322 may be an external DS1 sourced reference (GPS-sourced or other DS1 reference), DS3 line, or a DS1 embedded in a DS3. The timing source 1322 is then used to derive the symbol rate for the radio interface of each hub terminal 1302. The timing reference is also referred to in FIG. 14. If the timing source is the DS1 within a DS3 (i.e. a T1 within a DS3), the timing is usually provided by the switches at the central office that is coupled to the transmission equipment 252 via the transport network (see FIGS. 1 and 2). In this case, if there is a drift in the timing due to an error condition at the central office, all of the hub terminals will drift as well, and no data will be lost.

Furthermore, a LAN router 1328 is provided to allow for communication between hub terminals 1302 at the hub site 1300 and for optional connection to a wide area network (WAN) via a WAN line 1330. In one embodiment, the element management system (EMS) 122 uses the WAN to communicate with each hub terminal through the LAN router 1328. The WAN line 1330 could be provided as an Ethernet 10BaseT line. Thus, the element management system can communicate with the hub terminals 1302 at the hub site 1300 through the LAN router 1328. The LAN router 1328 also allows the hub terminals 1302 to communicate with each other. Alternatively, the EMS can communicate with the hub terminal 1302 by sending messages through the transport network and backhaul lines 1323. This, advantageously, eliminates the need for a wireline connection from the EMS to the hub site 1300. This is further described with reference to FIG. 22.

The following is an overview of the traffic flow from the central office through the hub terminal. Traffic is routed by the element management system, which is located at the central office, to the hub site 1300 through a transport network, such as a SONET ring. The traffic arrives at the TDM multiplexer 1318 or the ATM multiplexer 1320 depending on the type of traffic. ATM traffic is routed to the desired hub terminal via the OC3c line 1326 while TDM traffic is routed to the desired hub terminal via the DS3 line 1324. The respective traffic is multiplexed onto a multi-transport mode cell bus at the individual SSI modules by the indoor units 1314. The multi-transport mode cell bus is discussed in FIGS. 15–18. The mixed traffic is then formatted for the radio interface and modulated to the intermediate frequency at the indoor unit 1304. The IFL 1312 carries the traffic to the outdoor unit 1304 where it is upconverted to the transmit frequency of the radio interface. Thus, the traffic is broadcast to the remote terminals within the antenna sector coverage of the outdoor unit 1304. The data flow is the opposite arriving at the outdoor unit 1304. Thus, the hub terminal 1300 of the present embodiment carries both ATM and TDM traffic, whereas prior art systems require separate infrastructures for ATM and TDM transport.

Another unique feature of the hub site is that the hub site is a modular hub site architecture. In a prior art point to multipoint system, when the hub site is created, the hub site architecture is designed as one chassis that includes cards for all of the different hub terminals that will be supported at the hub site. Each of the cards (for the hub terminals) shares a common processor, common SSI interface modules, common backplane interface, common power supply, etc., as known in the art. In other words, each of the hub terminals in a prior art system do not operate independently from the common equipment. Thus, to set up a hub site, the architecture must be set up for an entire system.

In contrast, in this embodiment of the present invention, a system designer can build a hub site with only one subchannel of a frequency channel by installing one modular hub terminal (i.e., hub terminal 1302) comprising one outdoor unit 1304 and one indoor unit 1314. The indoor unit is a small unit, that only has two cards that supports one subchannel. To add more subchannels, simply install another modular hub terminal for each subchannel into the chassis. The modular hub terminals do not have to share a common processor, common SSI interface modules, common backplane interface, or a common power supply. Therefore, the modular hub terminals (i.e., hub terminals 1302) operate independently of the other modular hub terminals and other common equipment. Thus, the architecture for an entire prior art point to multipoint system supporting an entire channel does not need to be installed to just create a hub site with as few as one subchannel.

This is particularly advantageous since the cost is very high to install a prior art point to multipoint system that only uses one subchannel of a frequency channel. In practice, many service providers will set up a point to multipoint system that only services one or two subchannels since many subscribers may be located very close to each other, or there are very few subscribers to the point to multipoint system, or there are physical barriers (e.g. a mountain) that prevent the use of many hub terminals (each using separate subchannels). Advantageously, the modular hub site allows the point to multipoint system to grow with the demand of the subscribers without forcing the service provider to pay for an entire point to multipoint system architecture supporting an entire channel initially.

In another embodiment, the lines to the backhaul lines 1332 could be replaced by a wireless communications link (not shown) from the transmission equipment 252 to the transport network (shown in FIGS. 1 and 2) or backhaul infrastructure. The wireless communications link could be a microwave radio communications link very similar to the communications link between the hub terminals 1302 and the respective remote terminals. An antenna, e.g. a first 12" antenna, is coupled to the transmission equipment 252 and a corresponding antenna, e.g. a second 12" antenna, is coupled to the transport network. This embodiment allows for a distance of about 5 to 10 miles between the hub site and the transport network.

Referring next to FIG. 14, a block diagram is shown for a hub terminal (multi-mode hub terminal) in the embodiment shown in FIGS. 2 and 13. The hub terminal 1400 contains an outdoor unit (ODU) 1402 (also referred to as a transceiver unit) having an antenna 1404 and an indoor unit (IDU) 1406 (also referred to as a channel processing unit). The indoor unit 1406 couples to an intrafacility link 1408, maintenance port 1410, local area network (LAN) interface line 1412, T1 reference line 1414, multi-transport mode cell bus 1416, TDM DS3 SSI module 1418, ATM OC3c SSI module 1419, optional DS3 transparent SSI module 1421, and a channel and command module 1420. The channel and command module (CCM) 1420 includes: an IF-transceiver section 1422 containing an intrafacility (IFL) interface 1424, upconverter 1426, and downconverter 1428; a digital baseband section 1430 containing a multi-modulation modem 1432, bus controller 1434, control processor 1436, control signals 1437, maintenance port interface 1438, LAN controller 1440, and timing logic 1442; and also a LAN interface 1444, and T1 interface 1446.

The outdoor unit 1402 is coupled to the indoor unit 1406 via the intrafacility link 1408 which is coupled to the IFL interface 1424 within the IF-transceiver section 1422 of the CCM module 1420. The IFL interface 1424 is coupled to the upconverter 1428 and the downconverter 1426. The upconverter 1428 and the downconverter 1426 are each coupled to the multi-modulation modem 1432 of the digital baseband section 1430. The multi-modulation modem 1432 is coupled to the bus controller 1434 which is coupled to the multi-transport mode cell bus 1416. The maintenance port 1410 is coupled to the maintenance port interface 1438 which is coupled to the control processor 1436. The LAN interface line 1412 is coupled to the LAN interface 1444 which is coupled to the LAN controller 1440. The T1 reference 1414 is coupled to the T1 interface 1446 which is coupled to the timing logic 1442 of the baseband section 1432. The maintenance port interface 1438, LAN controller 1440, and timing logic 1442 are each coupled to the control processor 1436. The timing logic and the control processor are also coupled to the multi-transport mode cell bus 1416. The control processor 1436 sends control signals 1437 to the IFL interface 1424, upconverter 1428 and downconverter 1426.

In practice, the indoor unit 1406 (IDU) of the hub terminal (sector radio) is very similar to the indoor unit (IDU) of the remote terminal. The components of the IF-transceiver 1422 are exactly the same as those described in FIG. 9. The multi-modulation modem 1432 of the hub terminal 1400 is the same multi-modulation modem as described in FIG. 11. Advantageously, the multi-modulation modem 1432 is capable of transmitting using multiple modulation modes on a burst-by-burst basis and supports QPSK, 16-QAM ,and 64-QAM as earlier discussed.

The bus controller 1434, control processor 1436, and multi-transport mode cell bus are also the same as those in the indoor unit of the remote terminal (see previous figures for details).

However, the control processor 1436 of the digital baseband section 1430 of the hub terminal 1400 is in regular contact with the element management system. Thus, the control processor 1436 makes all of the assignments of timeslots for traffic on the multi-transport mode cellbus 1416 and the air interface. It also creates the time plan that maps the DS0's from the SSI modules to the appropriate time slots of the multi-transport mode bus frame format and air interface frame format. The control processor 1436 instructs the service specific interfaces, such as the TDM DS3 SSI module 1418, when to transmit and copy traffic from the multi-transport bus (via a time plan) and what header information to assign the mixed traffic. The control processor 1436 uses the overhead messaging of the air interface frame format to communicate with the processors of the indoor units of the remote terminals.

The maintenance port 1410 is similar to the maintenance port of the indoor unit of the remote terminal. The maintenance port 1410 is used to support laptop PC serial port connection for maintenance and testing of the indoor unit 1406. The maintenance port 1010 uses a maintenance interface 1438, such as an RS 232 Port, to interface with the control processor 1436.

The LAN controller 1440 is not in the remote terminal and is a PCI bus-based controller that provides an interface to the element management system of the central office. The LAN interface 1444 interfaces with the LAN interface line 1412 which is typically an Ethernet 10BaseT line. The LAN interface line 1412 allows connection to a wide area network (WAN). The element management system uses the WAN to communicate with the LAN controller 1440. The element management system sends operations, administration, and management signals to the control processor 1436 of the CCM 1420. The LAN controller 1440 also allows the control processor 1436 to communicate with the control processors 1436 of other hub terminals 1400 at the same hub site.

The timing logic 1442 receives the timing reference source from a separate land based T1 (DS1) reference line 1414 through the T1 interface 1446 and translates it into the symbol rate to be used throughout the point to multipoint system. Thus, the timing logic 1442 creates the timing used all the way to the remote terminals, including at the SSI modules (see FIGS. 2025B) and fiber extender modules (see FIGS. 32–34) that are coupled to the remote terminals. Alternatively, the reference clocking at the hub terminal 1400 may come form several sources, including: a DS3 line clock retrieved from the DS3 TDM SSI Module or a DS3 transparent line source; DS1 source embedded in a DS3-TDM SSI module from either DS1 line 1 or line 28 of the DS3-TDM SSI module; an OC3c line clock recovered from the OC3c ATM SSI module; or a DS1 reference line 1414 as shown in FIG. 13.

The reference clocking at the hub terminal 1400 is transmitted to the remote terminals through the air interface. This is done by deriving the symbol rate clock at the timing logic 1442 from the input reference clock and then using the received symbol rate at the remote indoor unit to generate the required network interface clocks. It is important that the reference clocking transmitted match the landline clock stability and also meet the relevant jitter, wander, holdover, and clock traceability standards. Thus, the above mentioned sources of a reference clock should be a stratum-1 level or equivalent timing source in order to provide the stability needed for the point to multipoint system.

The control processor 1436 is a reduced instruction set code (RISC) processor that runs the channel and control module and coordinates the maintenance port 1410, LAN controller 1440, timing logic 1442, and multi-transport mode cell bus 1416. It also generates control signals 1437 which are sent to the IF-transceiver 1422 for gain control.

The multi-transport mode cell bus 1416 is a synchronous TDM cell bus that can transport both ATM and TDM traffic to and from the bus controller 1434 to the SSI modules. The multi-transport mode cell bus 1416 is described in more detail with reference to FIGS. 15–18. Advantageously, the multi-transport mode cell bus 1416 is an improvement over prior art bus systems that use one bus to transport ATM traffic and a separate bus to transport TDM traffic.

The indoor unit 1406 has four SSI ports, but only uses three SSI modules including a TDM-DS3 SSI module 1418, described with reference to FIG. 21, an ATM-OC3c SSI module 1419 described with reference to FIG. 22, and a DS3 transparent SSI module 1421 is described with reference to FIG. 23. The TDM-DS3 SSI module 1418 is for transporting TDM traffic through a DS3 line, which is 28 T1 lines (28 DS1s). The ATM-OC3c SSI module 1419 is for transporting ATM traffic through an OC3c line. The DS3transparent SSI module 1421 uses the entire bandwidth of the subchannel (sector), e.g. 12.5 MHz, to transport either asynchronous (e.g. ATM) or synchronous data (e.g. TDM) for point to point links within the point to multipoint system.

Multi-Transport Mode Cell Bus

Referring next to FIG. 15, a bus frame format is shown for the multi-transport mode cell bus that provides the interface between the channel and control module (CCM) of the indoor units of the hub terminals and the remote terminals shown in FIGS. 9 and 14 and the SSI modules shown in FIGS. 20–25B, and illustrates the relationship to the air interface frame format of FIG. 5. The diagram 1500 shows the multi-modulation modem 1502, bus controller 1504, SSI modules 1606, air interface frame format 1508, multi-transport mode cell bus 1510 (also referred to as a multi-transport mode bus), and the multi-transport mode bus frame format 1512. The multi-transport mode bus frame format 1512 (hereinafter referred to as the bus frame format 1512) has a synchronization slot 1514, an intermodule communication section 1516 (hereinafter referred to as the IM-Com section 1516) containing a number of message timeslots 1528, and a cell bus data section 1518 (hereinafter referred to as the CB-Data section 1118) containing a number of data timeslots 1526. Also shown is the corresponding air interface frame format 1508 (as shown in FIG. 5) having an overhead section 1520, a spare section 1524, and a traffic section 1522.

The SSI modules 1506 are coupled to the bus controller 1504 via the multi-transport mode cell bus 1510. The bus controller 1504 is coupled to the multi-modulation modem 1502 which is coupled to the IF-transceiver of the indoor units (not shown). The multi-transport mode cell bus 1510 uses the bus frame format 1512 and the multi-modulation modem 1502 outputs the air interface frame format 1508.

In practice, the multi-transport mode cell bus 1510 carries both asynchronous signals (such as ATM traffic) and synchronous signals (such as TDM traffic), in contrast with a prior art bus that requires separate busses for TDM and ATM traffic. The multi-transport mode cell bus 1510 provides the link between the channel and control module of the indoor unit and the individual SSI modules 1506 (see FIGS. 20–25B). The multi-transport mode cell bus 1510 is an 8 bit synchronous TDM cell bus that uses the bus frame format 1512 having a fixed length. The first timeslot is a synchronization slot 1514 that is used for synchronization purposes between the indoor unit of the remote terminal and an extension indoor unit (EIDU) which will be discussed further with reference to FIGS. 32–34. The remainder of message timeslots 1528 in the IM-Com section 1516 of the bus frame format 1512 are a fixed length depending on the bus frame length. Furthermore, the diagram shown corresponds to both the hub terminal and the remote terminals. The specific SSI modules 1506 will vary depending on whether at the remote terminal or the hub terminal and the services coupled to them.

The length of the bus frame format 1512 is chosen such that the bus frame format 1512 can be directly mapped to the air interface frame format 1508 as described in FIGS. 4–8. For example, if the air interface frame format is 6 msec in length, the bus frame format 1512 is also 6 msec in length, matching the air interface frame format 1508. The CB-Data section 1518 of the bus frame format 1512 maps to the traffic section 1522 of the air interface frame format 1508. Furthermore, a different number of data timeslots 1526 of the CB-Data section 1518 can be assigned to the differently modulated traffic bursts within the traffic section 1522 of the air interface frame format 1508. For example, 12 data timeslots 1526 of the CB-Data section 1518 could be mapped to one QPSK Quad traffic burst or 6 timeslots could be mapped to one 16-QAM Quad traffic burst, or 4 timeslots could be mapped to one 64-QAM Quad traffic burst on the air interface frame format 1508.

The overhead section 1520 of the air interface frame format 1508 is only needed for communications between the CCMs of the indoor unit of the remote terminal and the indoor unit of the hub terminal. Thus, the overhead section 1520 is dropped by the bus controller 1504 of the CCM of the indoor unit such that the synchronization slot 1514 and the IM-Com section 1516 conveniently fit in its place. Thus, the IM-Com section 1516 provides the control/status communication interface between the host processor (e.g. control processor, not shown) of the CCM and the local processors of the SSI modules. Thus, the IM-Com section 1516 and the synchronization slot 1514 comprises a necessary length to allow the bus frame format 1512 to directly correspond to the air interface frame format 1508.

This mapping of the bus frame format is a departure from the prior art which often uses two separate bus frame formats to communicate the messaging and the data. Furthermore, prior art bus frame formats known do not directly correspond to the an air interface frame format. Thus, the uniquely designed bus frame format 1512 corresponds directly to the air interface frame format 1508.

The multi-transport mode cell bus 1100 also operates at a fixed frequency that matches the air interface symbol rate.

For example, if the air interface operates at a symbol rate of 10 Msps, then the multi-transport mode cell bus 1510 operates at 10 Mbps. At the hub terminal, the timing for the multi-transport mode cell bus 1510 is derived from a timing reference or link to the transport network as described in FIG. 13. At the remote terminal, the timing for the multi-transport cell bus 1510 is derived from the signaling sent from hub terminal. The CB-Data section 1518 comprises fixed length data timeslots 1526. Advantageously, the data timeslots 1526 are configured such that they may carry both specially formatted TDM cells and ATM cells, which are described in FIGS. 28 and 29, on the same bus frame format 1512. Again, this is a departure from the prior art wherein separate bus frame formats are used for ATM and TDM transport. The structure of the IM-Com cells that fit within each message timeslot 1528 of the IM-Com section 1516 and the structure of the CB-Data cells that fit within each data timeslot 1526 of the CB-Data section 1518 are discussed with reference to FIGS. 16 and 17, respectively. Thus, as will be described in FIG. 12B, the CB-Data cells that fit within the data timeslots 1526 of the CB-Data section 1518 are designed to carry either ATM cells or specially designed TDM cells.

Furthermore, the multi-traffic mode cell bus 1510 combines messaging (i.e. in the IM-Com section 1516) and data (i.e. in the CB-Data section 1518) on the same bus, whereas, typically, in a prior art system, a separate bus is used for both messaging and data transport. One advantage to only using one cell bus is a reduction in the number of pins used in the cell bus structure.

Figure 18A:
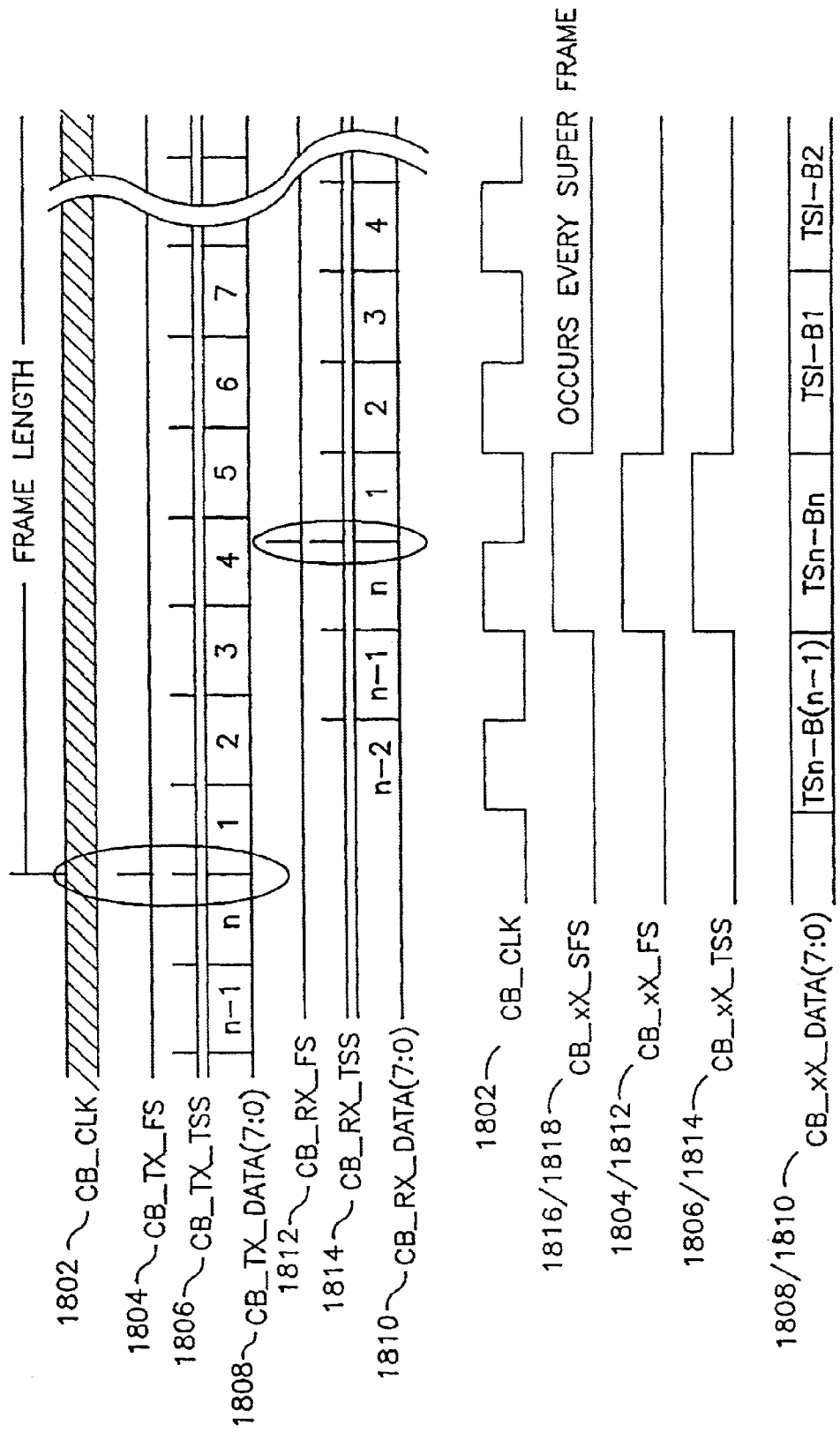
FIG. 18 is a timing diagram for the multi-transport mode cell bus of FIG. 15.

The data timeslots 1526 have been selected to correspond to the air frame format 1108. The data timeslots 1526 could include a different number of bytes; however, the length of the data timeslots 1526 of the CB-Data section 1518 can not be less than 53 bytes since they are designed to fit the standard 53 byte ATM cell and a 53 byte TDM cell. Ideally, the length should not be less than 55 bytes in order to accommodate control bytes shown in FIGS. 16 and 17. The timing signal or clock is also part of the multi-transport mode cell bus 1510. Refer to FIG. 18 for the specific lines or signals that makeup the multi-transport mode cell bus 1510.

The message timeslots 1528 of the IM-Com section 1516 are configured to have specific assignments.

There is one specific message timeslot 1528 available for each SSI module to be connected to the indoor units. Furthermore, there is a message timeslot 1528 for each fiber extender module, both master and slave (described FIG. 33), and one message timeslot 1528 for each of the four SSI ports of the extension indoor unit or EIDU (described in FIG. 32). Also, there can be additional message timeslots 1528 available that may be dynamically assigned to any SSI module 1506 as needed.

Referring next to FIG. 16, a diagram showing the structure of an IM-Com cell 1600 used by the multi-transport mode cell bus of FIG. 15 is shown. The IM-Com cell 1600 has a header 1602 containing an SSI ID 1606, messaging semaphores 1608 as known in the art, and an unused section 1610. The IM-Com cell 1600 also contains a message section 1604. The header 1602 includes the first byte which is for the SSI ID 1606 which is used to resolve conflicts between different SSI modules attempting to place data into the same timeslot. The second byte is for the messaging semaphores 1608 and the third byte is unused.

The SSI ID 1606 is a field containing a number of bits, e.g. 8 bits. The lower 4 bits of the SSI ID 1606 is used for the SSI modules coupled to the indoor unit and the upper 4 bits of the SSI ID 1606 are used by respective extension indoor units (see FIG. 32). Thus, one bit is assigned to each SSI module and each extension indoor unit that interfaces with the multi-transport mode cell bus. In operation, when a particular SSI module transmits into a timeslot, it places a "0" bit into its SSI ID 1606 bit, otherwise the SSI ID 1606 bit is a "1". Since a message timeslot is assigned only to one SSI module, only one of the bits in the SSI ID 1606 should be a "0" at for any given message timeslot in the IM-Com section. Thus, if the third bit of the SSI ID 1606 is assigned for the SSI module in SSI port #3, the lower four bits of the SSI ID 1606 should be "1011" for a timeslot that SSI module in SSI port #3 is transmitting in. The channel and control module (CCM) of the indoor unit resolves conflicts if there are more than one "0" bit in each of the upper and lower 4 bits of the SSI ID 1606 for a particular message timeslot in the IM-Com section.

The remaining m bytes comprising the message section 1604 are used for messaging between the CCM control processor and the local processors of the SSI modules. This messaging tells the SSI modules which message timeslots to use when transmitting and receiving, as well as other control information. The IM-Com cells 1600 are formatted by the bus controller and the control processor of the indoor unit or by the local processors of the individual SSI modules.

Referring next to FIG. 17, a diagram showing the structure of an CB-Data cell (also referred to as a traffic cell) that travels on the multi-transport mode TDM cell bus of FIG. 15 is shown. The traffic cell 1700 has a header 1702, data cell 1704 (also referred to as a payload cell), and a spare section 1706. The header 1702 includes the first byte for the SSI ID 1708 (see FIG. 16) and the second byte for the payload status 1710.

The traffic cell 1700 fits into one of the data timeslots 1526 of the CB-Data section 1518 of the bus frame format. The traffic cell 1700 may be designed to match the length of the IM-Com cell 1600. Furthermore, the length of the traffic cell 1700 is such that one or more traffic cells 1700 advantageously can be mapped to the traffic bursts of the air interface frame format. For example, two traffic cells 1700 could makeup one 16-QAM single traffic burst or 12 traffic cells 1700 could make up one QPSK quad burst.

The data cell 1704 within the traffic cell 1700 is advantageously 53 bytes long, the size of a standard ATM cell. This enables transport of asynchronous signals, such as a 53 byte ATM cell, or synchronous signals, such as 53 bytes of TDM data formatted within a specially designed 53 byte TDM cells (see FIG. 29), in the data cell 1704. Thus, the ATM and TDM cells are multiplexed onto the multi-transport mode cell bus by the SSI modules (specifically, the formatters of the SSI modules). This feature eliminates the need to have one TDM cell bus for transporting TDM traffic and another cell bus for transporting ATM traffic.

The spare section 1706 contains the remaining bytes, if any, which are unused in this embodiment. The spare section 1706 comprises a length such that the bus frame format can be made to match the air interface frame format so that the bus frame format will easily map to the air interface frame format. Depending on the design of the air interface frame format and other system parameters, the data cell 1704 within the traffic cell 1700 may contain more bytes, but it may not contain less than 53 bytes and still remain compatible with the 53 byte ATM standard cell.

Furthermore, the traffic cell 1700 includes n bytes. The size of the traffic cell 1700 depends on the length of the air interface frame format, the frequency used and the minimum data cell size. As shown in FIG. 17, the traffic cell 1700 should be at least 55 bytes in order to account for the 53 byte data cell 1704 and the header section 1702. Note also that the data cell can carry both ATM cells and TDM cells, and that if the length of a standard ATM cell was replaced by a new standard length, the various cell sizes could be adjusted accordingly.

Referring next to FIG. 18, a timing diagram 1800 for the multi-transport mode cell bus is shown in FIGS. 15 through 17. The following cell bus signals comprise the multi-transport mode cell bus: CB_CLK 1802, CB_TX_FS 1804, CB_TX_TSS 1806, CB_TX_DATA(7:0) 1808, CB_RX_DATA(7:0) 1810, CB_RX_FS 1812, CB_RX_TSS 1814, and CB_TX_SFS 1816 and CB_RX_SFS 1818.

The CB_CLK 1802 signal is a clock having a frequency corresponding to the air interface symbol rate and is 1 line. The CB_RX TSS 1814 is the receive timeslot sync with a single clock every timeslot and is 1 line. The CB_RX FS 1812 is the receive frame sync with a single clock pulse frame and is 1 line. The CB_RX_SFS 1818 is the receive super frame sync with a single clock pulse every superframe and is 1 line. The CB_RX_DATA(7:0) 1810 is an 8 bit data cell bus which is 8 lines. Alternatively, the cell bus could be a 16, 24, 32, etc bit cell bus. The cell bus structure could be modified accordingly. The CB_TX_TSS 1806 is the transmit timeslot sync with a single clock every timeslot and is 1 line. The CB_TX_FS 1804 is the transmit frame sync with a single clock every frame and is 1 line. The CB_TX_SFS 1816 is the transmit super frame sync with a single clock every superframe and is one line. And the CB_TX_DATA(7:0) 1808 is the 8 bit transmit data cell bus which is 8 lines. Thus, the multi-transport mode cell bus comprises a total of 23 lines and has the timing as shown in FIG. 18.

The multi-transport cell bus is used as a link between the channel and control module (CCM) of the indoor units, whether at the hub terminal or the remote terminal, and the SSI modules, through which the subscriber interfaces. Advantageously, the multi-transport mode cell bus replaces two separate busses for transporting ATM and TDM traffic and combines the intermodule communication and the data cells on the same cell bus frame format.

Data Flow Over the Air Interface

Figure 19:
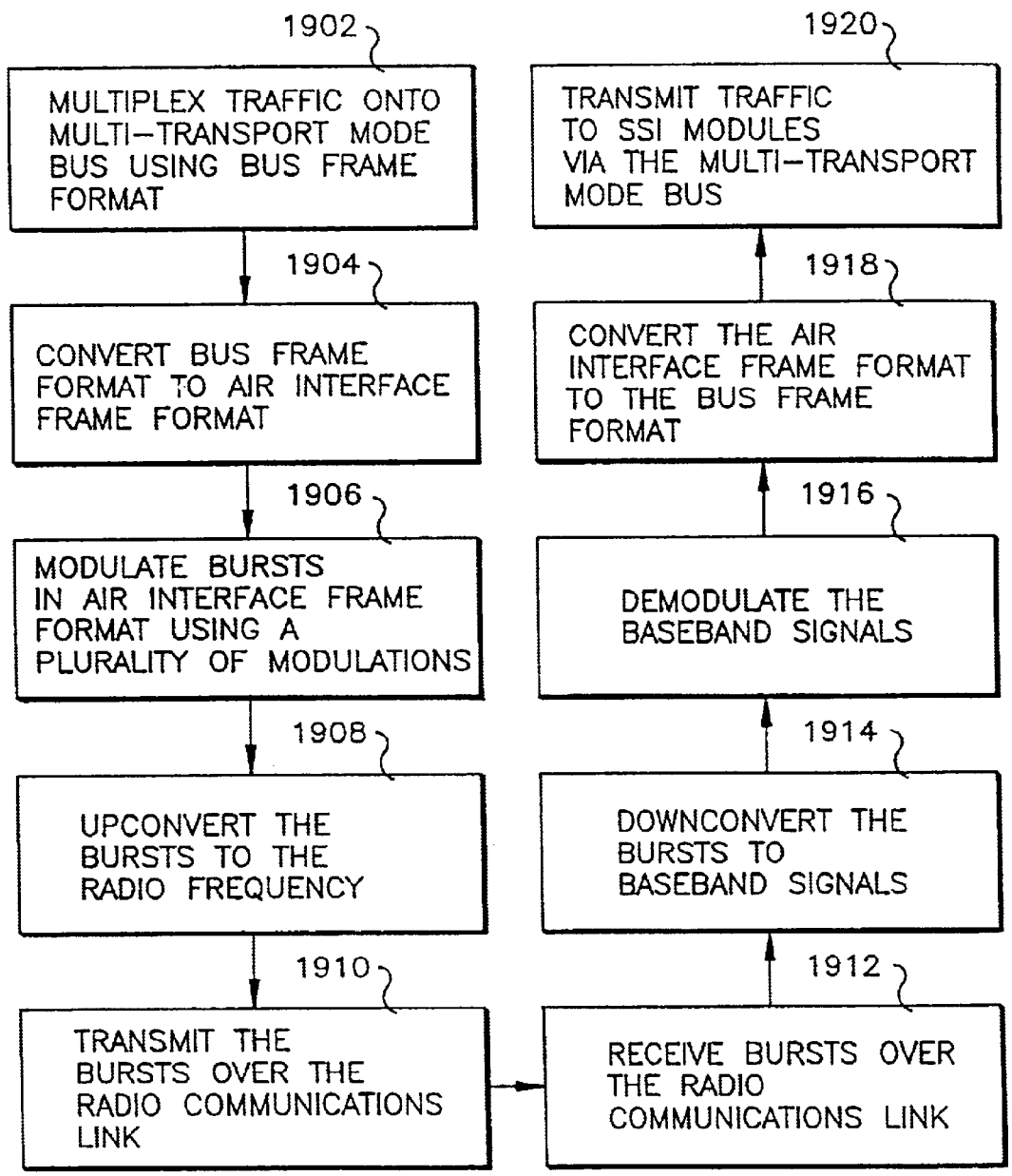
FIG. 19 is a flowchart illustrating the steps performed for data transfer between the indoor units of the multi-mode hub terminal and the indoor units of the multi-mode remote terminals over the communications for the embodiment shown in FIG. 2.

Referring next to FIG. 19, a flowchart is shown illustrating the major steps performed by the point to multipoint system as shown in the embodiment of FIG. 2 for data flow between the indoor units of the hub terminal to the indoor units of the remote terminal. While referring to specific steps within FIG. 19, other relevant FIGS. will be referred to. The steps described are broad and intended to provide an overview of the data transfer over the communications link of the point to multipoint system.

Both synchronous (TDM) and asynchronous (ATM) traffic (or signals) is routed to the SSI modules at the hub terminals of the hub site from the central office via the transport network. The SSI modules format and multiplex the mixed traffic onto the multi-transport mode cell bus using the multi-transport mode bus frame format (Step 1902). The specific techniques used by the SSI modules to format and multiplex the mixed traffic into a single format on the multi-transport mode cell bus will be described below in the specification, and are not described for purposes of this flowchart. As stated the multi-transport mode cell bus carries both asynchronous traffic (such as ATM) and synchronous traffic (such as TDM) traffic, but in such a manner that the rest of the hub terminals and remote terminals are not aware that they are carrying both ATM and TDM cells. Thus, through the formatting of the data for the multi-transport mode cell bus and mapping the data of the multi-transport mode cell bus for the air interface frame format, the point to multipoint system supports multiple traffic types.

Continuing on with the process 1900, the bus frame format of the multi-transport mode cell bus is converted to the air interface frame format (Step 1904) by removing the intermodule communications section (IM-Com) and replacing it with a corresponding overhead section for the air interface frame format. The bus controllers as described in FIGS. 9, 13, and 14 perform this step. The IM-Com section is used by the channel and control module (also referred to as the CCM) of the indoor unit at the hub terminal to communicate with the specific SSI modules (e.g. the TDM-DS3 SSI module and the ATM-OC3c SSI module). The overhead section is used for the CCM of the hub terminal to communicate with the CCMs of the remote terminals. The bus controller also converts the bus frame format to the air interface frame format by formatting the timeslots of the multi-transport mode cell bus to the correct number of air interface bursts. The bus controller also decides whether the bursts will be quad bursts or single bursts as described in FIGS. 7A and 7B.

Once formatted to the air interface frame format (Step 1904), the signals are modulated on a burst-by-burst basis using one of three available modulation modes (Step 1906) as described above. Advantageously, this enables a single hub terminal (sector radio) to communicate with each of the remote terminals within its particular sector, regardless of the region that the remote terminal is located in. This also provides efficient use of the available bandwidth. Next, the modulated signals in the air interface frame format are upconverted to the radio frequency of the communications link (Step 1908). This is described more fully in FIG. 14 in the operation of the IF-transceiver section which upconverts the modulated signals to the intermediate frequency at the indoor unit, then upconverts again to the microwave radio frequency of the radio communications link (i.e. 38 GHz in the embodiment of FIG. 2).

The signals are then broadcast over the air interface (Step 1910) to all of the remote terminals using the 12.5 MHz subchannel of the 50 MHz channel. It is important to note that the signals traveling over the air interface are both synchronous signals (e.g. TDM) and asynchronous signals (e.g. ATM) carried within the same air interface frame format. Furthermore, the air interface bursts are differently modulated so that, essentially, three different streams of traffic are created. Each traffic stream is modulated using QPSK, 16-QAM, and 64-QAM. The streams modulated by the higher order modulations (more bits/second/Hz), such as 64-QAM, will degrade sooner than the signals using a lower order modulation (fewer bits/second/Hz), such as QPSK. Thus the QPSK stream will travel farther than the 64-QAM stream. This is a departure from known prior art in which a single sector radio only transmits using one modulation and only carries traffic using a single transport mode within the air frame format. Thus, a single hub terminal (sector radio) of this embodiment replaces n hub terminals (sector radios) of a prior art point to multipoint system having n regions within each sector.

At the remote terminals, the modulated signals are received from the communications link (Step 1912), e.g. radio communications link. Note that the remote terminals will receive all of the signals on the communications link (that haven't fully degraded). The received signals are then downconverted to baseband signals (Step 1914) to be demodulated. Then, the signals on the received air frame are demodulated (Step 1916). The signals are demodulated on a burst-by-burst basis using the same multi-modulation modem that modulated the signals at the hub terminal; however, the multi-modulation modem is configured to only demodulate the specific traffic bursts that the particular remote terminal is configured to demodulate. For example, a remote terminal located in the closest region to the hub terminal will demodulate the QPSK modulated overhead bursts and only the 64-QAM modulated traffic bursts, not the 16-QAM or QPSK modulated traffic bursts. Note that all remote terminals will demodulate the overhead bursts modulated using QPSK. In this embodiment, 64-QAM is the highest order modulation, but the modulations are not limited to the specific modulations described.

Once the signals are demodulated according to the preconfiguration of the remote terminal, the signals on the air interface frame format are converted to the bus frame format of the multi-transport mode cell bus (Step 1918). This is accomplished at the bus controller of the CCM of the indoor unit. The overhead section of the air interface frame format is removed and the IM-Com section of the bus frame format is added. Additionally, the bursts of the air interface frame format are mapped over to the corresponding timeslots of the bus frame format of the multi-transport mode cell bus. Finally, the traffic on the multi-transport mode cell bus is transmitted to the SSI modules (Step 1920) so that the SSI modules can sort out the mixed traffic to be forwarded to the appropriate subscribers. The data flow in the reverse direction is simply the opposite as described in Steps 1902 through 1920.

Service Specific Interface Modules

The point to multipoint system allows many standard interfaces for the subscriber specific needs, such as TDM-DS3 SSI modules, ATM-OC3c SSI modules, and Quad DS1/AAL1 SSI modules, and DS3 Transparent SSI modules, for example. However, each of these standard interfaces has to be configured to interface with the multi-transport mode cell bus since it is carrying both asynchronous traffic (ATM) and synchronous traffic (TDM). Thus, the SSI modules must be able to filter the different types of traffic on the multi-transport mode cell bus, so that the correct traffic cells can be extracted and forwarded to the subscribers. Furthermore, each of these interfaces must be specifically designed to format the traffic it is carrying for transmission onto the multi-transport mode cell bus. FIGS. 20 through 25B discuss some of the differing types of SSI modules used in the point to multipoint system and the techniques used to interface with the multi-transport mode cell bus, as well as the techniques used to format traffic for transmission on the multi-transport mode cell bus.

Figure 20:
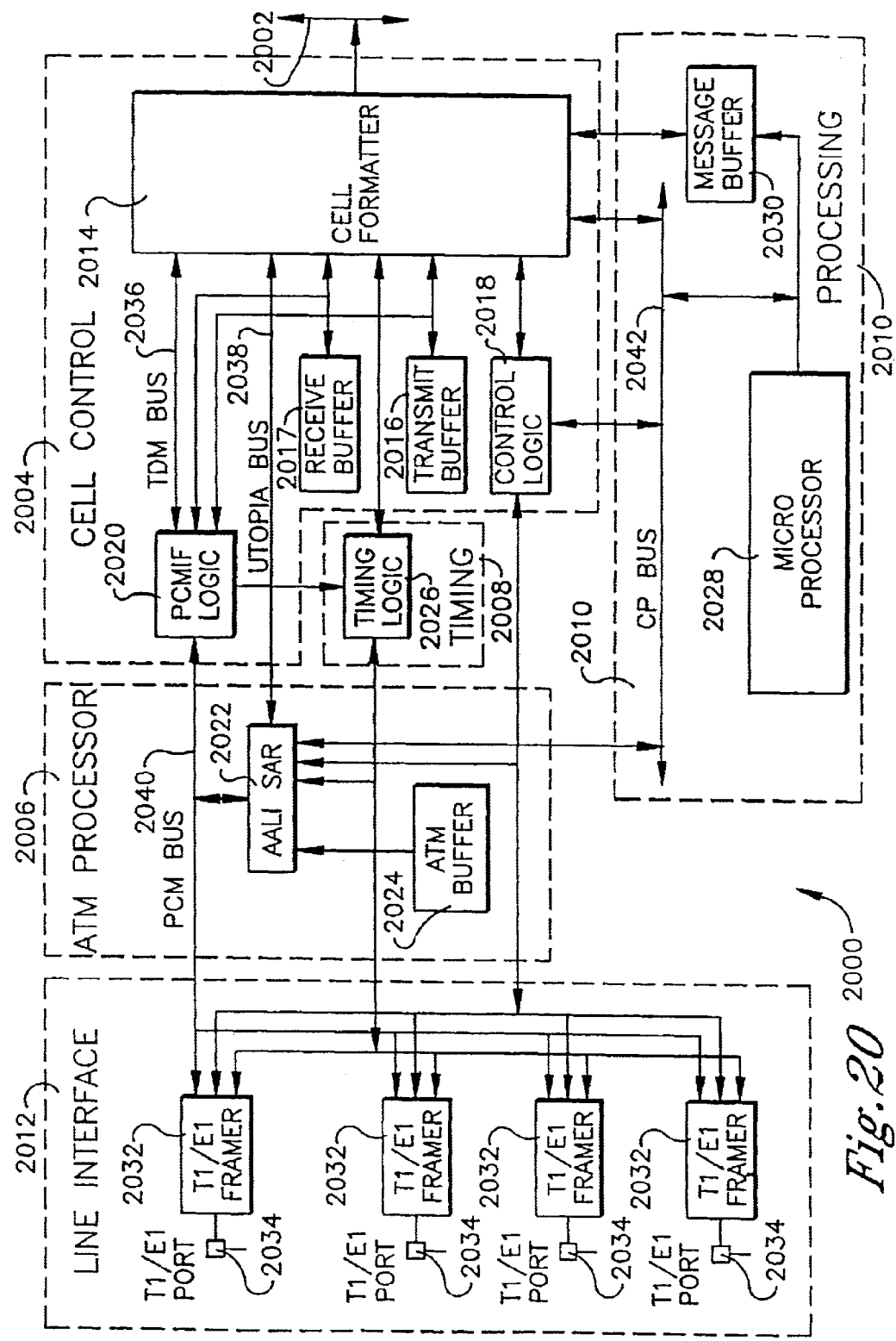
FIG. 20 is a block diagram of a quad DS1/AAL1 service specific interface module used in the embodiment of the point to multipoint system of FIG. 2.

Referring next to FIG. 20, a block diagram is shown for a Quad DS1/AAL1 SSI module. The Quad DS1/AAL1 SSI module 2000 contains the multi-transport cell bus 2002 as described with reference to FIGS. 15 through 18, a cell control section 2004, an ATM processor section 2006, a timing section 2008, a processing section 2010, and a line interface section 2012. The cell control section 2004 contains a cell formatter 2014 (also referred to as a signal formatter), transmit buffer 2016, receive buffer 2017, control logic 2018, and a PCM interface logic 2020. The ATM processor section 2006 contains an AAL1 (ATM Adaptation Layer 1) SAR 2022 and ATM buffer 2024. The timing section 2008 contains a timing logic 2026. The processing section 2010 contains a microprocessor 2028 and a message buffer 2030. The line interface section 2012 contains four T1/E1 framers 1532, and 4 T1/E1 ports 2034. Also shown are several connecting busses including a TDM bus 2036, Utopia bus 2038, pulse code modulated bus 2040 (referred to as the PCM bus 2040), and CP bus 2042.

The Quad DS1/AAL1 SSI module 2000 is a module that allows four T1 lines or E1 lines to interface with the point to multipoint system. The quad DS1/AAL1 SSI module is a dual transport mode SSI module, meaning that it can be configured to work in either TDM mode or ATM AAL1 mode depending on the subscriber's preference; thus quad DS1 TDM SSI module or a quad DS1/AAL1 ATM SSI module. The data is multiplexed at the DS0 level to the DS1 (T1 line) which contains 24 DS0S. Prior art quad DS1 TDM SSI module and quad DS1/AAL1 ATM SSI modules exist; however, a single prior art quad DS1 TDM SSI module can not be configured to be a quad DS1/AAL1 ATM SSI module, as the quad DS1/AAL1 SSI module 2000 can. Additionally, the quad DS1/AAL1 SSI modules 2000 used must be configured to interface with a multi-transport mode cell bus 2002. Once configured to service one of the two data transport types, the Quad DS1/AAL1 SSI module 2000 handles only that traffic type. Thus, the operation of the quad DS1/AAL1 SSI module 2000 will be described in both modes. Alternatively, the quad DS1/AAL1 SSI module 2000 could be configured to support both traffic types at the same time.

Operating in ATM mode, the traffic enters the Quad DS1/AAL1 SSI module 2000 from the indoor unit of the remote terminal through the multi-transport cell bus 2002 to the cell formatter 2014. The multi-transport cell bus 2002 carries traffic that is both ATM and TDM; thus, the cell formatter 2014 (which may also be referred to as a bus controller) needs to be able to extract the ATM cells while discarding the TDM cells. Additionally, the cell formatter 2014 must be able to discern the ATM cells that are destined for the particular subscriber the SSI module is interfaced with and unwanted ATM cells. As discussed earlier, the traffic entering the remote terminal from the radio or air interface is in one of three modulation modes. One particular remote terminal only demodulates one of the modulation modes for the traffic section of the air interface frame format, so only certain traffic will be received onto the multi-transport mode cell bus 2002. Furthermore, the demodulated traffic needs to be split into the corresponding SSI modules.

The cell formatter 2014 listens to the configured timeslot of the IM-Com section of the multi-transport mode cell bus to copy the proper messaging cell to the message buffer 2030, which is a dual port RAM. Refer to FIG. 15 to see that each SSI module coupled to the multi-transport mode cell bus has a specific timeslot of IM-Com section dedicated for its use. Thus, the cell formatter 2014 only reads that particular timeslot of the IM-Com section. The messaging from the IM-Com cell is then routed to the microprocessor 2028 so that the microprocessor 2028 of the Quad AAL1 SSI module 2000 can coordinate activities with the CCM of the indoor unit. The microprocessor 2028 is a reduced instruction set code (RISC) processor.

Figure 30:
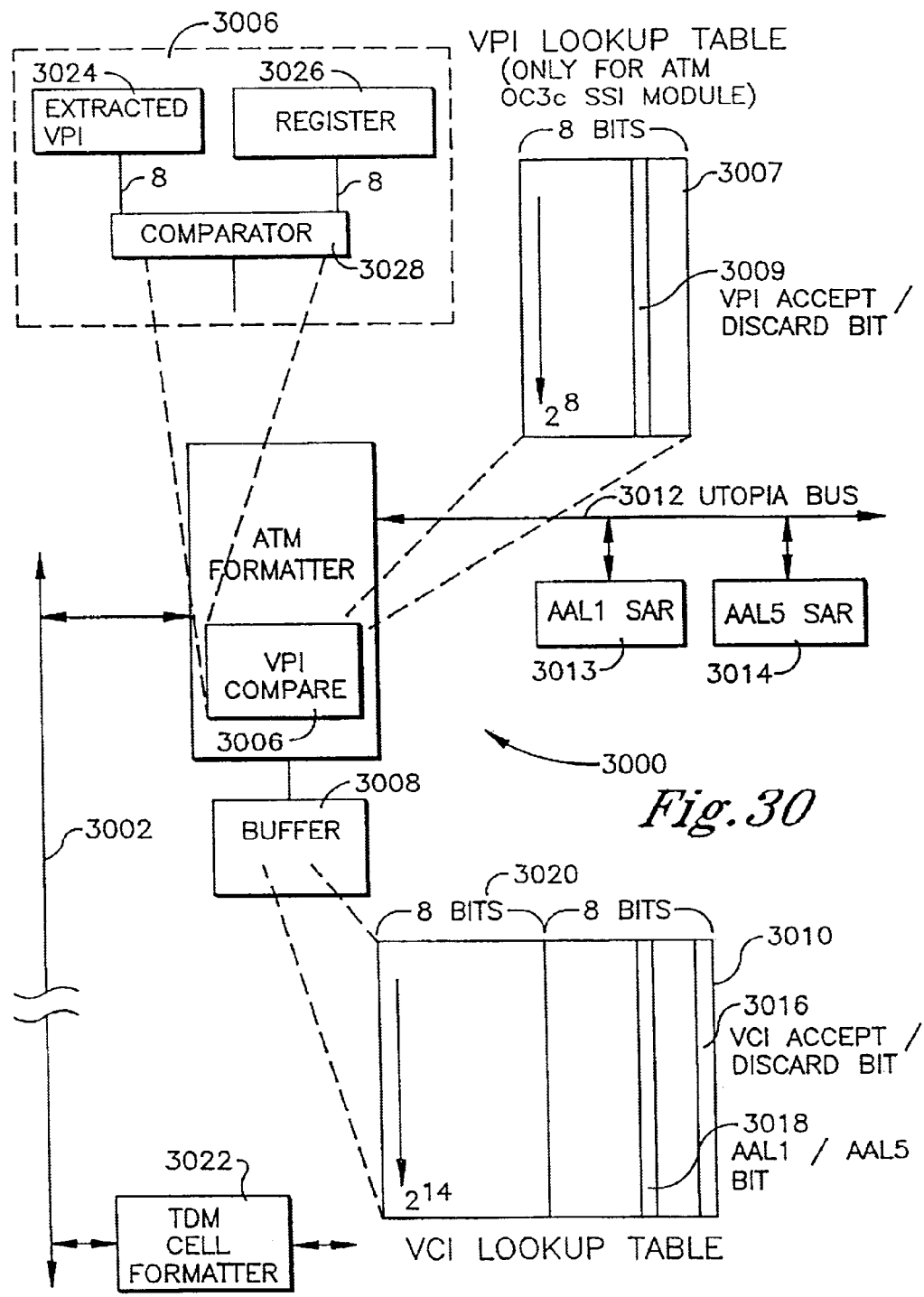
FIG. 30 is a diagram of an ATM address filtering technique performed by service specific interface modules to filter the ATM cells of FIG. 28 and the TDM cells of FIG. 29 received from a mixed transport mode source.

The cell formatter 2014 uses an ATM address filtering technique to determine which traffic cells from the CB-Data section of the multi-transport mode cell bus to discard and which cells are to be kept. The ATM address filtering is described with reference to FIGS. 26-31B. The VCI lookup table described in FIG. 30 is located in the receive buffer 2017, which is a static RAM.

If the traffic cell contains an AAL1 ATM cell which has been properly filtered as discussed in FIGS. 26–31B, the AAL1 ATM cell is unpacked from the traffic cell and is routed to the AAL1 SAR 2022 (segmentation and reassembly) via the Utopia bus 2036 where the AAL1 ATM cells are converted to serial data streams to be transmitted to the T1/E1 framers 2032. Note that the PCM interface logic 2020 is not used in ATM mode. The ATM buffer 2024 (static RAM) is used to buffer the ATM cells so they can be reassembled in to packets and then sent to the respective T1/E1 framer 2032 to be framed for transmission on the respective T1 line (or E1 line) to the subscriber through a T1/E1 port 2034. The microprocessor 2028 controls data flow from the T1/E1 framers 2032 to the cell formatter 2014 and the AAL1 SAR 2022.

The data flow is the opposite for traffic entering the T1/E1 ports 2034 and T1/E1 framers 2032 from the T1 lines (or E1 lines). The data flows from the T1/E1 framers 2032 to the AAL1 SAR 2022 where the traffic is segmented into ATM cells. Then, the ATM cells are sent to the cell formatter 2014 via the Utopia bus 2036 to await being multiplexed onto the multi-transport mode cell bus 2002. The message buffer 2030 also contains the mapping needed for placing the ATM cells onto the multi-transport mode cell bus 2002.

Operating in TDM mode, the cells arrive on the multi-transport cell bus 2002, such that each timeslot of the multi-transport mode cell bus carries one cell. The cell formatter 2014 determines which cells to keep from the cell bus 2002. The intermodule communication messages (IM-Com) received from the multi-transport cell bus 2002 deliver the timeplan to the cell formatter 2014 via the message buffer 2030. Thus, the cell formatter 2014 knows which cells to copy from which timeslots within the multi-transport mode cell bus 2002; thus, only TDM cells destined for its particular subscribers are copied. The TDM cells are then copied to the receive buffer 2017, which is a static RAM, if the TDM cell is a data cell. As the cell formatter 2014 copies the cells, it unpacks them into DS0s (both PCM data and signaling data) as described with reference to the TDM buffering in FIGS. 39 through 44B.

Additionally, the cell formatter 2014 repacks the data into the receive buffer 2017, which is a static RAM, based on the cell type, which is further described in FIGS. 40 through 43. The receive buffer 2017 also contains the time plan for mapping the cell bus timeslot to the respective T1/E1 timeslot. At the correct time, the PCM interface logic 2020 extracts the correct data (PCM and signaling) for each T1/E1 line and each timeslot, packs it into DS1s and sends it to the T1/E1 framer 2032 via the PCM bus 2040 where the data is framed for transmission on the T1/E1 line.

The data flow is the opposite for TDM data arriving through the T1/E1 line to the Quad DS1 SSI module 2000.

The timing section 2008 contains the timing logic 2026. The timing logic 2026 comprises typically a complex programmable logic device (CPLD) and a phase lock loop (PLL). The Quad DS1/AAL1 SSI module receives its timing from the multi-transport mode cell bus 2002, which was recovered from the timing at the hub terminal, as described above. Note that not all of the blocks have been fully described since their operation and implementation are easily understood to those skilled in the art.

Note that the Quad DS1/AAL1 SSI module 2100, or any of the other SSI modules shown actually contain the multi-transport mode cell bus 2002, but an interface to the multi-transport mode cell bus. The multi-transport mode cell bus is shown as a part of the Quad DS1/AAL1 SSI module 2100 and other SSI modules in FIGS. 22–25B for ease of understanding. Note the cell formatter 2014 formats the TDM traffic and the ATM cells into cells for transmission through the point to multipoint system and thus, is also referred to as a signal formatter. The signal formatter is described variously throughout the specification as being in the individual SSI modules as cell formatters. However, in other embodiments, the signal formatters could be located in other components of the point to multipoint system, e.g., in the multi-modulation modem or bus controller of the hub terminals and remote terminals. Described generically, the signal formatters (specifically cell formatters) format the different transport mode signals into a format (cells) suitable to be transmitted through the point to multipoint system.

Figure 21A:
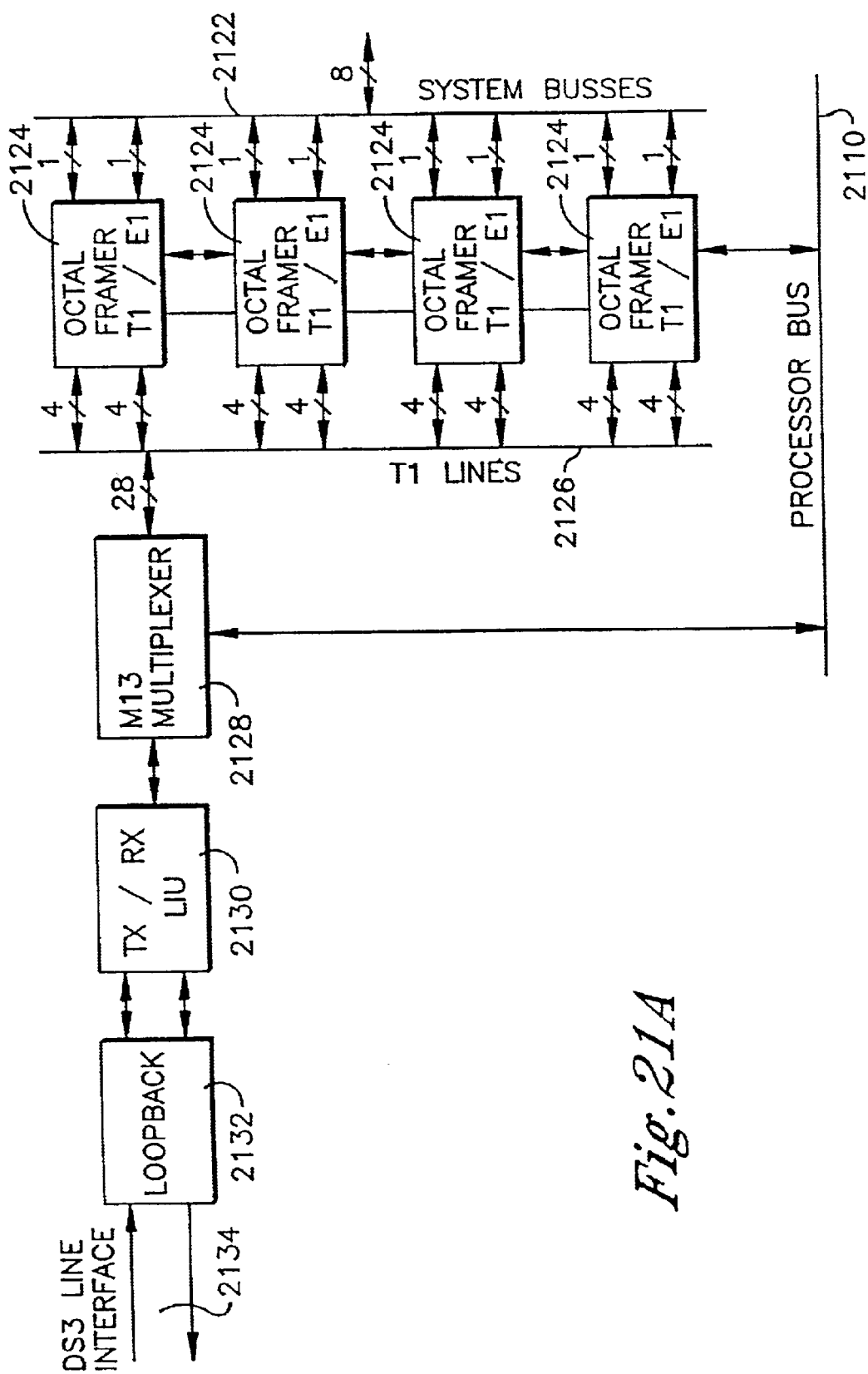
FIG. 21 is a block diagram of a TDM DS3 service specific interface module used in the embodiment of the point to multipoint system of FIG. 2.
Figure 21B:
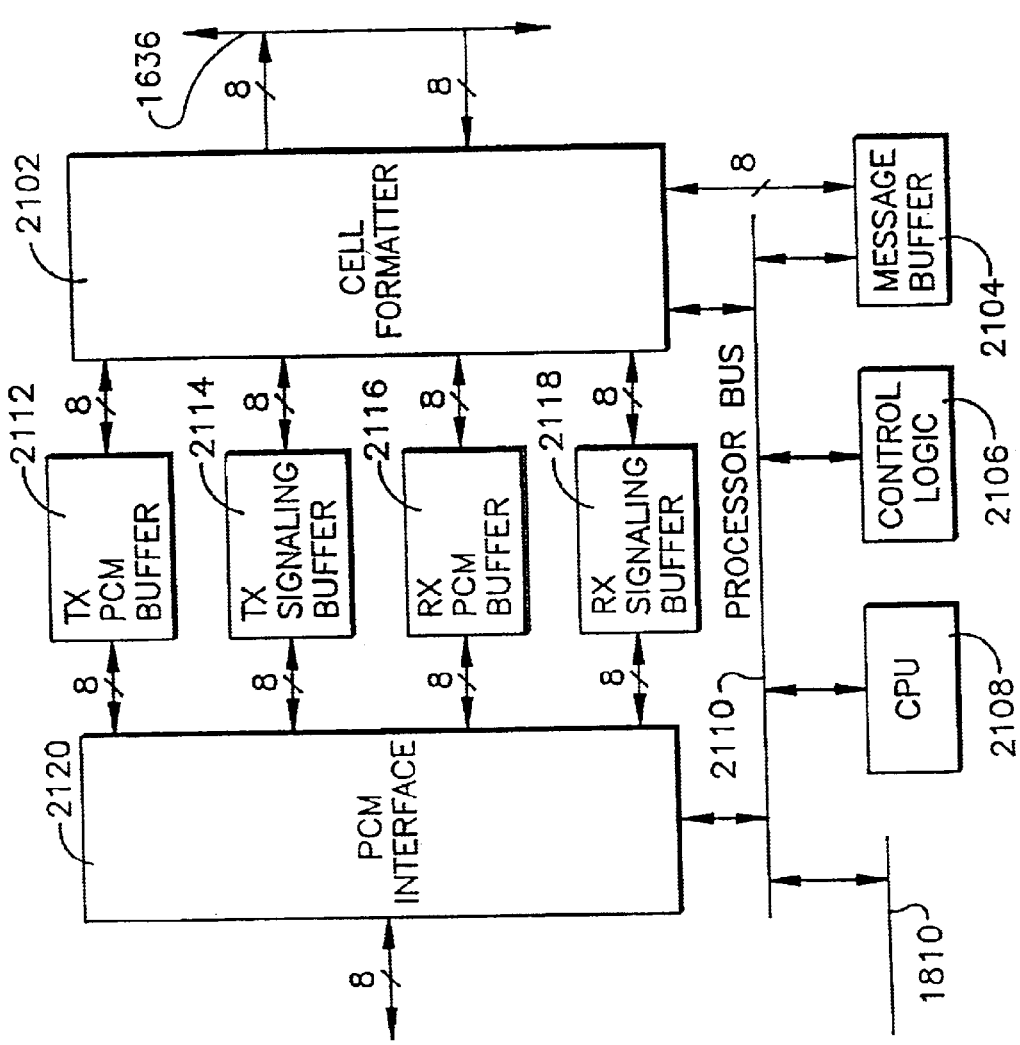

Referring next to FIG. 21, a block diagram is shown of a TDM-DS3 SSI module 2100 that is used at the indoor unit of the hub terminal of FIG. 2. The TDM-DS3 SSI module 2100 contains a cell formatter 2102 (also referred to as a signal formatter), message buffer 2104, control logic 2106, central processing unit (CPU) 2108, processor bus 2110, transmit PCM buffer 2112, transmit signaling buffer 2114, receive PCM buffer 2116, receive signaling buffer 2118, PCM interface 2120, system busses 2122, octal T1/E1 framers 2124, 28 T1/E1 lines 2126, an M13 multiplexer 2128, transmit/receive line interface unit (TX/RX LIU) 2130, loopback 2132, and DS3 interface 2134. Also shown is the multi-transport mode cell bus 2136.

The TDM-DS3 SSI module 2100 is a TDM-based SSI module that is used at each hub terminal of the point to multipoint system to interface with the high speed DS3 line to the transport network. The TDM-DS3 SSI module 2100 demultiplexes the DS3 line containing 28 T1/E1 lines (28 DS1s) down to the DS0 level to interface with the point to multipoint system. Thus, the TDM-DS3 SSI module 2100 acts as a 3/1/0 multiplexer. The TDM-DS3 SSI module 2100 is designed to handle all of the TDM traffic to and from the point to multipoint system while the OC3c ATM SSI module (see FIG. 22) is designed to handle all of the ATM traffic to and from the point to multipoint system.

As signals are received from the multi-transport cell bus 2136, the cell formatter 2102 is instructed which cells to copy from the multi-transport mode cell bus through intermodule communication messaging (IM-Com) between the CPU and the CCM of the hub indoor unit of the hub terminal. In this case, the cell formatter 2102 keeps the TDM cells and throws out the ATM cells. The cell formatter 2102 also copies appropriate IM-Com cells to the message buffer 2104 (which is dual port RAM) for the CPU 2108. The TDM cells are unpacked into PCM data (or PCM samples) and signaling. The PCM data is stored in the receive PCM buffer 2116 while the signaling, such as call associated signaling (CAS), is stored in the receive signaling buffer 2118.

As described in FIGS. 29 and 39, each TDM cell is unpacked to both the receive PCM buffer 2116 and the receive signaling buffer 2118 since the TDM cell contains both PCM data and signaling data. The buffers (2116, 2118, 2112, and 2114) are all dual port random access memories (also referred to as DPRAMs). Also note that the four buffers (2112, 2114, 2116, and 2118) can be part of the same memory structure as described in FIG. 39.

Figure 41:
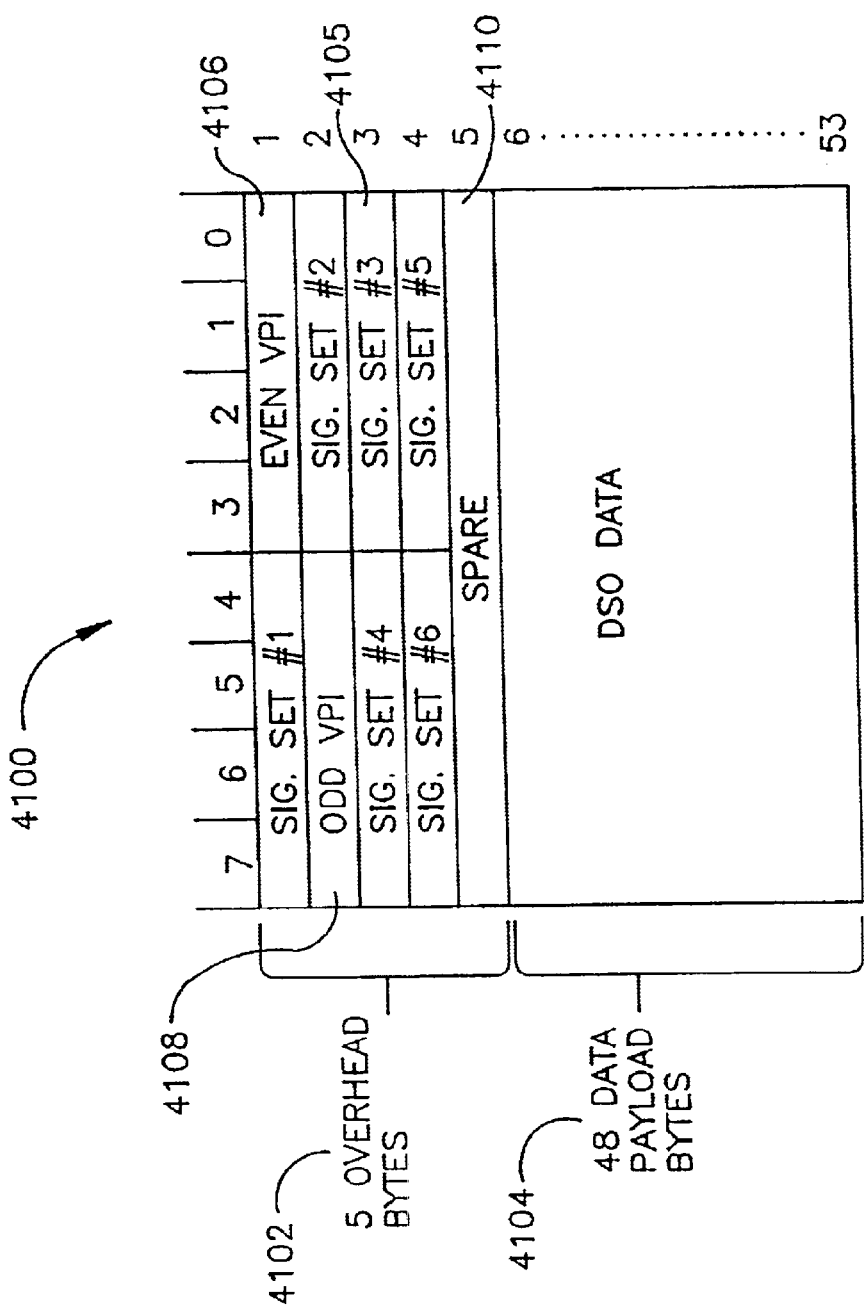
FIG. 41 is a cell format for a TDM cell used in TDM buffering in the TDM-based service specific interface modules to pack the pulse-code-modulated (PCM) data and signaling from a single DS0 into the TDM cell in accordance with the embodiments shown in FIGS. 39 and 40.
Figure 42:
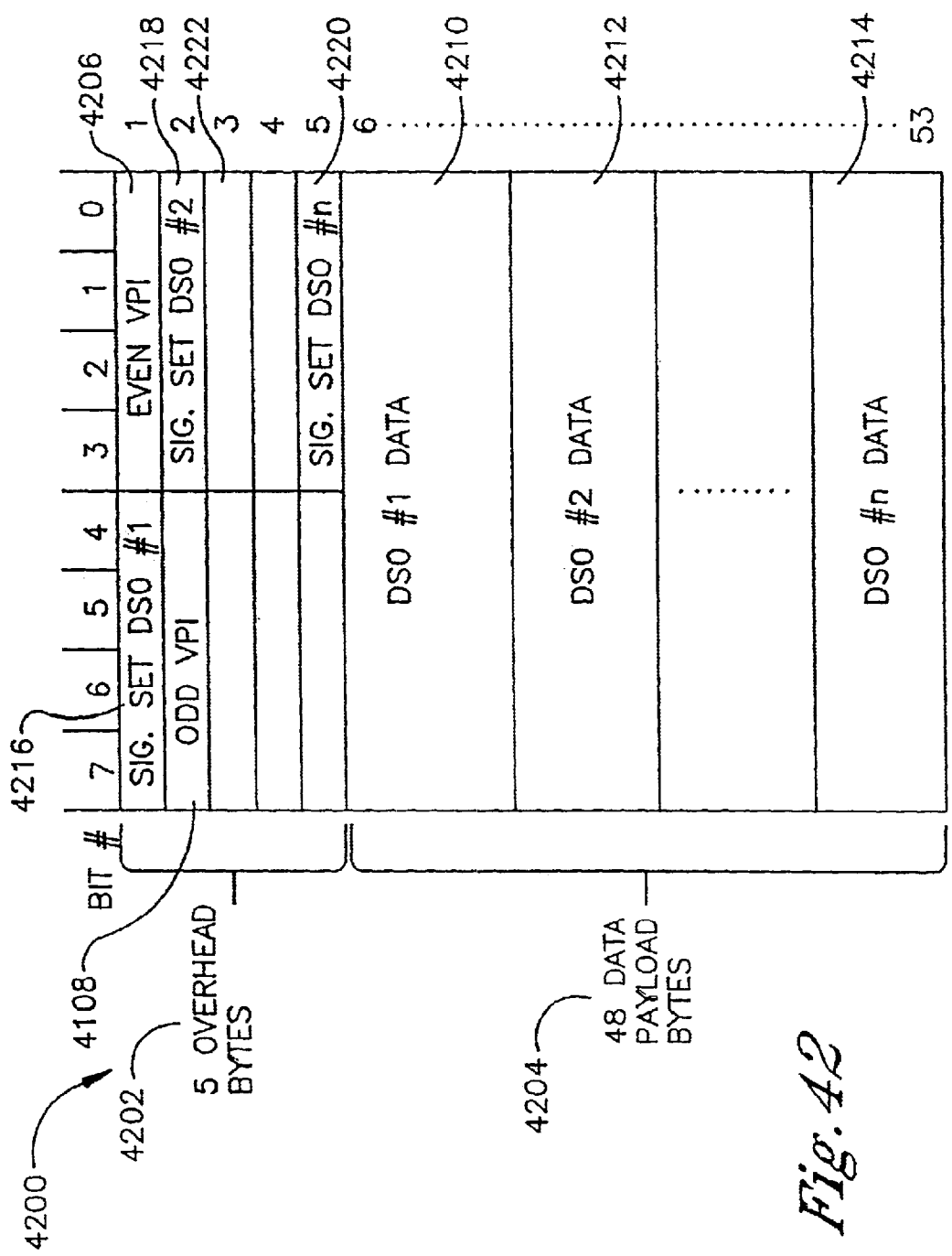
FIG. 42 is a cell format for a TDM cell used in the TDM buffering in the TDM-based service specific interface modules to pack pulse-code-modulated (PCM) data and signaling from multiple DS0s into a single TDM cell in accordance with the embodiments shown in FIGS. 39 and 40.
Figure 43:
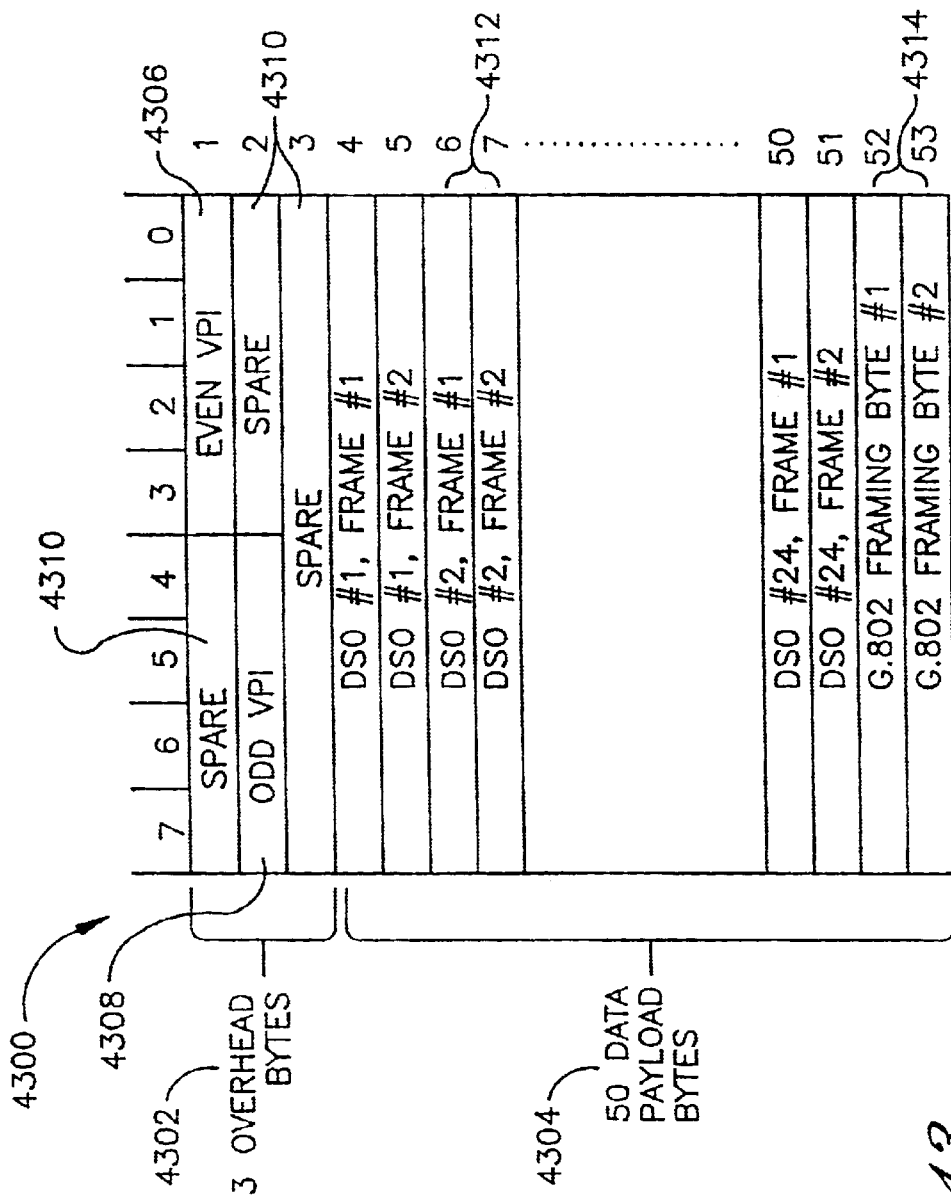
FIG. 43 is a cell format for a TDM cell used in the TDM buffering in the TDM-based service specific interface modules to pack multiple DS0s with embedded framing in accordance with the embodiments shown in FIGS. 39 and 40.

The TDM cells are further unpacked according to which cell type is used as described in FIGS. 41–43.

The PCM interface 2120 then packs the PCM data in the receive PCM buffer 2116 and receive signaling buffer 2118 into DS1s which are then sent, via system busses 2122 (PCM busses), to the octal T1/E1 framers 2124 to be framed as a T1 or E1. The PCM interface 2120 comprises custom logic specifically designed for the TDMDS3 SSI module

2100. The 28 T1/E1 lines 2126 are then multiplexed on to the DS3 line by the M13 multiplexer 2128. The M13 multiplexer 2128 is a standard DS3 to DS1 multiplexer. The TX/RX LIU 2130 interfaces with the DS3 line at the DS3 line interface 2134. The CPU 2108 possesses the necessary logic to control the TDM-DS3 SSI module 2100 through the processor bus 2110. The loopback 2132 is used for testing purposes. Additionally, the timing for the TDM-DS3 SSI module 2100 is recovered from the multi-transport mode cell bus 2136.

The data flow in the direction from the direction of the transport network to the multi-transport mode cell bus 2136 is simply the opposite. The DS3 line is multiplexed into DS1s by the M13 multiplexer 2128. The framing is removed from the DS1s by the octal T1/E1 framers 2124 then the PCM interface 2120 unpacks the DS1s to DS0s which are sent to the transmit PCM buffer 2112 (for PCM data) or the transmit signaling buffer 2114 (for signaling). The cell formatter 2102 then packs the DS0s into the specially designed TDM cells described in FIG. 29 and 41–43 which are multiplexed onto the multi-transport mode cell bus 2136.

Furthermore, the cell formatter 2102 places an ATM header, a virtual path identifier (VPI) in the header section of the TDM cell. This is described in more detail in FIG. 29. This enables the ATM formatter of the ATM-based SSI modules at the remote terminal to be able to distinguish between the ATM cells and the TDM cells received from the mixed traffic input (i.e. the multi-transport mode bus). Alternatively, the ATM cells and TDM cells can further be distinguished using a timeplan. However, this is much more time consuming and cumbersome, requiring more messaging.

The cell formatter 2102 also formats the TDM cells depending on the cell type and acceptable delay as described in FIGS. 41 through 43. Again, not all of the functional blocks have been fully described since the skilled artist understands their implementation and use.

Figure 22:
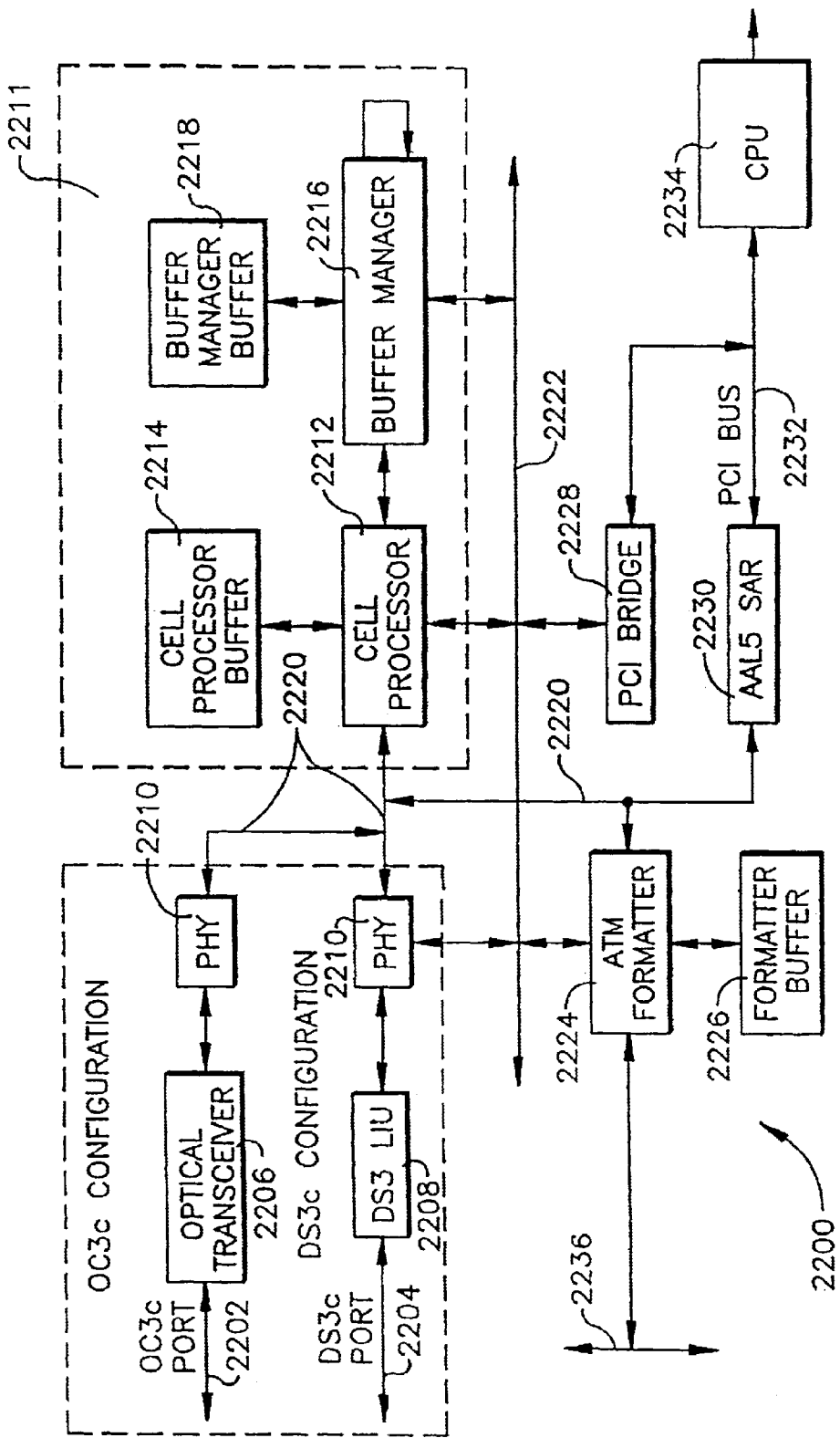
FIG. 22 is a block diagram of an ATM OC3c service specific interface module used in the embodiment of the point to multipoint system of FIG. 2.
Figures 23, 24:
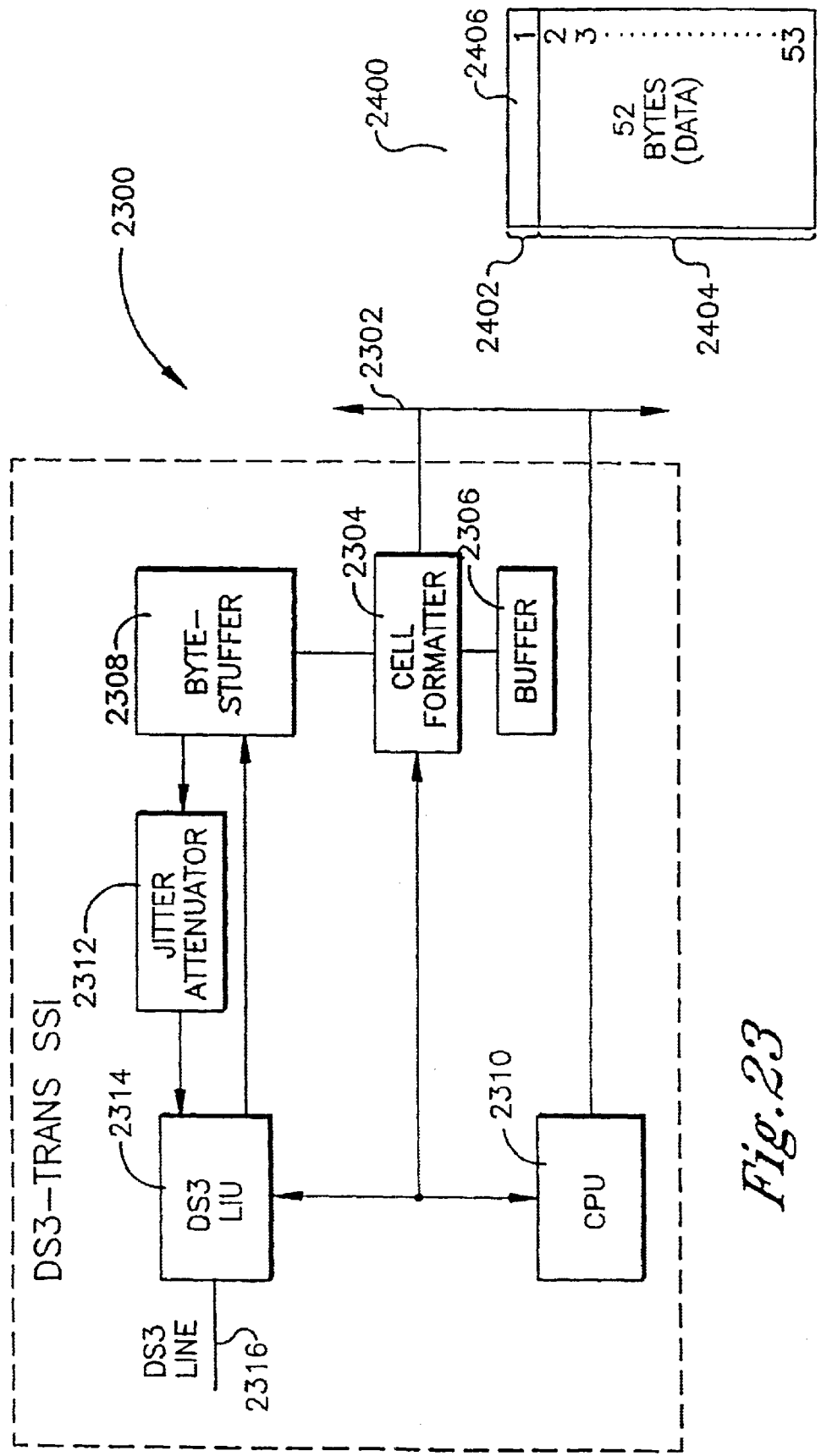
FIG. 23 is a block diagram of a DS3 transparent service specific interface module used in the embodiment of the point to multipoint system of FIG. 2.
FIG. 24 is a diagram of a data cell that is formatted by the DS3 transparent SSI module in the embodiment of FIG. 23.

Referring next to FIG. 22, a block diagram is shown for an ATM-OC3c SSI module that may be used in the remote terminal or hub terminal of the point to multipoint system shown in the embodiment of FIG. 2. The ATM-OC3c SSI module 2200 contains an OC3C port 2202, DS3c port 2204, optical transceiver 2206, DS3 line interface unit (LIU) 2208, Phy 2210, an ATM line and buffer manager 2211 (hereinafter referred to as the ALBM 2211), cell processor 2212, cell processor buffer 2214, buffer manager 2216, buffer manager buffer 2218, Utopia II bus 2220, uP bus 2222, ATM formatter 2224 (also referred to generically as a signal formatter), formatter buffer 2226, PCI bridge 2228, AAL5 SAR 2230, PCI bus 2232, central processing unit (CPU) 2234, and multi-transport mode cell bus 2236.

The OC3c port 2202 is coupled to the optical transceiver 2206 which is coupled to a Phy 2210. The Phy 2210 is coupled to a cell processor 2212 via a Utopia II bus 2220. Alternatively, a DS3c port 2204 is coupled to a DS3 LIU 2208 which is coupled to a Phy 2210. The Phy 2210 in the DS3c configuration is then coupled to both the cell processor 2212 via the Utopia II bus 2220 and also coupled to the uP bus 2222.

Additionally, the ATM-OC3c SS1 module 2200 could be configured to support multiple subchannels instead of one subchannel (12.5 MHz). This requires a separate ATM formatter 2224 for each subchannel as described in FIG. 26.

The cell processor 2212 is coupled to the uP bus 2222, cell processor buffer 2214, and the buffer manager 2216. The buffer manager 2216 is coupled to the uP bus, and buffer manager buffer 2218. The uP bus 2222 is also coupled to an ATM formatter 2224 and PCI bridge 2228. The ATM formatter 2224 is coupled to the formatter buffer 2226, Utopia II bus 2220, and the multi-transport mode cell bus 2236. The ATM formatter 2224 is coupled to the AAL5 SAR 2230 via the Utopia II bus 2220. The CPU 2234 is coupled to the AAL5 SAR 2230 and the PCI bridge 2228 by a PCI bus 2232. The ALBM 2211 is a standard off-the-shelf ATM chipset containing the cell processor 2212, cell processor buffer 2214, buffer manager 2216, and buffer manager buffer 2218.

In practice, the ATM-OC3c SSI module 2200 is designed to handle all of the ATM traffic to and from the point to multipoint system. It may be used at the hub terminal as shown in FIG. 2 or may be used at the remote terminal depending on the needs of particular subscribers. The ATM-OC3c SSI module 2200 can be configured in one of two ways. First, the link to the OC3c line (155 Mbps) is a pure stream of high speed cells and interface at the OC3c port 2202. Second, the ATM-OC3c SSI module can be configured as a DS3 line operating at 44.736 Mbps, consisting of a pure stream of ATM cells. An OC3c line is an optical carrier level 3 concatenated line meaning the line is one continuous stream of ATM cells and as understood in the art. Thus, an OC3c configuration will contain the OC3c port 2202, optical transceiver 2206, and Phy 2210 while the DS3 configuration will contain the DS3c port 2204, DS3 LIU 2208, and Phy 2210.

Furthermore, the ATM-Oc3c SSI module uses a standard off-the-shelf ATM chipset (the ALBM 2211) which is configured to handle the multiple modulation environment of the point to multipoint system. The ATM chipset is configured to provide a unique ATM address filtering technique and demand assigned multiple access technique as described with reference to FIGS. 26 and 27.

Additionally, the ATM-OC3c SSI module 2200 has one mode if operating at the remote terminal and another mode if operating at the hub terminal.

Operating at the hub terminal, data arrives to the ATM OC3c SSI module 2200 from the transport network and the central office via an ATM MUX to the OC3c port 2202 and the optical transceiver 2206. The Phy 2210, is well known in the ATM art as a device that performs the physical layer functions of the ATM chipset 2211. Here, the Phy 2210 is a cell delineator, extracts the ATM cells from the frames and sends them to the cell processor 2212 of the ALBM 2211 via the Utopia II bus 2220. The cell processor 2212 then polices the arriving ATM cells according to ATM standards. The policing simply checks to see that the ATM cells are not arriving too quickly. The cell processor 2212 has a cell processor buffer 2214, which is a static RAM, for buffering the ATM cells. The cell processor 2212 forwards the ATM cells to the buffer manager 2216 of the ALBM 2211 which queues the ATM cells to the buffer manager buffer 2218, which is a static RAM. The buffer manager 2216 then dequeues the ATM cells according to configured priorities on a per VP/VC (virtual path/virtual channel) basis to guarantee the QOS (quality of service). This process is well known in the art. The ATM cells are looped back to the buffer manager 2216 and sent to back to the cell processor 2212.

Next the ATM cells are sent to the ATM formatter 2224 via the Utopia II bus 2220. The ATM formatter 2224 performs the queuing functions described in the ATM address filtering section (see FIG. 26). The ATM formatter 2224 is custom logic that contains several shallow FIFOs that each hold ATM cells to be transmitted using one of three modulation modes (also referred to as modulation buffers). The formatter buffer 2226, which is a static RAM, contains the time plan for each modulation mode. The ATM formatter 2224 uses the timeplan to map the ATM cells in the correct time slots of the multi-transport mode cell bus 2236 so that the cells will be transmitted using the proper modulation mode. Thus, the proper remote terminal will receive the proper ATM cells. Additionally, the ATM formatter 2224 formats the ATM cells into traffic cells (described in FIGS. 16 and 17, respectively) for transmission on the multi-transport mode cell bus 2236.

Furthermore, the CPU 2234 is able to communicate with the channel and control module CCM of the hub terminal through intermodule communication slots (IM-Com cells) on the multi-transport mode cell bus 2236. The IM-Com cells are placed onto the multi-transport mode cell bus 2236 by the ATM formatter 2224. The IM-Com cells are sent to and from the CPU 2234 and the ATM formatter 2224 via the PCI bus 2232 and PCI bridge 2228.

The data flow from the hub terminal indoor unit to the ATM-OC3c SSI module 2200 is simply the reverse. The ATM cells are copied from the multi-transport mode cell bus 2236. At the hub terminal, the ATM OC3c SSI module 2200 does not have to perform the ATM address filtering technique (FIGS. 30–31B) since all ATM cells are forwarded to the OC3c line which connects to the transport network (backhaul).

The ATM cells are carried back to the ALBM 2211. Specifically, the ATM cells are sent to the cell processor 2212, buffer manager 2216, then back to the cell processor 2212 and then to the Phy 2210 to be framed for transmission and exit the ATM-OC3c SSI module 2200 though either the optical transceiver or the DS3 line interface unit 2208, depending on the configuration.

The AAL5 SAR 2230 (segmentation and reassembly) is used for in-band signaling. It functions to packet operations, administration, and control (OAM) messages from the element management system (EMS) to the hub terminal. The details of the element management system are further discussed with reference to FIGS. 2 and 10. This provides an improved method for the element management system to communicate with the point to multipoint system. Instead of communicating to the hub sites through a wide area network (WAN) and then the LAN of the hub site as a conventional element management system does, the element management system can communicate with the hub terminals through the backhaul or transport network. Advantageously, no separate landlines need to be maintained between the element management system (EMS) at the central office and the individual hub sites.

Since ATM cells carrying messaging from the EMS at the central office are on the same medium, the OC3c line, the control cells sent by the element management system need to be separated from the traffic cells. Additionally, the cell processor 2212 and the buffer manager 2216 both use the virtual path identifier (VPI) and the virtual channel identifier (VCI) of the cells and. determine if any of the cells are control cells destined for the CPU 2234. Control cells are routed to the AAL5 SAR 2230 via the Utopia II bus 2220. The AAL5 SAR 2230 then forms packets of messages which are sent to the CPU 2234 via a PCI bus 2232. The packets are formed according to transmission control protocol/Internet protocol (TCP/IP). The CPU 2234 is able to send signals to the ATM formatter 2224, cell processor 2212, and buffer manager 2216 through the PCI bus 2232 coupled to a PCI bridge 2228, and coupled to the uP bus 2222.

Operating at the remote terminal, the data is received over the air from the hub terminal and is demodulated by the CCM of the indoor unit of the remote terminal. The data is then sent as cells on the multi-transport mode cell bus 2236 to interface with the ATM-OC3c SSI module 2200. The ATM formatter 2224, since at the remote terminal, then performs the ATM address filtering process as shown in FIG. 30.

The ATM address filtering function is different at the ATM-OC3c SSI module 2200 at the remote terminal because the throughput on the ATM-OC3c SSI module 2200 is much higher than the throughput of other types of SSI modules used at the remote terminal. The OC3c line sends data at 155.52 Mbps (mega bits per second) which is equivalent to about three DS3 lines. Thus, the table lookup approach as described with reference to FIGS. 30 and 31B is performed (instead of FIG. 30 and 31A).

Figure 31A:
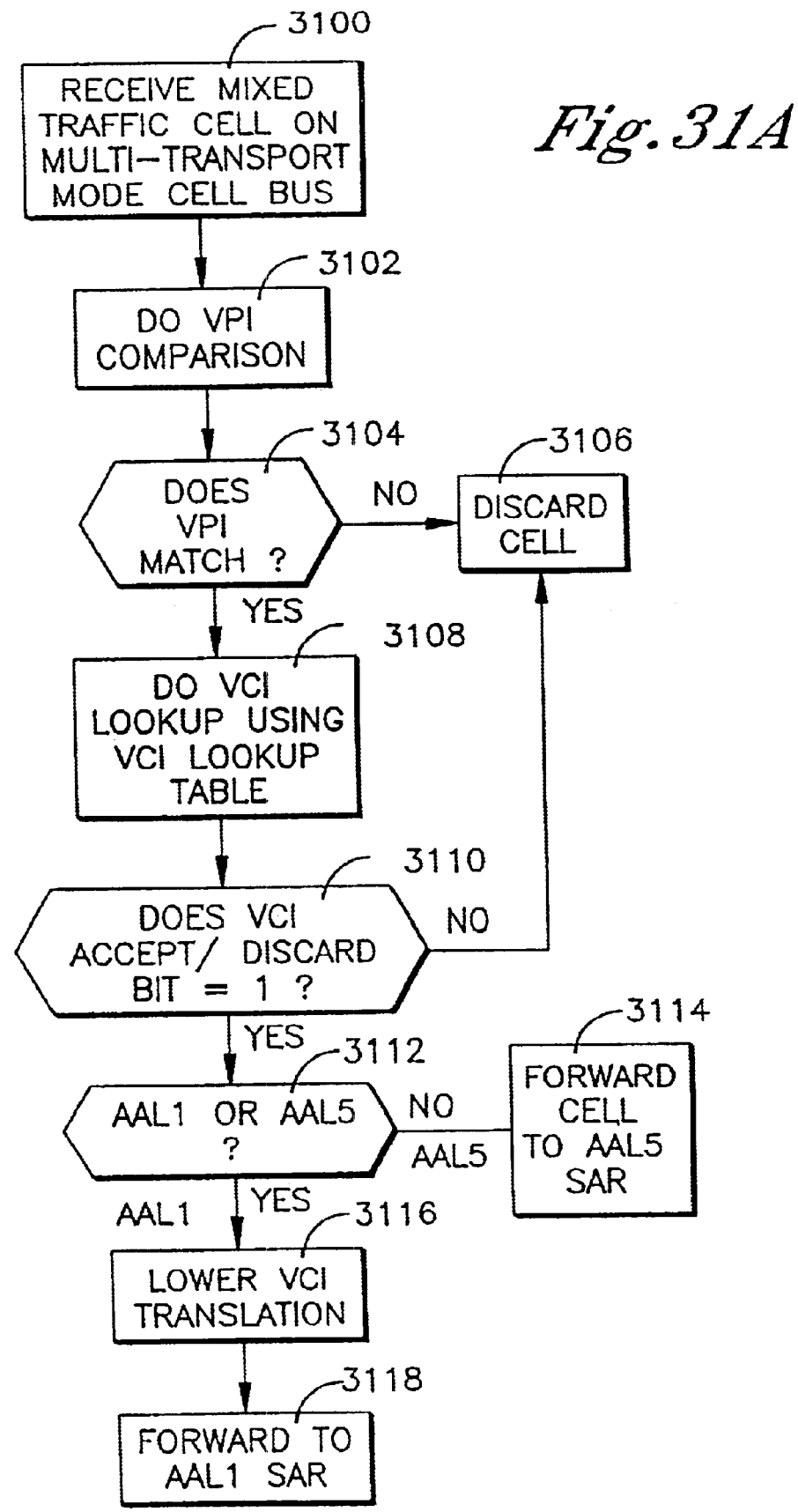
FIGS. 31A and 31B are flowcharts illustrating the steps performed in two variants of the ATM address filtering techniques described in FIG. 30.
Figure 31B:
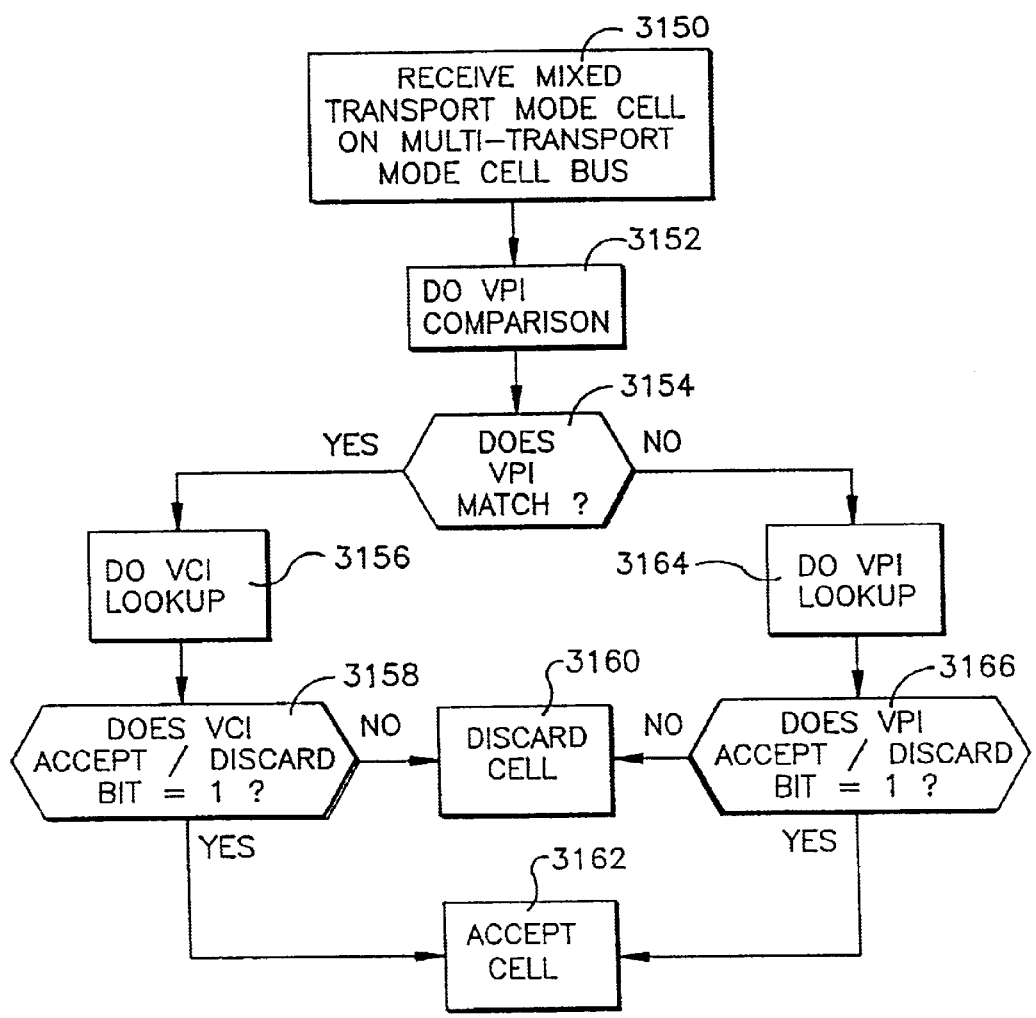

Once an ATM cell is accepted using the ATM address filtering techniques described in FIGS. 30, 31A, and 31B, the ATM cell is forwarded to the cell processor 2212 via the Utopia II bus 2220, then sent to the buffer manager 2216 to be queued and dequeued back to the cell processor 2212 using the buffer manager buffer 2218, which is a static RAM, according to configured priorities on a per VPI/VCI basis in order to guarantee quality of service (QOS). The ATM cells are sent to the Phy 2210 (cell delineator), then the cells framed and transmitted through the optical transceiver 2206 to the OC3c line at the OC3c port 2202.

At the remote terminal, the data flow from the subscriber to the ATM OC3c SSI module 2200 is the same as done at the hub terminal from the OC3c line to the hub terminal. The major difference is the number of modulation buffers within the ATM formatter 2224, since the remote terminal will only transmit using one modulation and not the full range of modulation modes that the hub terminal uses.

The components of the ATM-OC3c SSI module 2200 and their functionality are understood to those skilled in the art. The ALBM 2211 is an off-the-shelf ATM chipset known in the art. Not all of the functional blocks have been fully described since their operation and implementation is understood to the skilled artist.

Referring next to FIG. 23, a functional block diagram is shown for a DS3 transparent SSI module. The DS3 transparent SSI module 2300 contains the multi-transport mode cell bus 2302, a cell formatter 2304 (signal formatter), buffer 2306, byte-stuffer 2308, jitter attenuator 2312, central processing unit 2310 (CPU), a DS3 line interface unit 2314, and a DS3 line 2316.

The multi-transport mode cell bus 2302 is coupled to the cell formatter 2304 and the CPU 2310. The cell formatter is coupled to the buffer 2306 and the byte-stuffer 2308. The byte-stuffer 2308 is coupled to the jitter attenuator 2312 and the DS3 line interface unit 2314. The jitter attenuator 2312 is coupled to the DS3 line interface unit 2314 which is coupled to the DS3 line 2316. The CPU 2310 is coupled to the DS3 line interface unit 2314, the byte-stuffer 2308, and the cell formatter 2304.

In practice, the DS3 transparent SSI module 2300 is not specifically ATM-based or TDM-based and is used to provide point to point links within the point to multipoint system. Thus, the DS3 transparent SSI module 2300 is used when the subscriber requires the entire channel bandwidth (e.g. 12.5 MHz) of the hub terminal radio sector. The DS3 transparent SSI module 2300 may carry asynchronous traffic (such as ATM) or synchronous traffic (such as TDM); however, the specific traffic type is irrelevant to the DS3 transparent SSI module 2300. The data is simply carried through the point to multipoint system without concern for the specific type of data. The received bits are routed from one point (the DS3 line 2316 at the hub terminal) to another point (a subscriber coupled to the DS3 line 2316 at the remote terminal, for example) regardless of the framing used and control bits present.

Prior art point to point links are common; however, a point to point communications link within a point to multipoint system is unique to this embodiment of the present invention and departs from known prior art. In order to accomplish this transport, a DS3 transparent SSI module 2300 is needed at the indoor unit of the hub terminal and a matching DS3 transparent SSI module 2300 is needed at the corresponding indoor unit of the corresponding remote terminal.

As the serial line data comes from the DS3 line 2316 through the DS3 line interface unit 2314, the data goes to the byte-stuffer 2308. The byte-stuffer 2308 is similar to a bit-stuffer as known in the art of telecommunications, except that it buffers bits into bytes instead of simply buffering bits. The byte-stuffer 2308 collects the bits that come from the DS3 line 2316 and forms bytes and buffers the bytes to the cell formatter 2304 which packs the bytes into the data cells to be transmitted on the multi-transport cell bus 2302. The byte stuffer 2308 and the cell formatter 2304 adapt the timing of the DS3 line to the timing or timebase of the multi-transport mode cell bus 2302 and the point to multipoint system. The data cells formed for the multi-transport mode cell bus are the same 53 byte data cells 1704 designed to fit in the traffic cell 1700 as shown in FIG. 17. The data cells formatted by the cell formatter 2304 of DS3 transparent SSI module 2300 are different than the ATM cells and TDM cells formatted by the other SSI modules which are described with reference to FIGS. 28 and 29. Thus, features of the data cells formed by the DS3 transparent SSI module 2300 will be briefly discussed.

Referring concurrently to FIG. 24, a diagram of a data cell 2400 is shown that is formed by the DS3 transparent SSI module 2300 in the embodiment of FIG. 23. The data cell 2400 is 53 bytes in length and contains a header section 2402 and a traffic section 2404. The header section 2402 is 1 byte and includes a control byte 2406. The data cell 2400 is advantageously, the same size as the ATM cell of FIG. 28 and the TDM cell of FIG. 29. Thus, the data cell 2400 conveniently fits within the CB-Data section of the multi-transport mode cell bus 2302. The main difference between the data cell 2400 and those shown in FIGS. 28 and 29 is that the header section 2402 is only 1 byte in length, leaving the traffic section 2404 to include 52 bytes instead of 48 bytes as shown in FIGS. 28 and 29. Since, the communications link is a point to point link, the traffic section 2404 is maximized within the 53 byte cell size.

The number of bytes packed into the traffic section 2404 of the data cell 2400 varies as a function of the frequency difference between the DS3 line 2316 and the clock rate of the multi-transport mode cell bus 2302. For example, the DS3 line operates at 44.736 Mbps. If the clock rate of the multi-transport mode cell bus is 10 Mbps, the bus frame format is 6 msec, and there are 684 timeslots holding 83 byte traffic cells on the multi-transport mode cell bus 2302 (see FIGS. 15 and 17), then a specified number (e.g. 648) of data cells 2400 will have 49 bytes in the traffic section 2404, a specified number (e.g. 33) of data cells 2400 will contain 50 bytes in the traffic section 2404, and the remaining number (e.g. 3) of data cells 2400 will have a variable number of bytes (e.g. 49, 50, or 51 bytes) within the traffic section 2404. Thus, in order to match the line rate of the DS3 line 2316, the cell formatter 2304 packs a different number of bytes into the traffic section 2404 of the data cell 2400.

In the example above, the cell formatter 2304 is configured by software to know which data cells 2400 contain 49 bytes and which bytes contain 50 bytes; however, the three remaining data cells 2400 contain a variable number of bytes (either 49, 50, or 51) depending on the line rate of the individual DS3 line 2316. If the DS3 line 2316 is "fast", there will be more bytes in the byte-stuffer 2308, and the remaining three data cells 2400 will contain 51 bytes. If the DS3 line 2316 is "slow", then the remaining three variable data cells 2400 will contain 49 bytes. If the DS3 line 2316 is about as expected, then the remaining three variable data cells 2400 will contain 50 bytes. The control byte 2406 added by the cell formatter 2304 in order to indicate to the receiving DS3 transparent SSI module 2300 (e.g. at the remote terminal) how many bytes are contained within the traffic section 2404 of the remaining variable data cells 2400. The buffer 2306 is used for messaging between the CPU 2310 and the channel and control module of the indoor unit.

Once the data cells 2400 are placed on the multi-transport mode cell bus 2302 by the cell formatter 2304, the data cells 2400 are sent over the air interface as a quad burst having a structure as shown in FIG. 7A. The quad bursts are received at the remote terminals, which route the cells to the corresponding DS3 transparent SSI module 2300 of the remote terminal.

At the remote terminal, the data cells 2400 arrive on the multi-transport mode cell bus 2302 at the cell formatter 2304 where the data bytes are unpacked from the data cells 2400. The cell formatter is configured by software to know which data cells 2400 contain the how many bytes, except for the remaining variable data cells 2400, which contain a variable number of data bytes due to the line of the DS3 line at the sending DS3 transparent SSI module 2300. The control byte 2406 supplies this information to the cell formatter 2304.

Additionally, as stated above, the DS3transparent SSI module 2300 assigns the control byte 2406 to indicate whether the remaining data cells 2400 contain 49, 50, or 51 bytes in their respective traffic section 2404. This practice is done in prior art DS3 transparent SSI modules in point to point links; however, at the receiving end, the matching DS3 transparent SSI module must read the control byte of every data cell to determine the number of bytes contained within the traffic section 2404 of the data cell 2400.

Advantageously, the present embodiment is configured, e.g. in 64-QAM mode, such that out of 171 64-QAM quad bursts within a 6 msec air interface frame format (an example of FIG. 5), there are only 3 possible data cells 2400 that could have a variable number of data bytes (e.g. 49, 50, or 51). Those 3 data cells 2400 are located in the last 3 data fields of the last 64-QAM quad burst as shown in FIG. 7A (i.e. quad burst #171): data field 2 704, data field 3 704, and data field 4 704, and get translated to the last three timeslots on the multi-transport mode cell bus 2302. This is due to the clock speed of the point to multipoint system, the length of the air frame format, the length of the data fields of the quad bursts, and the rate of which the byte-stuffer 2308 operates. Thus, advantageously, the cell formatter 2304 at the receiving DS3 transparent SSI module 2300 only has to read the control byte 2406 of the last three data fields 704 of the last quad burst, not the control bytes 2406 of all data cells 2400 received as conventional DS3 transparent SSI modules do. This feature reduces the processing requirements and improves the throughput of the DS3 transparent SSI module 1800.

Furthermore, due to the unique size of the traffic section 2404 of the data cell 2400 and that only the last three control bytes 2406 are read, only the two least significant bits in each control byte 2406 need to be read by the cell formatter 2304. The number of remaining data cells 2400 that have a variable length is derived from the worst case clock offsets (e.g. 89 parts per million) between the clock of the multi-transport mode cell bus 2302 and the clock of the DS3 line 2316. This greatly reduces the processing the cell formatter has to do for each received data cell 2400.

As the bytes are unpacked to the byte-stuffer 2308, a variable number of bytes are received into byte-stuffer 2308 to be output to the DS3 line 2316, which creates a clock delay. Thus, the jitter attenuator 2312, which comprises a FIFO (first in first out) and a phase locked loop (PLL), buffers the bytes for transmission on the DS3 line 2316. It stores the bits and transmits them onto the DS3 line 2316 at the average clock rate that the data bytes are received into the DS3 transparent SSI module 2300. Thus, the bits leaving the jitter attenuator 2312 leave at a constant rate, not effected by the potential stop and go clocking created when a received data cell 2400 contains a variable number of bytes. Thus, the timing of the signals from the point to multipoint system is adapted back to the timing of the incoming DS3 line 2316 at the remote terminal.

The data buffered in the FIFO of the jitter attenuator 2312 is sent due to clock edges from the PLL of the jitter attenuator 2312. The PLL is locked to a reference (i.e. clock) supplied by the cell formatter 2304. The use of a PLL is known; however, the use of a PLL in order to reduce jitter is unique to this embodiment of the present invention.

The number of bytes in the FIFO cause the reference to adjust, if necessary. Adjustments are made periodically by lengthening or shortening the reference to the PLL. The adjustment is dependent on the number of bytes in the FIFO of the jitter attenuator 2312 and the control byte 2406. The number of bytes in the FIFO control the polarity of the adjustment. For example, less than the expected number of bytes (e.g. 49), causes the reference to decrease, and more than the expected number of bytes (e.g. 51) causes the reference to increase. The control bytes 2406 of the remaining number of variable data cells 2400 dictates the adjustment to the reference. Thus, the rate of change at which bytes are output from the jitter attenuator 2316 is, in effect, limited; thus, reducing jitter on the output clock to the DS3 line input unit 2314 and DS3 line 2316.

Note that the data flow from the remote terminal back to the hub terminal is the same except reversed. Furthermore, the data transfer occurs simultaneously from the hub terminal to the remote terminal and from the remote terminal to the hub terminal. All of the components used are understood to those skilled in the art; thus, no further explanation is needed.

Multi-Transport Mode SSI Module

Figure 25A:
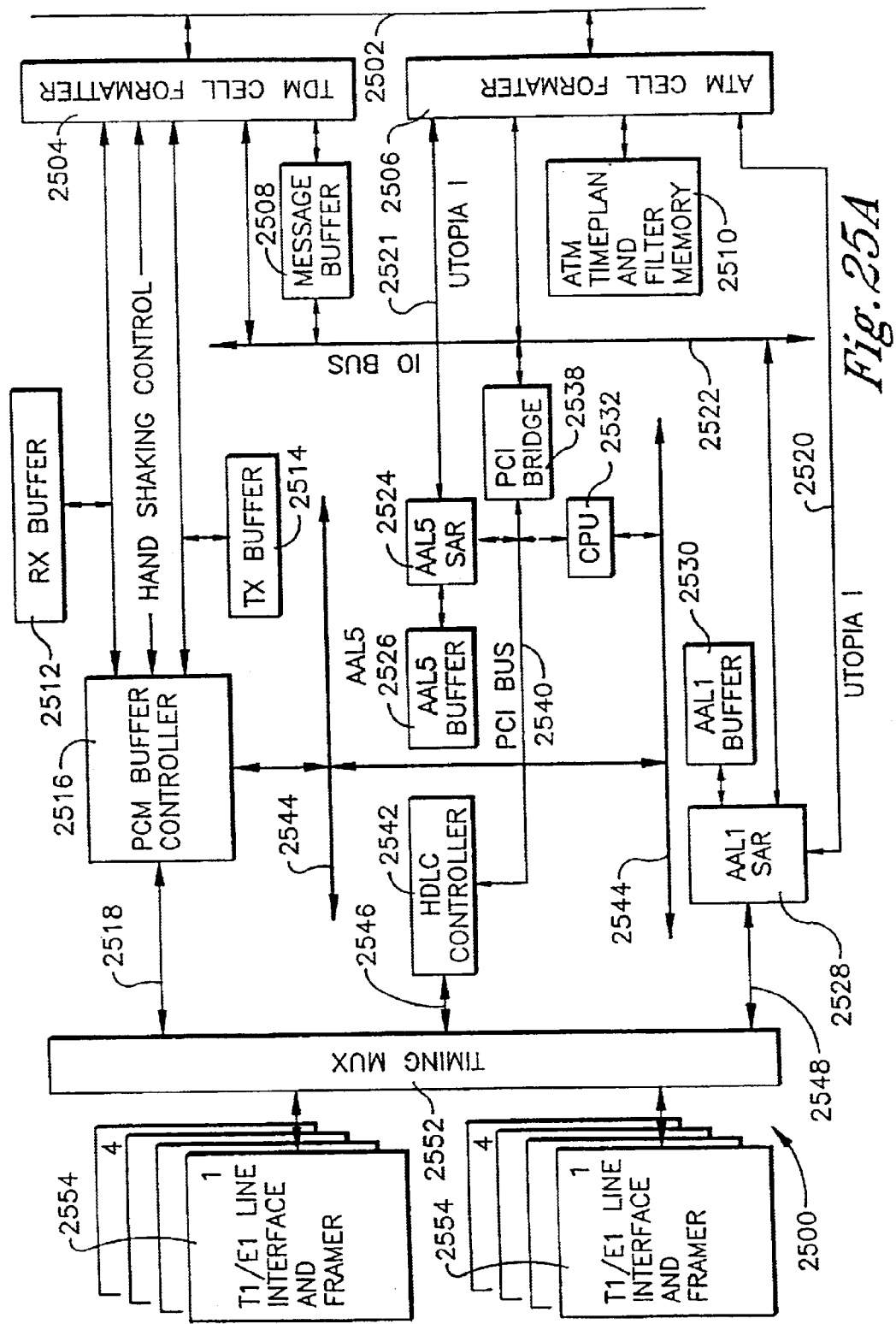
FIGS. 25A and 25B are functional block diagrams of a multi-transport mode service specific interface module having 8 T1 ports and a multi-transport mode service specific interface module having 4 T1 ports and 4 LAN ports, respectively, used in the point to multipoint system of FIG. 2.
Figure 25B:
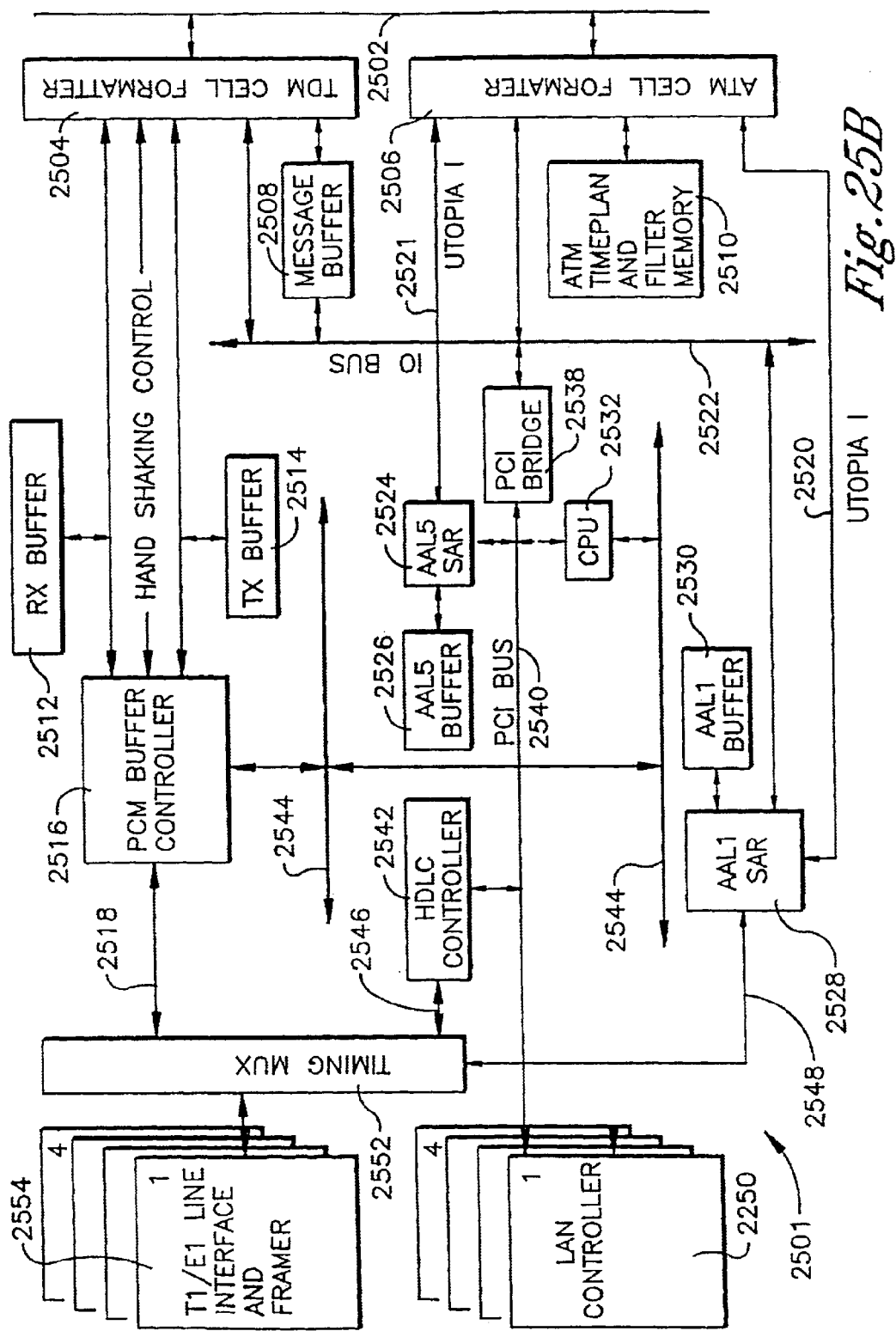

Referring next to FIG. 25A and 25B, a block diagram is shown for a multi-transport mode SSI module that is used in the remote terminal shown in FIG. 2. The multi-transport mode SSI module 2500 handles both synchronous traffic (TDM) and asynchronous traffic (ATM) and contains the multi-transport mode cell bus 2502, TDM cell formatter 2504 (TDM signal formatter), ATM cell formatter 2506 (ATM signal formatter), message buffer 2508, ATM timeplan and filter memory 2510, receive buffer 2512, transmit buffer 2514, PCM buffer controller 2516, PCM serial bus 2518, first utopia I bus 2520, second utopia I bus 2521, input/output (IO) bus 2522, AAL5 SAR 2524, AAL5 buffer 2526, AAL1 SAR 2528, AAL1 buffer 2530, central processing unit (CPU) 2532, PCI bridge 2538, PCI bus 2540, high-level data link control (HDLC) controller 2542, ROM bus 2544, Frame Relay serial bus 2546, CES serial bus 2548, LAN controller 2550 (shown in FIG. 25B for multi-transport mode SSI module 2501), timing multiplexer 1952, T1/E1 framers 2554.

The multi-transport mode cell bus 2502 is coupled to TDM cell formatter 2504 and the ATM cell formatter 2506. The TDM cell formatter 2504 is coupled to message buffer 2508, IO bus 2522, receive buffer 2512, transmit buffer 2514, and PCM buffer controller 2516. The PCM buffer controller 2516 is coupled to the timing multiplexer 2552 via a PCM serial bus 2518, and the ROM bus 2544. The ATM cell formatter 2506 is coupled to the ATM timeplan and filter memory 2510, and IO bus 2522. The AAL1 SAR 2528 and the AAL5 buffer 2526 are coupled to the ATM cell formatter via the first utopia I bus 2520 and the second utopia I bus 2521, respectively. The AAL1 SAR 2528 is coupled to the AAL1 buffer 2530 and the timing multiplexer 2552 via the CES serial bus 2548. The AAL5 SAR 2524 is coupled to the AAL5 buffer 2526 and the PCI bus 2540. The PCI bus 2540 is coupled to the IO bus 2522 via the PCI bridge 2538, CPU 2532, the HDLC controller 2542, and the LAN controllers 2550 (for the multi-transport mode SSI module 2501 in FIG. 25B). The HDLC controller 2542 couples to the timing multiplexer 2552 via a frame relay serial bus 2546. The timing multiplexer 2552 also couples to the T1/E1 framers 2554.

In practice, the multi-transport mode SSI module 2500 (also referred to as the universal SSI module), has the ability to handle both asynchronous traffic (such as ATM) and synchronous traffic (such as TDM) on the same card (SSI module). This feature is a departure from the prior art wherein SSI modules only handle either one transport mode or the other.

Additionally, the multi-transport mode SSI module 2500 is different than the previous SSI modules described above since, again, they only handle one traffic type or the other. However, like the multi-transport mode SSI module 2500, the SSI modules described above still must be able to interface with the multi-transport mode cell bus and properly format the data cells for transmission on the cell bus. Thus, the multi-transport mode SSI module 2500 is provided for subscribers who require both TDM and ATM services from the same card. It has eight T1/E1 interfaces 2554 in FIG. 25A and 4 T1/E1 interfaces 2554 and 4 LAN controllers 2550 for the multi-transport mode SSI module 2501 in FIG. 25B, but could be altered in manufacturing cased upon specific needs. Therefore, advantageously, the DS0s of a T1/E1 line can be transported in TDM mode or ATM (AAL1 or AAL5) mode selected on a per line basis. The data traffic is transported in TDM or ATM (AAL-1/AAL-5) for the T1/E1 interface (T1/E1 framer 2554) or ATM (AAL-5) for the LAN interface (LAN controller 2550).

The ATM and TDM traffic is received by the multi-transport mode SSI module 2500 through the multi-transport mode cell bus 2502. Since the traffic on the cell bus 2502 contains IM-Com cells including messages, and CB-Data cells including TDM and ATM cells; thus, the multi-transport mode SSI module 2500 must be able to sort the mixed traffic apart. There are two controllers (cell formatters) at the interface with the multi-transport mode cell bus 2502: the TDM cell formatter 2504 and the ATM cell formatter 2506. The TDM cell formatter 2504 is told which timeslots that it needs to listen to by reading the timeplan in the message buffer 2508, which is a dual port RAM, provided through the IM-Com messaging, so that it may copy the proper TDM cells from the cell bus 2502, and not unwanted TDM cells or ATM cells. The ATM cell formatter 2506 uses the ATM address filtering technique described in FIGS. 30–31B to extract only the ATM cells that are destined for the subscriber.

The TDM cell formatter 2504, which is custom logic, reads the time plan memory contained in the message buffer 2508 (e.g. 8k×8 dual port RAM) on every overhead timeslot of the multi-transport mode TDM cell bus 2502 (see FIG. 15). If enabled, the TDM cell formatter 2504 copies the IM-Com cell to the message buffer 2508, which is routed to the CPU 2532 through the IO bus 2522, PCI bridge 2538, and PCI bus 2540. The intermodule communication messages (from the IM-Com section) provide the means for the channel and control module of the indoor unit to communicate with the multi-transport mode SSI module 2500.

For TDM traffic, The TDM cell formatter 2504 reads the time plan memory from the message buffer 2508 on to the data cells. If a cell is enabled, it is copied to an internal fifo (first in first out). The destination buffer address is read from the time plan memory and the cell is copied to the receive buffer 2512 (e.g. 32k×32 synchronous static RAM) to be sent the PCM buffer controller 2516. The TDM cell formatter 2504 unpacks the specially formatted TDM cells (see FIGS. 29 and 41–43) into DS0s which include both PCM data and signaling data, such as call associated signaling (CAS). As will be described in FIG. 29, prior art TDM cells only contain PCM data or signaling data, not both data within the same TDM cell.

The TDM cell formatter 2504 further uses TDM buffering techniques which unpack the cells using a PCM mapping control structure (PMCS) contained in the message buffer 2508 according to the specific type of TDM cell. This TDM buffering is described more fully with reference to FIGS. 39 through 44B.

The PCM buffer controller 2516 extracts the DS0s (PCM data and CAS bits) from the receive buffer 2512 and packs the DS0s into T1/E1s (or DS1s). Thus, the PCM buffer controller 2516 converts the byte-serial data streams into 2 bit-serial data streams, one for PCM data and one for signaling, for the timing multiplexer 2552. The TDM cell formatter 2504, receive buffer 2512, and the PCM buffer controller 2516 function as a cross port switch. Advantageously, this function allows any timeslot from the cell bus 2502 to be mapped to any timeslot in any T1/E1 line. The PCM buffer controller 2516 is custom logic to allow for design flexibility. The timing multiplexer 2552 (timing mux) multiplexes the DS1 data and signaling streams from the PCM buffer controller 2516, via the PCM serial bus 2518, into one of the T1/E1 framers 2554 to be framed for transmission through one of the T1 lines. The T1/E1 framers 2554 insert the signaling into the output of the T1/E1 line. The TI framers 2554 support standard framing such as extended super frame (ESF). Note that the timing for the multi-transport mode SSI module 2500 is received from the multi-transport mode cell bus 2502, which, in turn, was recovered from the timing sent by the hub terminal. The timing is further discussed in FIGS. 13 and 14.

The data flow is just the opposite coming from the T1/E1 line to the multi-transport mode SSI module 2500 and to the multi-transport mode cell bus 2502. The framing is removed and the signaling is extracted by the T1/E1 framers 2554 from the DS1s. The timing multiplexer 2552 multiplexes the DS1s to the PCM buffer controller 2516. The PCM buffer controller 2516 unpacks the DS1s into DS0s, i.e. PCM data and signaling data, then copies the DS0s to the transmit buffer 2514 (e.g. 32k×32 SRAM) according to the TDM buffering described in FIG. 39. The transmit buffer 2514 behaves the same as the receive buffer 2512, only in the other direction. The TDM cell formatter 2504 packs the DS0s into specially designed TDM cells of FIGS. 29, 41, 42, and 43 to be transmitted onto the multi-transport mode cell bus 2502 at the appropriate time according the timeplan stored in the message buffer 2508. The TDM cell formatter 2504 packs the DS0s into different cell types to minimize delay depending on the data being sent using a PCM mapping control structure (PCMS) within the message buffer 2508. (see FIGS. 39 through 44B discussing TDM buffering). Once the cells are on the multi-transport mode cell bus 2502, they are modulated and carried, by the remote terminal, over the air interface (radio interface) to the hub terminal as discussed above.

For ATM traffic, the ATM cell formatter 2506 uses the ATM address filtering technique described with FIGS. 30–31A in order to distinguish the ATM cells from the TDM cells on the multi-transport mode cell bus 2502, and to further distinguish the ATM cells destined for the subscriber and the ATM cells that are to be discarded. The ATM address filtering technique also distinguishes between AAL1 and AAL5 cells. The ATM timeplan and filter memory 2510, which a RAM, contains the necessary ATM address filtering lookup tables described in FIGS. 3031A. The ATM timeplan and filter memory 2510 also contains the time plan for inserting ATM cells back onto the multi-transport mode cell bus 2502. The fact that the ATM formatter 2506 uses a timeplan to map ATM cells onto a cell bus is a departure from a prior art ATM-based SSI module. Typically, ATM cells are multiplexed onto a bus as they arrive without regard for a specific timeslot assignment, since the ATM cells are routed according to header information. This feature applies to all of the ATM-based SSI modules described herein.

Once an ATM cell is accepted, the AAL1 cells, such as circuit emulation service (CES), are copied to the AAL1 SAR 2528 (segmentation and reassembly), via a first utopia I bus 2520, while the AAL5 cells, such as frame relay cells, are copied to the AAL5 SAR 2524, via a second utopia I bus 2521. Both the AAL1 SAR 2526 and the AAL5 SAR 2528 use the AAL1 buffer 2530 and AAL5 buffer 2526, respectively, to pack the ATM cells into packets to be sent through the T1/E1 line. The AAL1 buffer 2530 and the AAL5 buffer 2526 are both static RAMS. The AAL1 packets contain CES and CAS signaling and are multiplexed to the timing multiplexer 2552 through the CES serial bus 2548. The AAL1 SAR 2528 supports up to 256 bi-directional CES+CAS channels to be assigned to individual timeslots within a maximum of 8 T1/E1 lines. For unframed, unchannelized links, the AAL1 SAR 2528 supports up to 8 bi-directional CES channels within 8 T1/E1 lines. The AAL1 SAR 2528 also supports synchronous residual time stamp (SRTS) for unchannelized, unframed T1 links.

The AAL5 SAR 2524 converts the ATM cells to frame relay packets to be sent, via a PCI bus 2540, to an HDLC (high-level data link control) controller 2542 where the frame relay packets are sent to the timing multiplexer 2552, via a frame relay serial bus 2546. For channelized links, the HDLC controller 2542 supports up to 128 bi-directional HDLC channels within 8 T1/E1 lines. For unchannelized links, the HDLC controller 2542 supports up to 8 bi-directional HDLC channels within 8 T1/E1 lines. The frame relay packets are multiplexed by the timing mux 2552 to the T1/E1 framers 2554 to be framed for transmission through one of the T1/E1 lines.

For ATM traffic from the T1/E1 line into the multi-transport mode SSI module 2500, the timing multiplexer 2552 sends the CES packets to the AAL1 SAR 2528 for AAL1 traffic. The timing multiplexer 2552 sends frame relay traffic (AAL5) to the HDLC controller 2542 which manages the different channels. The frame relay packets then go to the AAL5 SAR 2524 to be unpacked into ATM cells. The ATM cells go to the ATM cell formatter 2506 from either the AAL1 SAR 2528 via the first utopia I bus 2520 or from the AAL5 SAR 2524 via the second utopia I bus 2521. The ATM timeplan and filter memory 2510 contains the time plan for copying ATM cells to the multi-transport mode cell bus 2502. The ATM cell formatter 2506 does not have access to the intermodule communication timeslots (IM-Com) of the cell bus. Only the TDM cell formatter 2504 formats the IM-Com timeslots in this embodiment. Note that the cells from the AAL1 SAR 2528 are forwarded to the multi-transport mode cell bus at a higher priority than those from the AAL5 SAR 2524, since the AAL1 cells are more delay sensitive.

As shown in FIG. 25B, the multi-transport mode SSI module 2501, alternatively, has four T1 line interfaces 2554 and four LAN controllers 2550. The LAN controllers 2550 supports 10/100base-T connections to an Ethernet network. This is provided to support subscribers requiring more bandwidth than a T1 line provides. The LAN controller 2550 controls the flow of 10/100base-T traffic to and from the AAL5 SAR 2524.

Note that not all of the functional components of the multi-transport mode SSI modules 2500 and 2501 have been fully described. Such components, and their implementation, are known to those skilled in the art; thus, no further explanation is needed.

Furthermore, since any timeslot from the multi-transport mode cell bus 2502 can be mapped to any DS0 of the T1/E1 line, and since the timing multiplexer 2552 multiplexes both ATM packets and TDM packets, a single T1 line (or E1 line) can be broken down by DS0s. For example, the first five DS0s (out of 24 DS0s in a T1 line) can be used for AAL5 traffic (frame relay), while the next 10 DS0s are used for AAL1, and last nine DS0s can be used for TDM traffic. Advantageously, this provides the subscribers with great flexibility in channel assignment.

ATM Address Filtering

Referring next to FIG. 26, a block diagram is shown that illustrates an ATM address filtering technique, performed by an ATM switch 2600 of the ATM-OC3c SSI module as ATM traffic enters the point to multipoint system of FIG. 2 at the hub terminal. In addition, FIG. 27, which is a flowchart illustrating the steps involved in the ATM address filtering technique associated with FIG. 26. Thus, the steps in FIG. 27 will be referred to while discussing FIG. 26. Shown in FIG. 26 is the ATM switch 2600 configured for a multi-modulation environment containing a backhaul line 2602, Phy 2604, ATM line and buffer manager 2606 (hereinafter referred to as the ALBM 2606), Utopia II bus 2608, ATM formatter 2610, n modulation buffers 2612, the multi-transport mode cell bus 2614, and timeplan/modulation lookup table 2616.

For the ATM switch 2600, the backhaul line 2602 is connected to the Phy 2604. A Utopia II bus 2608 couples the Phy 2604 to the ALBM 2606. The Utopia II bus 2608 also couples the ALBM 2606 to each of n modulation buffers 2612, of the ATM formatter 2610, which are configured Phys in conventional ATM switches. Each of the multi-modulation buffers 2612 are located within the ATM formatter 2616 and are coupled to the multi-transport mode cell bus 2614.

In practice, this ATM address filtering technique is used at the hub terminal in the ATM-OC3c SSI module (see FIG. 22). The ATM address filtering technique filters the ATM traffic to the correct remote terminal by routing the ATM traffic to different modulation buffers 2612; thus, creating differently modulated streams of ATM traffic. The modulation buffers 2612 buffer the ATM cells to be placed on the multi-transport cell bus 2614. The ATM cells in the different modulation buffers 2612 will be modulated using a different modulation. Only the remote terminals able to demodulate the particular modulation will receive the ATM cells.

The core of the ATM switch 2600 is the ALBM 2606 is a conventional off-the-shelf ATM chipset as known in the art. The ATM chipset, as designed, was not intended for use in wireless systems. The ATM chipset has no capacity or knowledge to understand modulations or time plans. It only knows that it supports n Phys, each Phy is associated with a Phy address on the Utopia bus (here, Utopia II bus 2608). The Phy is an abbreviation for "physical" and is a physical layer ATM device, such as a cell delineator or a buffer, that performs the physical layer ATM functions. This ATM address filtering technique uses the ATM chipset (as the ALBM 2606) in a unique way to replace a much more complex method of creating overhead messaging to split the ATM cells into one of the differently modulated traffic streams.

In this embodiment of the present invention, the ATM switch is configured such that each of the n Phys acts as a modulation buffer 2612 for a different modulation type. Each modulation buffer 2612 corresponds to one modulation stream. Thus, there is a unique mapping of the Phy addresses on the Utopia II bus 2608 to a specific modulation type according to respective modulation buffers 2612. The n Phys become n modulation buffers 2612. Furthermore, the specific virtual path identifiers (VPIs) and virtual channel identifiers (VCIs) are uniquely associated with respective modulation modes to be used for each modulation buffer 2612. In this embodiment, there are three modulation buffers 2612 and thus there are three groups of VPI/VCI's. Each group maps to one of the modulation buffers 2612. The mapping from each group of VPI/VCI's is determined by the destination remote terminals modulation type. This ensures that an ATM cell that arrives from the backhaul line 2602 gets routed to the correct modulation stream, and thus the correct remote terminal.

The ALBM 2606 monitors the depth of its own internal buffers and performs the ATM quality of service functions, while the ATM formatter 2610 controls the timeslots that ATM cells are sent to the multi-mode radio (either hub terminal or remote terminal), and thus, the modulation mode used. For example, the first modulation buffer 2612 will support QPSK, the second modulation buffer 2612 will support 16-QAM, and the third modulation buffer 2612 will support 64-QAM. Thus, ATM cells will be dynamically routed to the appropriate modulation buffer 2612 depending on the header information (VPI/VCI). And, thus, the VPI and VCI are used to map the ATM cells to respectively modulated traffic streams.

In operation, the ATM traffic enters a Phy 2604, which is a cell delineator from the backhaul line 2602. The backhaul 2602 is typically an OC3c line, but may be another physical medium known in the art. The ATM cells are delineated at the Phy 2604; thus, the payload (ATM cells) is extracted from the frame and sent to the ALBM 2606. The Utopia II bus 2608 carries the cells to the ALBM 2606. The ATM chipset or ALBM 2606 guarantees quality of service (QOS) on a per-VC (virtual channel) basis. It has sophisticated built in hardware to manage the QOS in a very responsive manner. Thus, the ALBM 2606 buffers the arriving ATM cells according to the configured priorities associated with the virtual channels (Step 2702 of FIG. 27). The ALBM 2606 supports multiple Phys, here n Phys. The n Phys are each very shallow FIFOs (first in, first out) that only hold two cells.

The timeplan/modulation lookup table 2616 contains the timeplan, the Phy (here, modulation buffer 2612), and the modulation mode used for each timeslot of the multi-transport mode cell bus 2614. The timeplan/modulation lookup table 2616 is coupled to the ATM formatter 2610 and is stored within a buffer or memory, such as a static RAM. The ALBM 2606 reads the header information (VPI and VCI) of the ATM cells to know which modulation buffer 2612 to send the ATM cells to. The ALBM 2606 then transmits the ATM cells to modulation buffers 2612 of the ATM formatter 2610 when the ATM formatter 2610 instructs it to do so, as described below.

In order to ensure that the ALBM 2606 sends the ATM cells at the correct rate, the ATM formatter 2610 only accepts ATM cells on a per Phy basis that matches the rate for the corresponding modulation mode. This is a "back-pressure" loading technique wherein the ATM formatter 2610 performs a lookup in the timeplan/modulation lookup table 2616 for each timeslot of the multi-transport mode cell bus 2614. The timeplan/modulation lookup table 2616 tells the ATM formatter 2610 which ATM cells from which modulation buffers 2612 go into which timeslot of the multi-transport mode cell bus 2614. Thus, the ATM formatter 2610 determines when each modulation buffer 2612 is active for a particular timeslot using the timeplan/modulation lookup table (Step 2704 in FIG. 27), then asserts a handshake signal on the Utopia II bus 2608 (Step 2706 of FIG. 27). At the same time, the ALBM 2606 is constantly polling all of its Phys (including modulation buffers 2612) looking for an active handshake signal. When the ALBM 2606 sees an active handshake signal, the ALBM 2606 transmits the appropriate ATM cell to the active Phy, and thus, the active modulation buffer 2612 (Step 2708 of FIG. 27). Then, the ATM formatter 2610 forwards the ATM cells from the modulation buffers 2612 to the appropriate timeslot of the multi-transport mode cell bus 2614 (Step 2710 of FIG. 27).

Therefore, in summary, this scheme produces three separate modulation streams of ATM cells, one for each modulation type. The ATM cells are copied from each modulation buffer 2612 onto the multi-transport mode cell bus as CB-Data cells (see FIG. 15). The CB-Data cells are then sent to the channel and control module of the indoor unit of the hub terminal where they are mapped to a corresponding air interface frame format (see FIGS. 5 and 15) and modulated to one of the three modulations of the multi-modulation modem (see FIG. 11) according to which timeslot the cells are located. Thus, each modulation stream is made up of groups of timeslots, where each group of timeslots is modulated with a different modulation. The timeslots in each group do not have to be sequential.

Thus, advantageously, the ATM switch 2600 conveniently configures the ALBM 2606 such that each Phy address on the Utopia bus has a one to one association with a modulation type in order to create differently modulated streams of ATM cells. Also, each set of VPIs and VCIs are associated with a modulation type. It is important to note that the Utopia II bus 2608 is shown as two separate busses in FIG. 26; however, it is physically one bus, as is understood in the art.

In another embodiment, the ATM filtering shown in FIG. 26 may separate the ATM cells from more than one sub-channel into separate streams of modulated traffic. The embodiment above creates differently modulated streams of ATM cells for one subchannel of a frequency channel. In order to support more than one subchannel, more than one ATM formatter 2610 is needed, i.e., one ATM formatter 2610, for each subchannel (in this embodiment a subchannel is 12.5 MHz). Thus, instead of one ATM formatter 2610, there are n ATM formatters 2610 for n subchannels. The Utopia II bus 2608 is able to support up to 30 devices total. Thus, a multi-subchannel ATM switch 2600 with a single ALBM 2606 may support up to 9 subchannels, i.e. nine ATM formatters 2610 each having three modulation buffers 2612, for example. In such a multi-channel ATM switch, each Phy address would be uniquely associated with a specific subchannel and a specific modulation type corresponding to a specific modulated stream of traffic.

Another method to create differently modulated streams would be to add a "tag" to each ATM cell. The tag is known in the art and is similar to a header that routes the ATM cell to the desired location, e.g. a respective modulation buffer 2610. However, the tag adds to the ATM cell and to the cell processing, and does not take advantage of the ATM chipset's configured priorities.

FIG. 26 corresponds to FIG. 22 which describes the ATM-OC3c SSI module, such that the ALBM 2606 of FIG. 26 is the same as the ALBM 2211 including the buffer manager 2216, buffer manager buffer 2218, cell processor 2212, and the cell processor buffer 2214 of FIG. 22. The ATM formatter 2224 of FIG. 22 is the same as the ATM formatter 2610 in FIG. 26 and contains each of the n modulation buffers 2612. The timeslot/modulation lookup table 2616 is contained in the formatter buffer 2226 of FIG. 22.

Next, an introduction to the basic cell structures of the standard ATM cell and the specially designed TDM cell used in this embodiment of the present invention will assist in the clarification of the address filtering technique process done at the SSI modules of the remote terminal.

Referring next to FIG. 28, a block diagram is shown for an Asynchronous Transfer Mode (ATM) cell 2800 used in the point to multipoint system of FIG. 2. The ATM cell 2800 is a standard cell known in the art and has a header section 2802 and a data section 2804. The header section 2802 contains a virtual path identifier (VPI) 2806, virtual channel identifier (VCI) 2808, and other headers 2810. The standard ATM cell 2800 is 53 bytes in length. The header section 2802 is five bytes and the data section 2804 is 48 bytes. The header section carries standard information, such as the VPI, VCI and other headers known in the art. The VPI 2806 is 8 bits and identifies the virtual path and the VCI 2808 is 16 bits and identifies the virtual channel. The VPI and VCI are inserted at the ATM formatter of the ATM-based SSI modules at the hub terminal so that the ATM-based SSI modules of the remote terminal can retrieve the proper ATM cells.

Referring next to FIG. 29, a block diagram is shown for a time-division-multiplexed cell (hereinafter referred to as a TDM cell 2900) used in one embodiment of the point to multipoint system. The TDM cell 2900 has a data section 2902 and a header section 2904 containing a virtual path identifier (VPI) 2906, and other headers 2908. Note that the TDM cell 2900 can also be referred to as a TDM packet; however, the specification refers to it as a TDM cell since it is being modeled after an ATM cell. Additionally, the ATM cells 2800 and TDM cells 2900 can be referred to generically as ATM signals and TDM signals.

Advantageously, the TDM cell 2900 is designed to be the same length as the standard ATM cell (i.e. 53 bytes) so that the ATM cells 2800 and the TDM cells 2900 can be interchanged within the same data cell (data cell 1704 in FIG. 17) on the multi-transport mode cell bus and within the same data field (data fields 704 of FIGS. 7A–7B) of the air interface frame format.

Furthermore, the TDM cell 2900 has a 5 byte header section 2902 and a 48 byte data section 2904, similar to the ATM cell. This is a departure from prior art TDM cell structures. Prior art TDM cell structures, no matter what length, do not require header sections 2902 since they are transported and switched according to which timeslot the TDM cell is in. Additionally, the TDM cell 2900 uses an ATM specific header, VPI 2906, inserted into its header section 2902. Thus, the use of a header section on a TDM cell 2900 and especially, an ATM header, VPI 2906, on a TDM cell 2900 is unique to this embodiment of the present invention. The VPI 2906 is inserted in the TDM cell 2900 by the cell formatter of the TDM-based SSI modules at the hub terminal. The VPI 2906 is positioned into the exact location within the header section 2902 as the VPI 2906 would be found on an ATM cell and is used in the address filtering techniques described below.

In addition, the data section 2904 is typically used to carry pulse-code-modulated data (hereinafter referred to as PCM data) from a digital signal level zero (also known as a DS0). PCM data and DS0s are well known in the art and; thus, no further explanation is needed. Signaling data, such as channel associated signaling (also known as CAS) corresponds to the PCM data and is sent in separate TDM cells. In this embodiment of the present invention, the other headers 2908 in the header section 2902 are not wasted but, advantageously, are used to carry the signaling data, while the data section 2904 is used to carry the PCM data. Placing signaling data and PCM data into the same TDM cell 2900 is a departure from a conventional TDM cell that only contains PCM data or signaling data. Thus, the need to carry signaling data and PCM data in separate TDM cells which are separately switched according to timeslots is eliminated. Note that the signaling data still must be separated from the PCM data. Refer to the TDM buffering described in FIGS. 41 through 43 for more details.

Another feature of this embodiment is that the data section 2904 can be broken down to carry PCM data from more than one DS0. A conventional TDM cell only carries data from 1 DS0. Depending on the specific TDM cell type as described in FIGS. 41 through 43, multiple DS0s from a T1 line can be multiplexed into the same TDM cell. This process is further explained in FIGS. 39 through 44B.

Referring next to FIG. 30, a block diagram is shown for an ATM address filtering function that is performed at every ATM-based SSI module, such as shown in FIGS. 20, 22, 25A and 25B at the remote terminals. Corresponding steps from FIGS. 31A and 31B, which illustrate the steps performed in the ATM address filtering techniques at the ATM-based SSI modules, will be referred to while referring to FIG. 30. The ATM address filtering diagram 3000 shows a multi-transport mode cell bus 3002, ATM formatter 3004 (or ATM signal formatter) containing a VPI compare 3006, an optional VPI lookup table 3007 and optional VPI accept/discard bit 3009 (for the ATM-OC3c SSI module of FIG. 22), buffer 3008 containing a VCI lookup table 3010, Utopia bus 2312, and a TDM cell formatter 3022 (or TDM signal formatter). The VCI lookup table 3010 has an VCI accept/discard bit 3016, AAL1/AAL5 bit 3018, and a second 8 bit portion 3020. The VPI compare 3006 includes the extracted VPI 3024, a register 3026, and a comparator 3028. Also shown are an AAL1 SAR 3013 and an AAL5 SAR 3014.

The multi-transport mode cell bus 3002 is coupled to the ATM formatter 3004 and the TDM cell formatter 3022. The ATM formatter 3004 contains the VPI compare 3006 and the optional VPI lookup table 3007. The ATM formatter 3004 is coupled to the buffer 3008, Utopia bus 2312. The buffer 3008 contains the VCI lookup table 3010. The ATM formatter 3004 and the TDM cell formatter 3014 are both custom logic devices.

In practice, the multi-transport mode cell bus 3002, as described with reference to FIGS. 15–18 interfaces with an ATM formatter 3004 and/or a TDM cell formatter 3022 depending on which SSI module is inserted into an SSI slot of the indoor unit at the remote terminal. The ATM address filtering technique is done at the ATM SSI modules (e.g. Quad DS1/AAL1 SSI module, multi-transport mode SSI module, and the ATM-OC3c SSI module) at the indoor unit of the remote terminal for mixed traffic flowing from the hub terminal to the remote terminal and exiting the point to multipoint system to the subscribers. This technique is used to distinguish TDM cells from ATM cells received on the multi-transport mode cell bus 3002. Once the right type of cell is sorted, the cells need to be further sorted to determine which cells on the multi-transport mode cell bus 3002 are destined for the particular SSI module.

The block diagram shown is for a generic ATM SSI module, rather than describing a particular SSI module, e.g. the Quad DS1/AAL1 SSI module as described in FIG. 20, the ATM OC3c SSI module of FIG. 22, or the multi-transport mode SSI module in FIGS. 25A and 25B. Thus, the block diagram of FIG. 30 and the flowcharts of FIGS. 31A and 31B represent the process carried out at each ATM SSI module at the remote terminal, regardless of the type. Note that only the multi-transport mode SSI modules in FIGS. 25A and 25B actually contain both the ATM formatter 3004 and the TDM cell formatter 3022, while the other ATM-based SSI modules only contain an ATM formatter 3004 and not the TDM cell formatter 3022.

For an SSI module (i.e. a TDM-based SSI module) that is configured for TDM traffic, the filtering process is relatively simple. The IM-Com message slots on the multi-transport mode cell bus 3002 (see FIG. 15) provide the TDM cell formatter 3022 with the appropriate time slots to listen to. This time plan is stored in a message buffer (not shown). Thus, the TDM cell formatter 3022 simply pulls the TDM cells from the time slots that it is configured to. This ensures that the TDM cell formatter 3022 will only copy the desired TDM cells, and not unwanted TDM and ATM cells.

For an SSI module (i.e. ATM-based SSI module) that is configured for ATM traffic, the filtering process involves a compare and table lookup scheme. The ATM formatter 3004 receives every incoming cell on the multi-transport mode cell bus 3002 containing both TDM and ATM cells (Step 3100 of FIG. 31A) and temporarily stores it in an internal FIFO (first in first out). Then, the ATM formatter 3004 performs a VPI extraction on the received cells and then the VPI compare 3006 compares the extracted VPI against a stored VPI for the particular SSI module; thus, performing a VPI comparison (Step 3102 of FIG. 31A). The VPI compare 3006 uses a comparator 3028 to compare the extracted VPI 3024 with an internal VPI that is stored within a register 3026. (Step 2352 of FIG. 23A). If the VPI of the incoming cell matches the internal VPI (Step 3104 of FIG. 31A), then the cell is kept. All other incoming cells with non-matching VPIs are discarded (Step 3106 of FIG. 31A). Since all TDM cells have a VPI that is unique to TDM cells as described above in FIG. 29, in the same position as an ATM VPI header, the VPI compare 3006 of the ATM formatter 3004 simply reads the VPI of the TDM cell and discards the TDM cell just as if it were an ATM cell. Thus, only the ATM cells destined for the particular SSI module are kept. Thus, the TDM cells are distinguished from the ATM cells to be kept by the particular SSI module. Furthermore, the VPI compare could be configured to specifically match the assigned VPI of the TDM cells and discard the TDM cells on this basis. Thus, again the ATM cells would be distinguished from the TDM cells.

The next step in the process once the ATM cells have been kept, is to do a VCI lookup on the kept ATM cells in the VCI lookup table 3010 (Step 3108 of FIG. 31A) located in the buffer 3008, which is a static RAM, on the VCI header 2808 of kept ATM cells. The VCI lookup step extracts the 14 least significant bits of the VCI and applies these bits as an index into the VCI lookup table 3010. The VCI lookup table 3010 supports 214 addresses but could support up to 216 addresses. Once the index is applied, 16 bits are read out of the VCI lookup table, and latched in the ATM formatter 3004, in a single access. The first 8 bits of the lookup table contain a VCI accept/discard bit 3016 and an AAL1/AAL5 bit 3018. If the VCI accept/discard bit is a "0" (Step 3110 of FIG. 31A), there is not a match and the ATM cell is discarded with no further processing (Step 3106 of FIG. 31A). If the VCI accept/discard bit is a "1" (Step 3110 of FIG. 31A), there is a match and the ATM cell is kept.

Additionally, if the ATM cell is kept, the VCI lookup table 3010 includes an AAL1/AAL5 bit 3018 which tells the ATM formatter 3004 if the ATM cell is an AAL1 ATM cell or an AAL5 ATM cell (Step 3112 of FIG. 31A) and should be routed to the AAL1 SAR 3013 or the AAL5 SAR 3014 via the Utopia bus 3012. If a matched cell is an AAL5 cell (Step 3112 of FIG. 31A), then it will be routed to the AAL5 SAR 3014 via the Utopia bus 3012 to be processed as described earlier in the specification (Step 3114 of FIG. 31A).

If the matched cell is an AAL1 cell (Step 3112 of FIG. 31A), then the cell will be sent to the AAL1 SAR 3013 via the Utopia bus 3012. However, the cell will be slightly modified. The lower 8 bits of the VCI need to be translated by performing a lower VCI translation (Step 3116 of FIG. 31A). The AAL1 chip used requires physical information in the lower 8 bits, instead of the standard ATM VCI. Advantageously, the VCI lookup table 3010 is loaded with software based upon the specific user configuration. Thus, the VCI is translated to a form allowing more flexibility in channel identification to the subscriber. Advantageously, the lower VCI translation is performed at the same time the lookup step is done, instead of having to do two separate lookups. If the AAL1 cell is accepted, then the lower 8 bit VCI which is stored in the second 8 bit portion 3020 of the VCI lookup table 3010 becomes the new lower VCI. The new lower 8 bit VCI is lached onto the ATM cell before the cell is routed to the AAL1 SAR 3013 (Step 3118 of FIG. 31A). Advantageously, this requires only one lookup and saves processing time since it happens at the same time as the VCI lookup. This process is done for every cell that is accepted. If the cell is AAL5, then the lower 8 bit VCI 3020 is discarded.

It is important to show that the VCI table lookup combines several lookups into one VCI lookup table 3010. A prior art VCI lookup performs one accept/discard lookup, one AAL1/AAL5 lookup, and one lower VCI translation lookup. This embodiment combines all three lookups into the VCI lookup table 3010. A combination of any two lookups is a departure from prior art ATM address filtering techniques. Again, this saves processing time and ATM cells can be routed with minimal delay.

Note that some embodiments (not shown), the ATM based SSI modules may be designed to support only AAL1 or AAL5 and not both. Thus, FIG. 30 would need to be modified to remove one of the AAL1 SAR 3013 or the AAL5 SAR 3014. The AAL1/AAL5 bit is not needed in this embodiment.

The ATM address filtering process is done differently for an ATM-OC3c SSI module 2200 of FIG. 22 used at the remote terminal than for the other ATM-based SSI modules at the remote terminal, and is reflected in the flowchart of FIG. 31B. Here, the ATM address filtering function is different because the throughput on the ATM-OC3c SSI module 2200 is much higher than the throughput of other types of SSI modules located at the remote terminal. The OC3c line sends data at 155.52 Mbps (mega bits per second) which is equivalent to about three DS3 lines. The flowchart in FIG. 31B also applies to the DS3 option to the ATM OC3c SSI module.

In FIG. 31B, the first three steps are the same as the first three steps of FIG. 31A. Thus, the cells are received from the multi-transport mode cell bus (Step 3150 of FIG. 31B), a VPI comparison is done (Steps 3152 and 3154 of FIG. 31B) between the extracted VPI 3024 and the VPI stored in the register 3026 just as in Steps 3102 and 3104 of FIG. 31A. If the VPI matches (Step 3154 of FIG. 31B), a VCI lookup is performed (Step 3156 of FIG. 31B) using the VCI lookup table 3010 as described above. Thus, the if the VCI accept/discard bit equals "1" (Step 3158 of FIG. 31B), the ATM cell is accepted. If the VCI accept/discard bit equals "0" (Step 3158 of FIG. 31B), then the cell is accepted (Step 3162 of FIG. 31B). It is important to note that no TDM cells will go through the path indicated by Steps 3156 and 3158, since the VPI did match in Step 3154.

If the VPI does not match (Step 3154 of FIG. 31B), the cell is not discarded, but a VPI lookup is done (Step 3164 of FIG. 31B) is the VPI lookup table 3007 of the ATM formatter 3004. The VPI lookup table 3007 is 8 bit table having a depth of 28 entries. The extracted VPI is used as an index into the VPI lookup table 3007. If the VPI accept/discard bit 3009 equals "1" (Step 3166 of FIG. 31B), then the cell is accepted (Step 3162 of FIG. 31B). If the accept/discard bit equals "0" (Step 3166 of FIG. 31B), the cell is discarded (Step 3160 of FIG. 31B). The VPI accept/discard bit 3009 has been assigned for the specific VPIs of the ATM cells that the particular ATM OC3c SSI module is configured to accept. Thus, the TDM cells are discarded from the ATM cells at the VPI lookup since the VPI assigned to the TDM cell is unique to TDM cells and its corresponding index into in the VPI lookup table 3007 will always have an accept/discard bit 3009 that indicates to discard the cell. Thus, all TDM cells are discarded at the VPI lookup table 3007.

Furthermore, this provides a "VCI transparent" service if the extracted VPI does not match the preassigned VPI that is specific to the particular SSI module. Thus, ATM cells are passed through the SSI module without performing a VCI lookup. Thus, all the ATM cells having preconfigured VPIs are forwarded through the ATM-OC3c SSI module to the subscribers.

In the embodiment shown in FIGS. 30 and 31B, the ATM-based SSI module (e.g. ATM OC3c SSI module), advantageously performs a VPI comparison, and then either a VPI lookup or a VCI lookup on each cell that enters the ATM-based SSI module. Advantageously, the ATM-based SSI module doe not perform both a VPI lookup and VCI lookup on each cell. And thus, advantageously, the processing time, which is a concern due to the throughput of the ATM OC3c SSI module, is reduced using this embodiment.

Additionally, the ATM-based SSI modules are described as receiving traffic from a mixed transport mode interface, such as the multi-transport mode cell bus. However, the present invention is not limited to this description. The ATM-based SSI modules could be receiving only ATM cells, and not mixed cells, and the same ATM address filtering techniques are performed in order to correctly filter and route the ATM cells to the desired locations.

The address filtering techniques are performed at the SSI modules of the multi-transport mode, multi-modulation point to multipoint system. The components described are common and understood by those skilled in the art.

Extension Indoor Unit and Fiber Extender Modules

Figure 32:
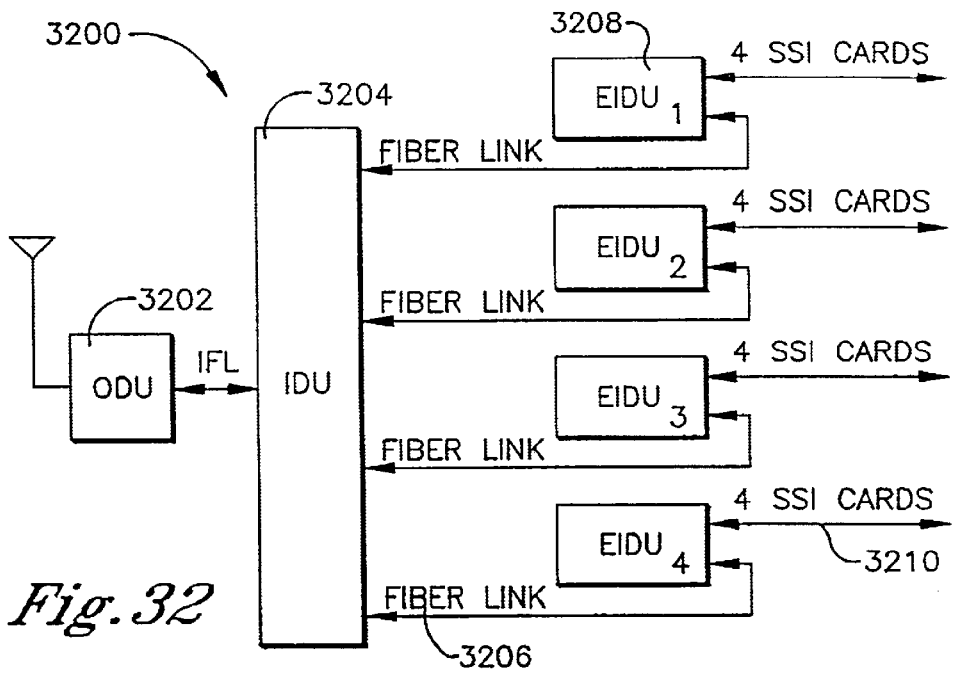
FIG. 32 is a block diagram of extension indoor units coupled to the indoor unit of multi-mode remote terminals of FIG. 9.

Referring next to FIG. 32, a block diagram is shown of 4 extension indoor units coupled to the each of the service specific interface ports of the indoor unit of the remote terminal as shown in the embodiment of FIG. 2. The diagram 3200 includes: an outdoor unit 3202 (transceiver unit or ODU) of the remote terminal coupled to an indoor unit 3204 (channel processing unit or IDU) of the remote terminal, fiber links 3206, each coupling 4 extension indoor units 3208 (EIDU) to the indoor unit. 3204. Each extension indoor unit 3208 has four SSI modules (cards) 3210.

In order to allow for more subscriber interfaces and to allow the subscribers to interface with the point to multi-point system up to 2250 feet from the indoor unit 3204, the extension indoor unit 3208 (EIDU) couples to one of the SSI ports of the indoor unit 3204 via a fiber link 3206. The EIDU 3208 allows up to 4 other SSI modules 3210 to interface with the point to multipoint system. The number of extension indoor units 3208 and individual SSI ports may vary depending on implementation. Thus, a maximum configuration allows up to 16 SSI modules 3210 to be plugged into a single indoor unit 3204 at a remote terminal.

This is a departure from a prior art extension indoor unit and expansion interface. A prior art system uses a bus repeater, such as a ribbon cable, which is a high density copper cable to repeat (or extend) the bus that is carrying signals. However, the bus repeater is only able to extend the bus a few feet, unlike the multi-mode fiber link 3206 that can extend the multi-transport mode cell bus up to 2250 feet. This is particularly advantageous, since the subscriber may interface with the indoor unit of the remote terminal up to 2250 feet away from the actual indoor unit. Thus, a subscriber could interface with the point to multipoint system at many different locations within the subscriber's premises (typically a large building) with an indoor unit 3204 located elsewhere within the subscriber's premises. With a prior art system, a subscriber must interface within a few feet of the actual indoor unit of the remote terminal.

The EIDU 3208 is connected to the indoor unit 3204 of the remote terminal with a fiber extender module, called the "master" fiber extender module, (see FIG. 33) that is attached to the SSI port of the indoor unit 3204 and connected to a multi-mode fiber link 3206. The multi-mode fiber link 3206 is a fiber optic cable that acts as an extension of the multi-transport mode cell bus. The multi-mode fiber link 3206 is a 200 MHz link and connects to the extension indoor unit 3208 with another fiber extender module, called the "slave" fiber extender module, (see FIG. 33) inserted into the extension indoor unit 3208. The "master" and "slave" fiber extender modules are the same module, but are located at the indoor unit of the remote terminal and the extension indoor unit, respectively. The fiber link 3206 is a multi-mode fiber known in the art. It has a maximum length of 2250 feet and transmits with a bit error rate of $10^{-12}$ or less. Alternatively, the distance can be extended further if single mode fiber is used instead of multi-mode fiber for the fiber links 3206. Note that "multi-mode" used referring to the cable does not refer to multi-modulation and multi-transport capabilities as suggested earlier. The multi-mode cable is simply a commonly understood type of cable.

The "master" fiber extender module format the signals on the multi-transport mode cell bus for the fiber link 3206 and retransmits the signals, including the timing (which was derived from the hub terminal over the air interface), over the fiber link 3206. The "slave" fiber extender module then converts the signals from the fiber link 3206 back to the format of the multi-transport mode cell bus and transmits the signals onto another multi-transport mode cell bus of the EIDU 3208. The timing of the signals is advanced or retarded such that it will match the timing of the original signals at the indoor unit 3204. Thus, the SSI modules 3210 at the EIDUs 3208 appear to be coupled directly to the inddor unit 3204 itself.

The actual extension indoor unit 3208 only contains a fiber extender module, a backplane bus which includes the multi-transport mode cell bus, and four SSI ports for SSI modules 3210. It simply acts as an extension of the multi-transport mode cell bus, so that additional subscriber interfaces can be made. Furthermore, this is a departure from prior art extension units, since the prior art extension links (ribbon cable) and prior art extension units only support one type of traffic (ATM or TDM), whereas the present embodiment supports both traffic types (ATM and TDM).

Figure 33:
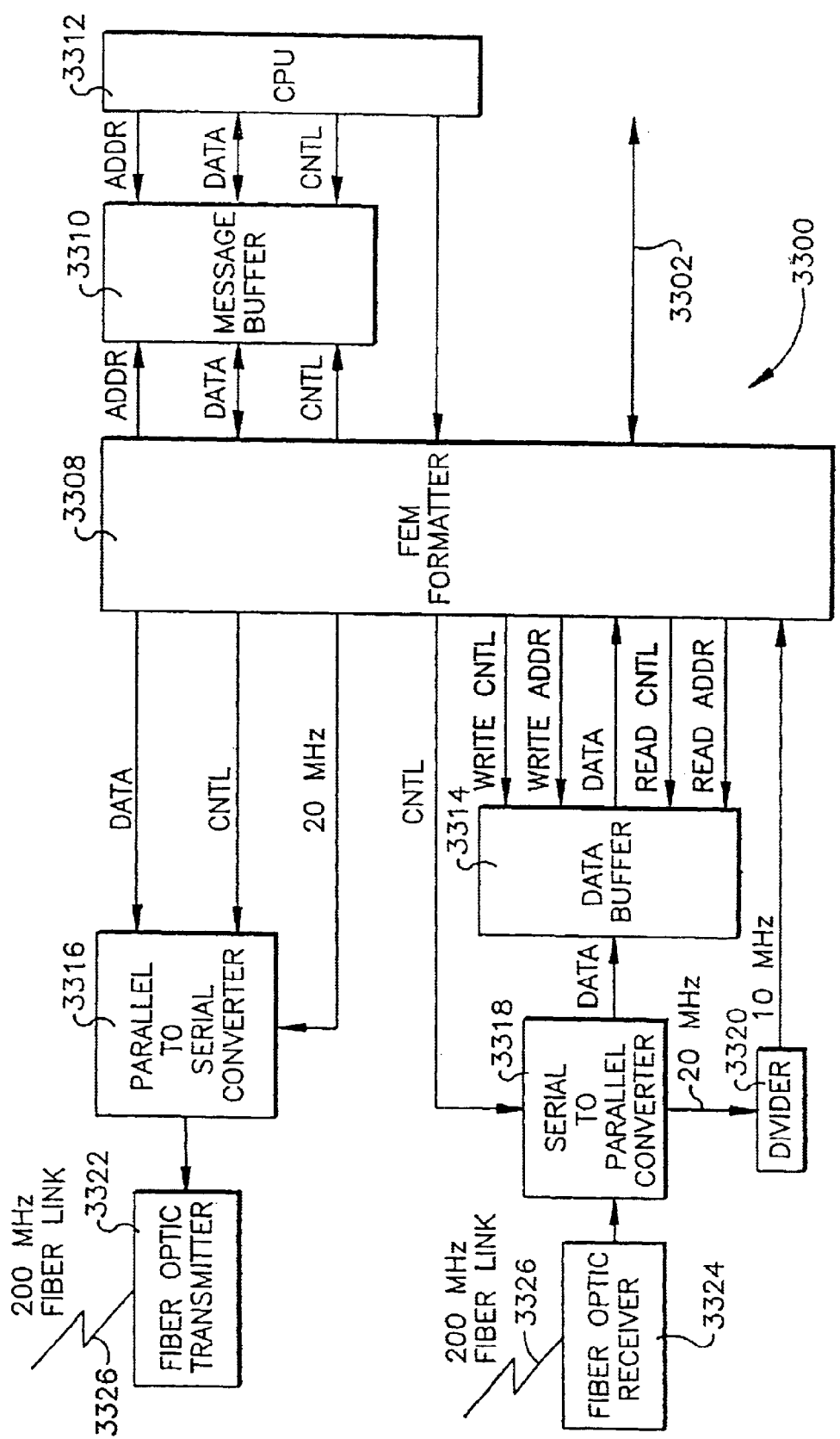
FIG. 33 is a functional block diagram of a fiber extender module used to connect the indoor unit of the multi-mode remote terminal of FIG. 9 and the extension indoor unit of FIG. 32 together via an extension fiber link.

Referring next to FIG. 33, a block diagram is shown for a fiber extender module that is to be plugged into one of the SSI ports at the indoor unit of the remote terminal or the extension indoor unit of FIG. 32. The fiber extender module 3300 block diagram includes: a multi-transport mode cell bus 3302, fiber extender module (FEM) formatter 3308, message buffer 3310, CPU 3312, data buffer 3314, parallel-to-serial converter 3316, serial-to-parallel converter 3318, divider 3320, fiber optic transmitter 3322, fiber optic receiver 3324, and the fiber link 3326.

The multi-transport mode cell bus 3302 includes a timing bus and comprises a backplane interface. The multi-transport mode cell bus 3302 is coupled to the FEM formatter 3308. The FEM formatter 3308 is coupled to the message buffer 3310 and the CPU 3312. The CPU 3312 is also coupled to the message buffer 3310. The FEM formatter 3308 is also coupled to the parallel-to-serial converter 3316, serial-to-parallel converter 3318, data buffer 3314, and divider 3320. The parallel-to-serial converter 3316 is coupled to the fiber optic transmitter 3322 which connects to the fiber link 3326. The fiber link 3326 also connects to the fiber optic receiver 3324 which couples to the serial-to-parallel converter 3318 which couples also to the data buffer, 3314 and the divider 3320.

In practice, the fiber extender module 3300 (FEM) at the indoor unit of the remote terminal, (hereinafter called the IDU FEM or "master" FEM), provides an interface to the fiber link 3326 that connects to the EIDU. It also buffers the incoming cells from the multi-transport cell bus 3302, buffers the data coming from the extension indoor unit (EIDU), and communicates with the CCM of the indoor unit of the remote terminal via the IM-Com overhead messages embedded in the bus frame format of the multi-transport mode cell bus 3302. The IDU FEM 3300 uses the first IM-Com slot shown in FIG. 15 for synchronization with the FEM 3300 at the EIDU and for identification of the EIDU.

The cells arrive at the IDU FEM 3300 from the multi-transport cell bus 3302 to the FEM formatter 3308. The FEM formatter 3308, which is custom designed logic, also recovers the timing from the multi-transport mode bus 3302. The FEM formatter 3308 inserts a unique word (which is used for synchronization with the FEM at the EIDU), frame and superframe identification code, and an EIDU identification byte in the first IM-Com timeslot. The IM-Com messages are sent to the message buffer (which is a dual port RAM) for the CPU 3312 to process. The CPU 3312, a RISC microcontroller, reads the messages out of the message buffer 3314 for configuration, alarms, etc. Finally, the FEM formatter 3308 retransmits the frame received from the multi-transport mode cell bus 3302 to a parallel-to-serial converter 3316. The parallel-to-serial converter 3316 is a high speed converter that transmits the data frame to the fiber optic transmitter 3322 at 200 MHz. The fiber optic transmitter 3322 transmits the signal through the fiber link 3326 to the EIDU FEM (fiber extender module at the extension indoor unit or "slave" FEM).

In the opposite direction, the fiber optic receiver 3324 receives the data flow back from EIDU via the fiber link 3326. The data is sent to the serial-to-parallel converter 3318 where the data flow is converted back to parallel format and then sent to the data buffer 3314, which is a dual port RAM. The data flow is slightly complex due to timing and buffering requirements. Thus, the FEM formatter 3308 recovers the unique word that the EIDU FEM assigned so that the FEM formatter 3308 knows where the beginning of the frame is. The design ensures that the unique word arrives at the FEM formatter 3308 before the cell bus TX frame synch signal (CB_TX_FS of FIG. 18, which describes the cell bus 3302). Thus, the data is written into the data buffer 3314 before it is read by the FEM formatter 3308. The FEM formatter 3308 then reads the data at the start of the frame from the data buffer 3314 and copies it onto the multi-transport mode cell bus 3302. Thus, the timing of the cell bus frame is advanced or retarded in order to compensate for the offset in the fiber link. The FEM formatter 3308 also recovers the timing from the EIDU.

The fiber extender module at the extension indoor unit 3300 (EIDU FEM), and sometimes referred to as the "slave" FEM, uses the same block diagram as shown in FIG. 33. As the frame containing the IM-Com messages and data is sent from the fiber optic transmitter of the IDU FEM and travels through the multi-mode fiber link, the signal enters the EIDU FEM 3300 at its corresponding fiber optic receiver 3324. The flow is the same as described above with the IDU FEM. Note again that the unique code word that was assigned to the frame is received into the FEM formatter 3308 so that it will know when the beginning of the frame is. Otherwise, timing problems occur since the FEM formatter will assume the frame starts when it receives the data, not when the frame actually starts. This unique code word alleviates the timing problem between the indoor unit and the EIDU. Furthermore, the CPU 3312 of the EIDU FEM 3300 communicates with the CCM of the indoor unit of the remote terminal using the IM-Com overhead messages and provides signals for the processors located in the SSI modules attached. Thus, the data on the bus frame format is retransmitted on the multi-transport mode cell bus 3302 at the EIDU and the extension SSI modules can interface with the point to multipoint system.

Also, note that the fiber extender modules do not actually distinguish between the types of traffic it is retransmitting or supporting. It is the SSI modules at the extension indoor unit that distinguish the mixed traffic and the fiber extender modules and multi-mode fiber link simply provides an extension of the multi-transport mode cell bus. Thus, the fiber extender modules and the multi-mode fiber links support signals using multiple transport types (e.g., TDM and ATM). However, it is a departure from the prior art to transmit multiple transport mode signals through an extension bus (fiber link) to an extension indoor unit.

The data flow from the SSI modules at the EIDU FEM 3300 is the reverse of the data flow to from the remote indoor unit to the extension indoor unit. The cells are received from the multi-transport mode cell bus 3302 at the FEM formatter 3308 which copies the IM-Com messages of the EIDU FEM from the message buffer 3310, inserts a unique word in front of the data frame so that the IDU FEM will know where the beginning of the frame is, and copies the cells to the parallel-to-serial converter 3316 for transmission through the fiber optic link 3326 to the IDU FEM. The IDU FEM formatter 3308 in turn copies the data frame to the multi-transport mode cell bus 3302 to be sent to the CCM of the indoor unit. Thus, the IDU FEM 3300, EIDU FEM 3300, and the fiber link 3326 act as a multi-transport mode cell bus extension. Note that all of the various signals are not described in detail since their operation is understood to those skilled in the art. Note that not all of the functional blocks and signals have been detailed. The skilled artist understands these functions and could easily implement them; thus, no further explanation is needed.

Figure 34:
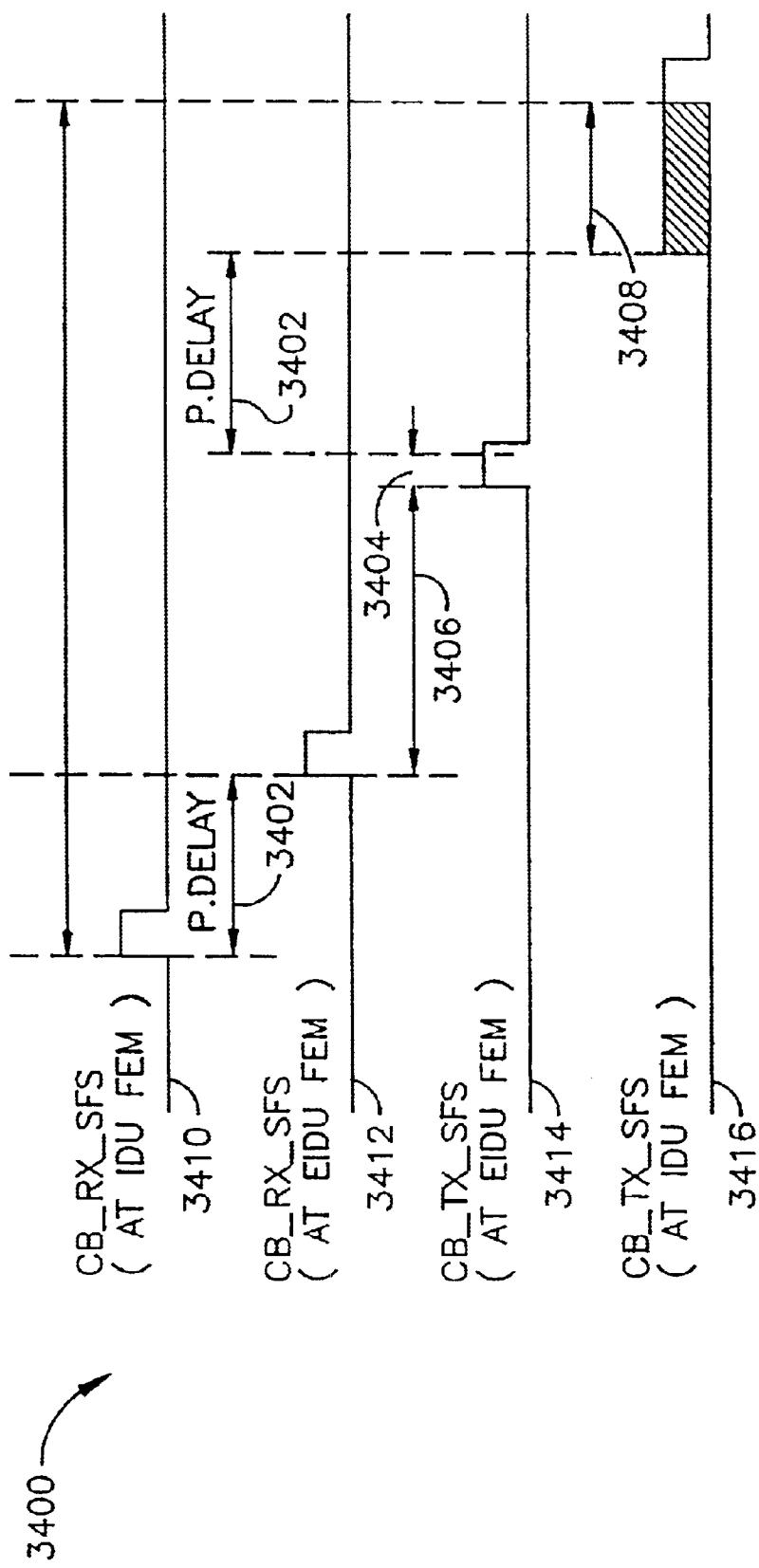
FIG. 34 is a timing diagram illustrating the delays involved in the transfer of data from the indoor unit of the multi-mode remote terminal of FIG. 9 to the extension indoor unit of FIG. 32.

Referring next to FIG. 34, a timing diagram 3400 is shown for the delays involved in the data transfer from indoor unit (IDU) of the remote terminal to the extension indoor unit (EIDU) shown in FIG. 32 using the fiber extender modules of FIG. 33. The significant delays are the propagation delay 3402, the guard time 3404, the transmit to receive offset 3406, and the frame synch offset 3408. Shown also are the various signals: cell bus receive superframe synch 3410 (CB_RX_SFS (at IDU FEM)) at the remote fiber extender module, the cell bus receive superframe synch 3412 (CB_RX_SFS(at EIDU FEM)) at the extension fiber extender module, the cell bus transmit superframe synch 3414 (CB_TX_SFS(at IDU FEM)) at the extension fiber extender module, and the cell bus transmit superframe synch 3416 (CB_TX_SFS(at EIDU FEM)).

The timing is very important in the design of the fiber extender modules of FIG. 33. The timing diagram 3400 illustrates the delays for transferring data from the indoor unit of the remote terminal to the extension indoor unit. The propagation delay 3402 is the delay from the IDU FEM to the EIDU FEM, and vice versa. This accounts for the delay in the parallel-to-serial converter, and fiber optical transmitter and receiver of the fiber extender module (FEM) as shown in FIG. 33. A guard time 3404 of typically a few microseconds is inserted by the EIDU FEM to ensure that the data arrives at the IDU FEM earlier than it is read. Then, the IDU FEM resynchronizes the data arriving from the EIDU to the timing of the indoor unit. The transmit to receive offset 3406 and the frame synch offset 3408 are well known in the art, and thus, no further explanation is needed.

Demand Assigned Multiple Access

Demand assigned multiple access (DAMA) is a method in which bandwidth is assigned as the demand for bandwidth changes within the system. Thus, DAMA provides efficient use of the available frequency spectrum. The point to multipoint system uses unique DAMA techniques to allocate bandwidth within the multi-modulation, multi-transport environment.

Figure 27:
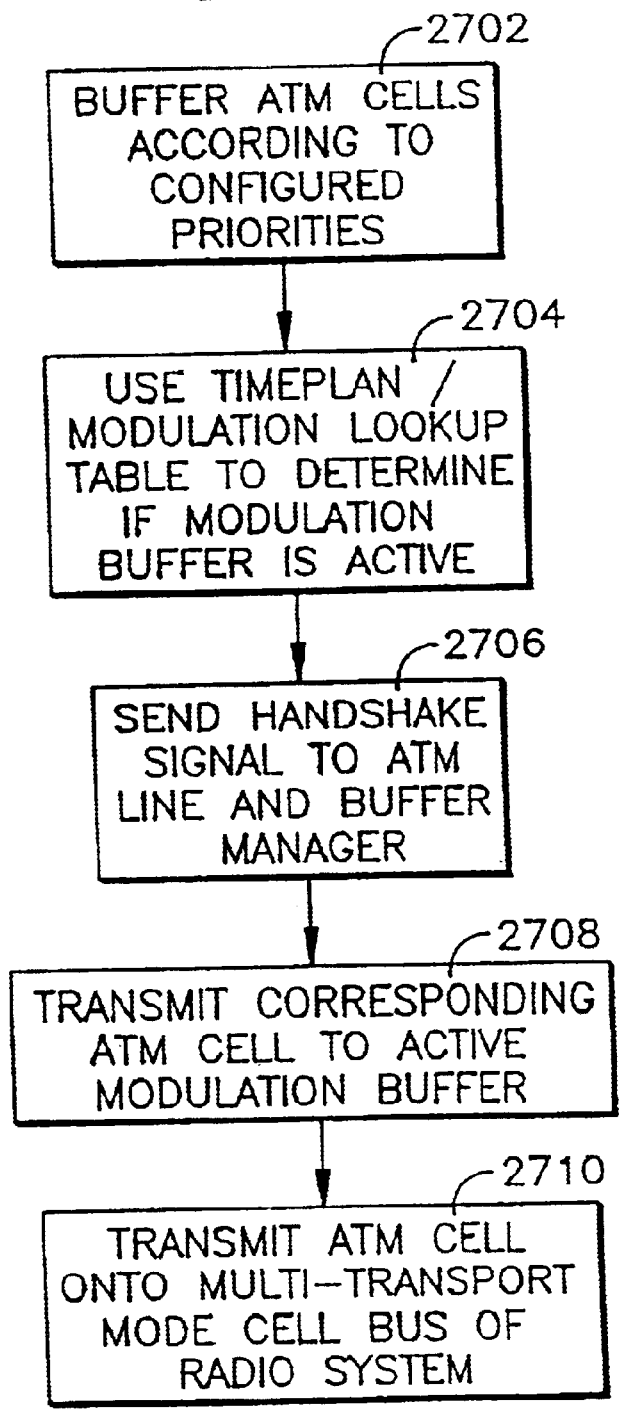
FIG. 27 is a flowchart illustrating the demand assigned multiple access technique as well as the ATM address filtering technique described in FIG. 26.

Referring next back to FIGS. 26 and 27, which show a block diagram and corresponding flowchart, respectively, illustrating an ATM address filtering technique performed by an ATM switch that has been configured for a multi-modulation environment. Additionally, FIGS. 26 and 27 also illustrate how bandwidth is assigned for ATM data traffic in the downlink direction (hub to remote) illustrating a DAMA technique.

Voice traffic is assigned conventionally. The point to multipoint system detects an active call (offhook) and automatically assigns bandwidth. The remote terminal requests bandwidth from the hub terminal using the assigned maintenance slot of overhead section of the air interface frame format as described in FIGS. 4 and 6. The hub terminal uses either TR-008 or GR-303 signaling to connect the call to the switch. At the end of the call, the bandwidth is deallocated. If the switch initiates the call, then the hub terminal assigns bandwidth and notifies the remote terminal.

Data bandwidth is dynamically assigned in both -directions (downlink and uplink). In the uplink, the remote terminals monitor their own buffer depths within the individual SSI modules described above. If the buffer depth exceeds a threshold for greater than the configured amount of time, then the remote terminal requests more bandwidth from the hub terminal. The hub terminal evaluates all requests and, depending on specified priorities, assigns bandwidth at differing levels to all remote terminals.

Advantageously, in one embodiment, the bandwidth for ATM data traffic in the downlink is assigned in a unique way as illustrated by FIG. 26 shown above. As earlier described, the ATM switch at the ATM-OC3c SSI module of the hub terminal is able to dynamically manage the flow of ATM traffic from the OC3c line to the point to multipoint system. The ATM switch is configured for DAMA purposes in the downlink direction (from hub to remote).

The Phys of the ATM switch have been configured to be n modulation buffers 2612. There is a different modulation buffer 2612 for each modulation type; such as QPSK for the first modulation buffer 2612, 16-QAM for the second modulation buffer 2612, and 64-QAM for the third modulation buffer 2612. The ALBM 2606 dynamically manages the ATM cells based on priorities using well known quality of service protocols as discussed in FIG. 26 (Step 2702 of FIG. 27). In this regard, ATM cells having a higher priority will be sent out with less delay than lower priority ATM cells. Additionally, the delay is determined depending on the virtual path identifier (VPI) and virtual channel identifier (VCI). Thus, advantageously, each VPI and VCI is also associated with a modulation type. Advantageously, each Phy address is associated with a modulation type.

This scheme produces three separate streams of ATM cells, one for each modulation type within the same communications link. Each modulation stream includes groups of timeslots where each group of timeslots is modulated differently. Each modulation type requires more or less bandwidth, depending on the number of remote terminals of each modulation type and their services; thus, by creating differently modulated streams of ATM data cells, the bandwidth for the ATM data cells is dynamically assigned within a modulation stream. The ATM formatter 2610 accesses the timeplan/modulation lookup table 2616 and determines which modulation buffers are active (Step 2704 of FIG. 27) then sends a handshake signal to the ALBM 2606 (Step 2706 of FIG. 27). The ALBM 2606 reads the handshake signal and transmits the ATM cell to the appropriate modulation buffer 2612 (Step 2708 of FIG. 27). Once the ATM cells are in the respective modulation buffer 2612, the ATM formatter 2616 accesses the timeplan for each timeslot of the multi-transport mode cell bus frame format and the corresponding air interface frame format and transmits the ATM cells onto the multi-transport mode cell bus (Step 2710 of FIG. 27). Thus, three differently modulated streams of ATM cells are produced. This technique uses the ATM chipset in such a way to replace a much more complex method of creating messaging from the hub terminal to the remote terminal or adding "tags" as known in the art to the ATM cells in order to dynamically assign bandwidth to ATM data traffic in the downlink.

Figure 35:
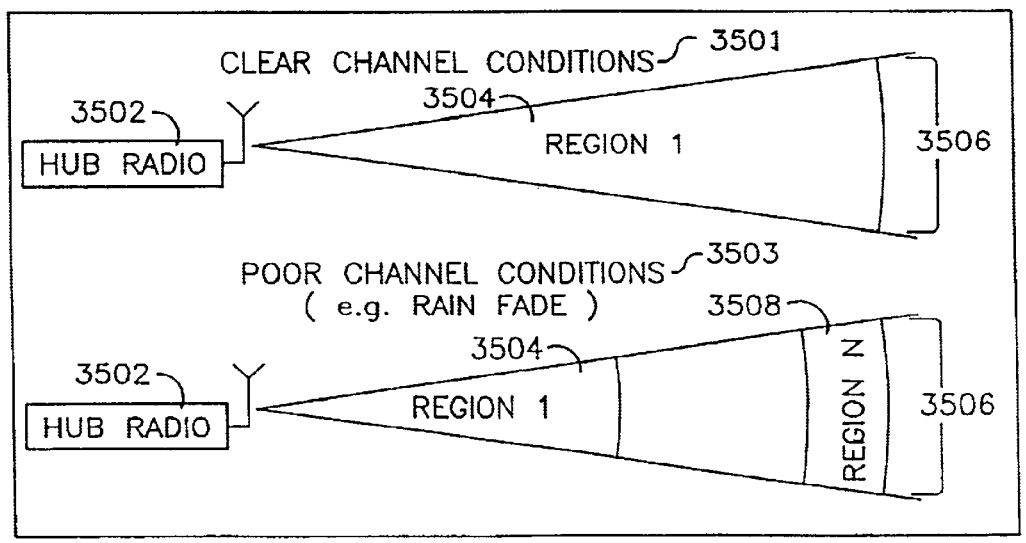
FIG. 35 is a diagram illustrating a demand assigned multiple access (DAMA) technique used in one embodiment of the point to multipoint system of FIG. 2 such that bandwidth is dynamically changed based upon channel condition.

Referring next to FIG. 35, a diagram is shown illustrating a demand assigned multiple access (DAMA) technique such that the bandwidth is dynamically changed based upon channel conditions. Corresponding steps from FIG. 36, which illustrates the steps performed in the DAMA technique based upon channel conditions as shown in FIG. 35, will be referred to while referring to FIG. 35. Shown are a hub terminal 3502 transmitting during clear channel conditions 3501 and poor channel conditions 3503. During clear channel conditions 3501, all of the remote terminals are in region 1 3504. During poor channel conditions 3503, the remote terminals are in region 1 3504 through region n 3508. Also shown is the sector 3506 that the hub terminal 3502 supports.

In practice, this DAMA technique is dynamically assigns bandwidth based upon channel conditions. For example, in normal operation of the point to multipoint system, remote terminals in region 1 3504 require a lower energy per bit to be within an acceptable bit error rate (e.g. $10^{-8}$) and; thus, a higher order modulation (more bits/second/Hz) can be used, such as 64-QAM. Remote terminals in the farthest region, region n 3508 (region 3 in this embodiment using QPSK modulation), require a higher energy per bit and thus a lower order modulation (fewer bits/second/Hz) is used, such as QPSK. The specific implementation and benefits of such a configuration is described throughout the specification.

Figure 36:
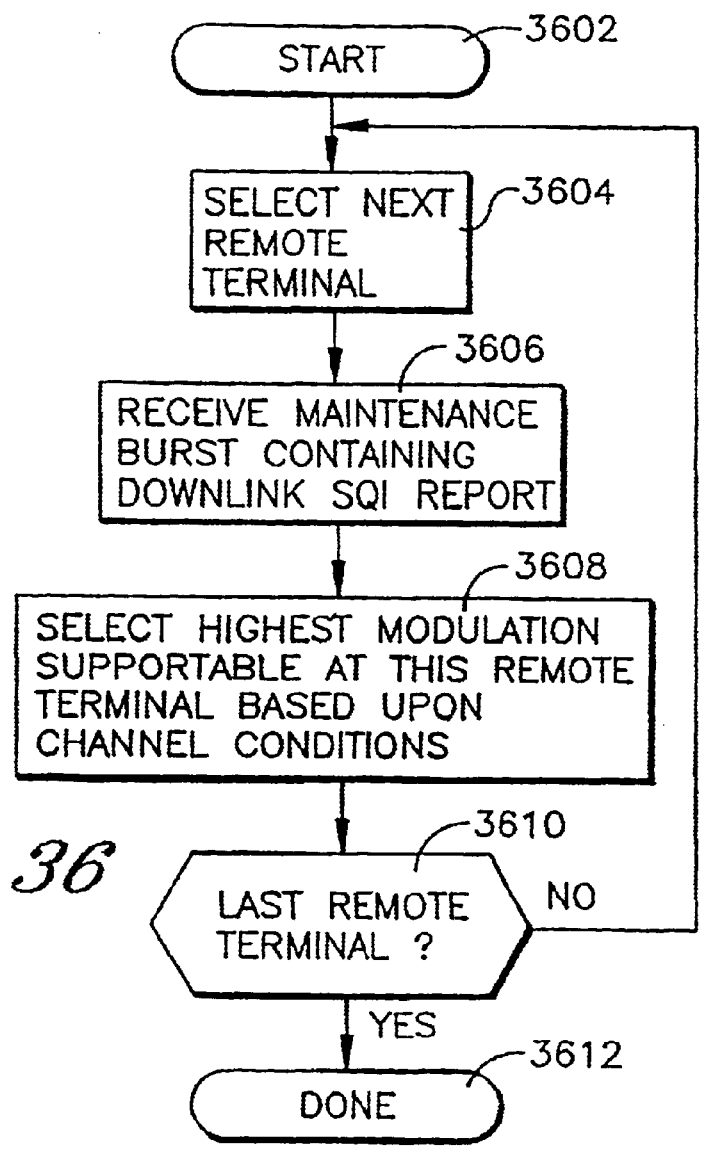
FIG. 36 is a flowchart illustrating the steps performed in the demand assigned multiple access technique shown in FIG. 25.

Thus, the hub terminal 3502 first selects the remote terminal that it will transmit traffic bursts to (Step 3604 of FIG. 36). Next, the channel conditions are monitored and a determination is made whether or not the channel conditions are poor, such as during a rain fade. Rain fade is the primary impairment to microwave radio links. The channel conditions may be measured as function of the received signal strength indication (RSSI) or the bit error rate (BER) of the signals received over the communications link. For example, when the RSSI drops below a threshold specific to each different modulation mode supported by the hub terminal 3502 or the BER exceeds a threshold, the channel conditions will be considered poor. For example, the threshold BER may be $10^{-8}$. The hub terminal 3502 receives a maintenance burst from the respective remote terminal which contains the signal quality indicator (SQI) (Step 3606 of FIG. 36) that contains the RSSI, for example.

The hub terminal 3502 then selects the highest order modulation supportable for the respective remote terminal based upon the channel conditions (Step 3608 of FIG. 36). During poor channel conditions 3503, such as during a rain fade, the traffic is modulated and transmitted over the air interface using the configured different modulations per region, i.e. regions 1 3504 through region n 3508.

However, during clear channel conditions 3501, all of the remote terminals will be considered to be in the region 1 3504. Therefore, traffic can be transmitted using the highest order modulation (Step 3608 of FIG. 36) which requires the least number of bits/second/Hz and uses the least bandwidth to transmit, i.e. 64-QAM in this embodiment. Note that the channel conditions will be clear during a high percentage of the time allowing for the bandwidth to be dynamically assigned to a higher order modulation for a majority of the time; thus, saving bandwidth. Thus the bandwidth is dynamically managed during periods of clear channel conditions, and only switched back to the configured bandwidth allocations during poor channel conditions.

The hub terminal 3502 then checks to see if there are any more remote terminals to communicate with (step 3610 of FIG. 36). If so, then steps 3604 through steps 3610 are repeated. If not, then the hub terminal 3502 is done (Step 3612 of FIG. 36).

Although the bandwidth is dynamically managed based upon channel conditions, this DAMA technique is ideally used for low quality traffic services, such as Internet browsing data, which is at an unspecified bit rate (UBR), although the technique can be done to other higher quality traffic services, such as voice. In this case, for voice and other high quality services, the remote terminals are always located within their respective regions, i.e. region 1 3504 through region n 3508. Thus, an initial step is included to determine whether or not the traffic being transmitted is a low quality service at an unspecified bit rate (UBR). If the services are high quality services, e.g. at a specified bit rate, then the traffic is modulated as normal using different modulations for remote terminals located within different regions, i.e. regions 1 2704 through region n 2708. Thus, the bandwidth for high quality services is not changed based on channel conditions. And if the traffic being transmitted is a low quality service, then the steps in FIG. 36 are performed to dynamically assign bandwidth.

Also note that FIG. 27 illustrates how different regions 2704 and 2708 are located with a sector 2706. The sector represents the sector ("pie slice") described above. Also note that FIG. 5 describes another DAMA technique in which the remote terminals receive signals independently of a time plan.

1:N Redundancy

Referring next to FIG. 37, a block diagram is shown for a 1:N redundancy system 3700. Shown are hub terminal A 3702, hub terminal B 3704, backup hub terminal 3706, remote terminals 3710 ($1_A$–$n_A$), remote terminals 3712 ($1_B$–$n_B$), subchannel A 3714, subchannel B 3716, DS3A line 3718, DS3B line 3720, backup DS3 line 3722, multiplexer 3724, and a backhaul line 3726.

Hub terminal A 3702 communicates with the remote terminals 3710 via subchannel A 3714, hub terminal B 3704 communicates with the remote terminals 3712 via subchannel B 3716, and a backup hub terminal 3706 communicates with the remote terminals 3716 via subchannel B 3716 when hub terminal B 3704 fails. Hub terminal A 3702, hub terminal B 3704, and the backup hub terminal 3706 are coupled to the multiplexer 3724 via a DS3A line 3718, DS3B line 3720, and a backup DS3 line 3726, respectively. The multiplexer 3724 has a backhaul line for connection to the transport network (not shown).

In practice, the 1:N redundancy system 3700 is designed to replace a 1:1 redundancy system used at the hub site of the point to multipoint system as described above (see FIG. 13).

Such a system may or may not use hub and remote terminals with multi-transport mode and/or multi-modulation capabilities and is, thus, described generically. In a 1:1 system, each communications terminal, or hub terminal, has a backup hub terminal that replaces that particular hub terminal in the event of a failure. Thus, for a system having 10 hub terminals, 10 backup hub terminals are needed, adding to the cost of the system. A 1:1 redundancy system is described with reference to FIG. 13.

In a point to multipoint system, due to splitting of multiple channels and location of remote terminals, several hub terminals may broadcast to remote terminals within the same antenna sector. The 1:N redundancy system is designed to work where multiple hub terminals are operating within the same sector and have the same antenna coverage. Thus, hub terminal A 3702, hub terminal B 3704, and the backup hub terminal 3706 all are within the same sector and their respective antennas are pointed in the same direction. Hub terminal A 3702 may be using subchannel A 3714 of "50 MHz channel A" while hub terminal B 3704 may be using subchannel B 3716 of "50 MHz channel B". The backup hub terminal 3706 can backup either hub terminal A 3702 or hub terminal B 3704. And therefore, fewer hub terminals are needed at the hub site, reducing the overall cost of the point to multipoint system. The backup hub terminal 3706 must also have the same SSI module configuration or backhaul connections as hub terminal A 3702 and hub terminal B 3702.

In a typical scenario, both hub terminal A 3702 and hub terminal B 3704 are operating as normal carrying user traffic back and forth between remote terminals 3710 and remote terminals 3712, while the backup hub terminal 3706 is in backup mode. If hub terminal B 3704 experiences a failure, such as the outdoor unit failure, the failure is detected as described below in FIG. 38 and the element management system (EMS) is notified. A red alarm is generated on the DS3B line 3720. The backup hub terminal 3706 switches in for hub terminal B 3704 and starts transmitting on subchannel B 3716 to remote terminals 3712. The multiplexer 3724 detects the red alarm and executes a switchover for all connections from the DS3B line 3720 to backup DS3 line 3722 based on prefiguration of the backup DS3 line 3722 as a backup to DS3B line. The EMS then notifies the network operations center via a simple network management protocol (SNMP) message. The remote terminals 3712 perceive a short interruption in subchannel B's 3716 transmission and resynchronize. The subscribers at the remote terminals 3712 experience a temporary degradation in service. The switchover outage time is kept as a statistic. If hub terminal A 3702 has failed, the backup hub terminal 3706 replaces it in the same manner broadcasting over subchannel A 3714.

In order to ensure that the backup hub terminal 3706 will work when a failure occurs, the backup hub terminal 3706 must be regularly tested. If a backup hub terminal 3706 sits idly for an extended period of time, it is likely that the backup hub terminal 3706 will have already failed when called to perform. One testing technique known is called "load sharing" in which the hub terminal B 3704 transmits half of the load and the backup hub terminal 3706 transits the other half of the load. If one hub terminal fails, then the other hub terminal takes over. This requires an extra frequency for the backup hub terminal 3706 or the backup hub terminal 3706 shares the same frequency as hub terminal B 3704 in the TDMA frame. If sharing the same frequency, the two terminals would have to be switched in and out at certain bits which is difficult to accomplish at the symbol rate (e.g. 10 MHz) used by the point to multipoint system.

Another backup testing technique is to switch to the backup hub terminal 3706 once a day (at midnight). Disadvantageously, this causes an extra outage once per day.

In this embodiment of the present invention, the backup hub terminal 3706 simply transmits a test burst once per superframe (every 48 msec) over subchannel A 3714 then transmits a test burst once per superframe over subchannel B 3716. The test burst is transmitted during the first timeslot (timeslot m−2) of the last three timeslots (timeslots m−2 through m) of the overhead section of the last frame of the superframe that form the acquisition slot 806, as shown in FIG. 8. Since the test burst is sent during the first burst, if the timing is slightly off, the test burst will not collide with the other bursts sent by the hub terminal B 3704 or hub terminal A 3702. Furthermore, the on-line hub terminals (hub terminal A 3702 and hub terminal B 3704) are not transmitting during these three timeslots. The test burst is sent in QPSK modulation such that all remote terminals 3710 and 3712 can receive it (even if in the farthest region). Each remote terminal receives the test burst and records whether or not the test burst was received and if so, its signal strength and how far off the timing was from the first burst location. These statistics are reported back to the on-line hub terminals. The values reported back are stored and compared over time to see if the backup hub terminal 3706 has failed. If nothing is received or if the power levels drop significantly, the backup hub terminal has failed. These values are also received at the backup hub terminal 3706 and used as in FIG. 38.

Referring next to FIG. 38, a flowchart is shown for the steps undertaken in order for a backup hub terminal shown in FIG. 37 to detect an on-line hub terminal failure and to test a backup hub terminal. The following steps are performed. The first step is to initialize the backup hub terminal by acquiring redundancy information and the receive and transmit timing (block 3802). Next, the backup hub terminal tunes to the frequency of the subchannel (block 3804) and transmits to the remote terminals of the subchannel (block 3806). Next, the remote terminals report the power level for both the backup hub terminal and the on-line hub terminals (block 3808) and transmit the information in their respective maintenance timeslots (block 3810) to the backup hub terminal. The backup hub terminal receives the information (block 3812) and, finally, does failure detection (block 3814).

An initial step to be performed is to initialize the backup hub terminal (block 3802) such that it can provide a 1:N redundancy to the on-line hub terminals (hub terminal A 3702 and hub terminal B 3704 of FIG. 37). This requires collecting the redundancy information and determining the receive and transmit timing acquisition. Specifically, the backup hub terminal is initialized by communicating with the element management system (EMS) described in FIG. 2 to obtain the redundancy information, such as LAN addresses, frequencies, overhead channel allocations, and power settings for the other hub terminals in the redundancy group.

Next, as part of the initialization (block 3802) the backup hub terminal goes into receive timing acquisition mode. The purpose of this mode is to determine the superframe timing of the uplink to which it is tuned. The backup hub terminal listens to the signals being transmitted from the remote terminals to the hub terminals to synchronize the backup hub terminals timing and frame format with that of the rest of the point to multipoint system. The backup hub terminal waits until its local oscillator has locked to the selected input source, then selects one of the subchannels in the redundancy group and tunes to the uplink (remote to hub). Then, the backup hub terminal sets it antenna to open aperture and looks for the QPSK superframe sync word (which is sent once per superframe by the remote terminals). The superframe sync word is detected and verified. Next, the contents of the burst are demodulated and the timeslot number for the particular remote terminal is determined from the format information in the header. The backup hub terminal then computes a frame and timeslot offset to the first burst of the superframe and moves its superframe timing to the same location as received. If, however, the backup hub terminal has not detected and verified the superframe sync word within a specified amount of time, e.g. 8 superframes, the backup hub terminal will declare itself in failure mode.

Still initializing, the backup hub terminal then enters transmit timing acquisition mode to determine the appropriate transmit to receive offset. The backup hub terminal starts with a value of 3.0 msec (based upon a 6 msec air interface frame format) for the transmit to receive offset and transmits an overhead burst in timeslot m−2 of the overhead section of the last frame of the superframe (see FIG. 8). The remote terminals are programmed to look for the burst in an aperture of last three timeslots (i.e. timeslots m−2, m−1, and m) of the last air frame overhead section. If the burst is not detected, the remote terminals do nothing. If the burst is detected, the remote terminals maintain separate timing offset and power parameters and send a message containing the information back to the backup hub terminal (and hub terminal). The backup hub terminal uses this information to adjust its timing and power accordingly. If the return burst is not detected within the specified period of time, e.g. 8 superframes, the backup hub terminal declares itself in failure mode. Note that the timing adjustment is particular to a hub terminal on the current subchannel; thus, the backup hub terminal must repeat the receive and transmit timing acquisition for each hub terminal of the redundancy group.

As a final part of initialization, the backup hub terminal enters tracking mode in order to test the timing and detect a failure. The backup hub terminal sequentially tunes to each of the subchannels and recalls the stored transmit and receive offsets, and verifies the correct superframe timing has been achieved by reading the message headers from the remote terminals (block 3804). If the superframe timing is not accurate, the backup hub terminal must start over at block 3802.

The backup hub terminal then transmits a test burst to the remote terminals (block 3806) in the first timeslot of the last three timeslots (timeslots m−2, m−1, and m) of the last frame of the superframe's overhead section that make up the acquisition slot 806 (see also FIGS. 8 and 37) as discussed above. The test burst is the same test burst sent and described above in FIG. 37. Thus, the same test burst is used to test the backup hub terminal and to detect an on-line hub terminal failure. The on-line hub terminals are not transmitting during these three bursts. The remote terminals in the sector know to look for the burst and measure its signal strength (block 3808) and timing. The timing and power offset information is gathered. The remote terminal then sends the power measurements, e.g. measured RSSI, back to the backup hub terminal and the hub terminal in its maintenance slot of the overhead section (block 3810). The backup hub terminal listens to the maintenance slot and receives the information recorded at the remote terminal (block 3812). Note that the backup hub terminal knows which timeslot to listen to from the process in block 3802. If testing the backup hub terminal, the on-line hub terminals receive the information (block 3812).

The backup terminal then does the failure detection (block 3814). To detect a failure, the backup hub terminal compares to the power level received for itself and the other on-line hub terminals from the remote terminals in the subchannel to the power level of the hub terminals on that subchannel in the redundancy group. If the power level of itself (the backup hub terminal) is more than a specified amount greater (typically 2 to 3 dBs) than the power level of one of the other hub terminals, the backup terminal determines that the other hub terminal has failed and switches in for the failed hub terminal. The backup hub terminal can immediately switch in since it contains all of the transmit and receive information as well as the burst time plan for all of the on-line hub terminals of the redundancy group. Only a short interruption of service is noticed by the remote terminals.

The comparison between the power levels of the backup hub terminal and the other hub terminals is needed to detect a power amplifier failure since the radio frequency channel is subject to fading which may resemble a power amplifier failure. Thus, the power levels are compared, since, in a fade, the power level of both the main hub terminals and the backup hub terminals will be reduced.

This failure detection process also must account for the behavior of the remote terminals during rain fades or hub terminal amplifier failures. If an on-line hub terminal suffers from a power reduction, the automatic gain control (AGC) of the remote terminal will compensate. Similarly, the AGC will compensate for power loss during rain fades. Thus, the information sent back to the backup hub terminal includes this information in the power measurement, RSSI, for both the on-line hub terminals and the backup hub terminals. Step 3814 monitors the strength of the test burst from the backup hub terminal when testing the backup hub terminal as described in FIG. 37.

Thus, the 1:N redundancy system provides a backup hub terminal that can provide backup to more than one hub terminal at the hub site. This is a departure from prior art point-to-multipoint systems that having one backup hub terminal for each on-line hub terminal (1:1 redundancy). Therefore, the 1:N redundancy system reduces the number of hub terminals at the hub site over traditional point-to-multipoint communications systems. Additionally, the 1:N redundancy system provides a unique method of testing the backup hub terminal without the drawbacks of "load sharing" or forcing outages periodically as discussed in FIG. 37. The method of FIG. 38 advantageously uses the unique air interface frame format to provide a failure detection method which tests the strength of the on-line hub terminals and the backup hub terminal once every superframe.

TDM Buffering

TDM buffering is done in the TDM cell formatters of the individual TDM-based service specific interface modules in order to uniquely pack TDM data (both pulse code modulated data and channel associated signaling) into the TDM cells in such a way to minimize delay depending upon the assignment of the TDM cells to the multi-transport mode cellbus timeslots.

Referring back to FIG. 29, the block diagram is shown for a TDM cell formatted by the TDM cell formatter (or signal formatter) of the SSI modules. The traffic section 2904 (data section) contains the TDM data or pulse code modulated (PCM) data. The header section 2902 of the TDM cell 2900 contains the ATM header or virtual path identifier 2906. This is a departure from a conventional TDM cell that contains no header information, since the TDM cell is switched according to which timeslot it is in. Furthermore, the header section of the TDM cell includes an ATM specific header.

Furthermore, the TDM buffering techniques use the header section containing other headers 2908 for signaling bits, such as channel associated signaling (CAS) bits. Conventionally, signaling (also referred to as signaling bits) is carried in separate TDM cells and switched by timeslot. Thus, the TDM cell 2900 of this embodiment, advantageously uses the other header section 2908 to carry the signaling within the same TDM cell 2900 as the PCM data (also referred to as PCM samples).

In practice, the SSI modules are designed to interface with T1 lines (DS1) or E1 lines known in the art. Since different T1 and E1 lines use different framing modes, such as extended superframe (ESF), the channel associated signaling (CAS) information may be 2 bits or 4 bits and may be updated every 1.5, 2.0, or 3.0 seconds. Thus, since the T1/E1 lines operate at different framing modes and that since the point to multipoint system can switch any DS0 at the hub terminal to the any DS0 at the remote terminal, the signaling (such as CAS) is carried out of band (i.e. not in the traffic section 2904). The signaling is extracted at the entry point (by the T1/E1 framers) and then transported using the other headers 2908 of the header section 2202 shown in FIG. 29, as opposed to using a separate TDM cell to carry the signaling. Note that T1 and E1 lines (also referred to as digital signal level 1 or DS1s) are commonly known in the art of telecommunications. Additionally, DS0s (or digital signal level zero) are well known in the art of telecommunications; thus, no further explanation is required.

Referring briefly back to FIG. 25A, the multi-transport mode SSI module 2500 is shown. The multi-transport mode SSI module 2500, as well as the other SSI modules that are configured to operate in TDM, or synchronous mode, perform TDM buffering as discussed below. The multi-transport SSI module of FIG. 25A will be described as an example of the TDM buffering, so that the operation does not need to be explained in each TDM-based SSI module. Thus, FIG. 25A will be occasionally referred to in order to illustrate how the TDM buffering fits within a TDM-based SSI module.

As mentioned above, the PCM buffer controller 2516 receives the PCM data and the signaling (CAS) from the timing multiplexer 2552. The timing multiplexer 2552 receives the PCM data and signaling (CAS) from DS0s of the T1/E1 lines through the T1/E1 framers 2554. The PCM buffer controller 2516 converts the PCM data and signaling to parallel format and stores them in transmit buffer 2514. In the other direction, the PCM buffer controller 2516 pulls the PCM data and signaling from the receive buffer 2512. The receive buffer 2512 and the transmit buffer 2514 have a unique memory structure that is discussed with reference to FIG. 39 below.

Referring next to FIG. 39, a memory structure is shown for buffering pulse code modulated (PCM) data and signaling, such as channel associated signaling (CAS), for use within the TDM-based SSI modules in one embodiment of the present invention. The memory structure 3900 includes a receive data buffer 3902, transmit data buffer 3904, receive signaling buffer 3906, and transmit signaling buffer 3906. The receive data buffer 3902 and the transmit data buffer 3904 each have line data buffers 3910. Each line data buffer 3910 is used for a corresponding T1 line and contains DS0 data buffers 3912. Each DS0 data buffer 3912 contains PCM data bytes 3914 associated with a particular DS0 of each corresponding T1 line. Both the receive signaling buffer 3906 and the transmit signaling buffer 3908 contain line signaling buffers 3916. Each line signaling buffer 3916 is used for a corresponding T1 line and contains DS0 signaling buffers 3918. And each DS0 signaling buffer 3918 contains DS0 signaling bytes 3920 (CAS) associated with a particular DS0 of each corresponding T1 line. Each DS0 signaling byte 3920 contains signaling.

The memory structure 3900 is implemented as a RAM, and forms both the transmit buffer 2514 and the receive buffer 2512 of FIG. 25A in a single memory structure 3900. Advantageously, the memory structure 3900 is scalable allowing for a TDM-based SSI module to interface with a varying number of T1 lines. For example, the Quad DS1 SSI module (FIG. 20) and the multi-transport mode SSI module (FIGS. 25A and 25B) allow for four and 8 T1 lines (DS1s), respectively, while the TDM-DS3 SSI module (FIG. 16) allows for 28 T1 lines (DS1s). Thus, the receive data buffer 3902, the transmit data buffer 3904, receive signaling buffer 3906, and the transmit signaling buffer 3908 have variable lengths depending on the implementation.

Each line data buffer 3910 supports one T1/E1 line and contains 2048 PCM data bytes 3914 for the PCM data to be packed in the 48 byte data section 2904 (also referred to as the traffic section) of the TDM cell 2900 in FIG. 29. Each signaling line buffer 3916 contains 256 bytes for the signaling that is to be packed within the other headers 2908 of the TDM cell of FIG. 29. Since two line data buffers 3910 and line signaling buffers 3916 are needed for each T1 line (i.e. one for transmit and one for receive), each T1 line requires 4098 Bytes (4K) of PCM data buffering and 512 bytes of signaling buffering memory.

Each line data buffer 3910 is a 2048 (2k) byte buffer containing DS0 data buffers 3912 for however many DS0s are interfaced with the SSI module. 32 DS0 data lines are shown for the TDM-DS3 SSI module (28 T1 lines+4 for on-line testing, or 32 E1 lines). Each DS0 data buffer 3912 contains PCM data bytes 3914 from the particular DS0s. Advantageously, the DS0 data buffer 3912 is a 64 byte circular buffer. This allows the PCM data contained within the PCM data bytes 3014 to be mapped into the 48 byte data section 2904 of the TDM cell with minimal memory requirements. As discussed above, this embodiment formats TDM data into a cell structure that is the same size as an asynchronous transfer mode (ATM) cell. Thus, the PCM data is designed to fit within a 48 byte data section 2904.

The line signaling buffers 3916 each contain DS0 signaling buffers 3918. Each DS0 signaling buffer 3918 contains signaling bytes 3920 (containing the CAS data) for the particular DS0s. The DS0 signaling buffers 3918 are also circular buffers, but are 8 bytes in length.

Furthermore, the PCM samples are stored in each DS0 data buffer 3912 (circular buffer) every 125 μsec while the signaling is stored in 8 byte DS0 signaling buffers 3918 (circular buffers) every 1.0 msec. The 64 byte DS0 data buffers 3912 and the 8 byte DS0 signaling buffers 3918 correspond to an 8 msec time interval; however, the multi-transport bus frame format (FIG. 15) and the air interface frame format (FIG. 5) are based on a 6 msec frame in this embodiment, for example.

During the first frame, PCM data is written to the first 48 PCM data bytes 3914 of the 64 byte DS0 data buffer 3912. Then during the second frame, PCM data is written to the last 16 PCM data bytes 3914 and then wraps around (in a circular fashion) and continues writing to the first 32 PCM data bytes 3914 of the DS0 data buffer 3912, and so on. Thus, the DS0 data buffers 3912 are continually updated with new PCM data.

Similarly for signaling buffering, during the first frame, the signaling bits are written to the first 6 signaling bytes 3920 of the DS0 signaling buffer 3916. During the second frame, the last 2 signaling bytes 3920 are written, then the first 4 signaling bytes of the DS0 signaling buffer 3916 are written in a circular fashion. Thus, the PCM buffering and the signaling buffering used at the memory structure 3900 are implemented as a circular read from the DS0 data buffer 3912 in the "egress" (multi-transport mode cell bus to SSI module) and a circular write to the DS0 data buffer 3912 in the "ingress" (SSI module to multi-transport mode cell bus).

Figure 40:
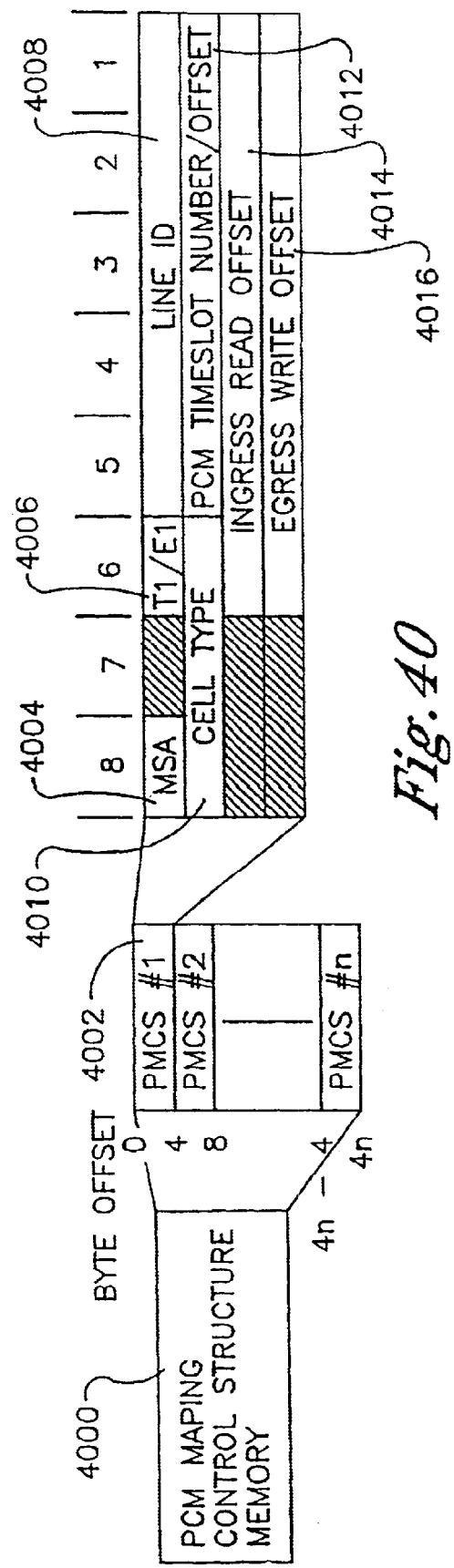
FIG. 40 is a pulse-code-modulated mapping control structure memory to be used with memory structure of FIG. 39 for TDM buffering in the TDM-based service specific interface modules used in one embodiment of the present invention.

Referring next to FIG. 40, a pulse-code-modulated mapping control structure memory is shown for use in the TDM-based service specific interface modules used in one embodiment of the present invention. The pulse-code-modulated mapping control structure memory 4000 (hereinafter referred to as the PCM mapping control structure memory 4000) contains pulse-code-modulated mapping control structures 4002 (hereinafter referred to as PCM mapping control structures 4002). Each PCM mapping control structure 4002 contains a mapping structure active 4004 (also referred to as MPA 4004), T1/E1 bit 4006, line ID 4008, cell type 4010, PCM timeslot number/offset 4012, ingress read offset 4014, and egress write offset 4016.

In practice, the PCM mapping control structure memory 4000 is coupled to the TDM cell formatters of the TDM-based SSI modules and manipulated by the control processor (CPU) of the TDM-based SSI modules. The PCM mapping control structure memory 4000 controls the format of the individual TDM cells that the TDM cell formatter creates. The PCM mapping control structure memory 4000 contains the PCM mapping control structures 4002 so that the TDM cells will be formatted in such a manner that the DS0s carried will be transported with minimal delay and without complex hardware manipulation.

The PCM mapping control structure memory 4000 contains a variable number of PCM mapping control structures 4002. The number of PCM mapping control structures 4002 depends on the number of T1/E1 lines (DS1s) that the SSI module interfaces with. Thus, the TDM-DS3 SSI module (FIG. 21) will require 32*32=1024 PCMS mapping control structures 4002 (32 T1/E1 lines is 28 lines used for transport and 4 used for testing), while a quad DS1 SSI module (FIG. 20) will require 32*4=128 PCM mapping control structures 4002.

Each PCM mapping control structure 4002 is 4 bytes and contains an MPA 4004. The MPA 4004 is a 1 bit field that indicates whether or not the PCM mapping control structure 4002 is active or not. A "0" bit indicates that the PCM mapping control structure 4002 is not active and the TDM cell formatter will ignore it. A "1" bit indicates that the PCM mapping control structure 4002 is active; thus, the PCM mapping control structure 4002 will be used by the TDM cell formatter when the formatting and packing the TDM data cells for transmission on the multi-transport mode cell bus.

The PCM mapping control structure 4002 also contains a T1/E1 bit 4006 which indicates to the TDM cell formatter whether the line interfaced with is a T1 line or an E1 line ("0" is T1 and "1" is E1). The line ID 4008 is 5 bits and identifies the T1/E1 line for the particular timeslot of the multi-transport mode cell bus. Since a timeslot of the multi-transport mode cell bus is tied to a given T1/E1 line, DS0s from other T1/E1 lines can not be multiplexed on to same cell bus timeslot.

The cell type 4010 indicates the specific cell type that is to be used according to the particular PCM mapping control structure 4002. Thus, the cell type 4010 defines how many DS0s will be multiplexed into the data section of the TDM cell. The cell type 4010 a three bit field. The TDM cells defined by the cell type 4010 will be placed within the data cell 1704 of the CB-data cell 1700 and placed on the multi-transport mode cell bus (see FIGS. 15 and 17). The specific cell types as discussed with reference to FIGS. 41 through 43 below.

The PCM timeslot number/offset 4012 is a five bit field that identifies either the PCM timeslot number for single DS0 mode or the first PCM timeslot number for the modes that multiplex multiple DS0s in a single TDM data cell. For E1 lines, all 0–31 (timeslots 0 to 31) values of the 5 bit field are valid, while for T1 lines, only 0–23 (timeslots 1 to 24) values of the 5 bit field are valid. Thus, the TDM cell formatter knows where to look within the memory structure 4000 to read or write the PCM data to and from the specific data cell type.

The ingress read offset 4014 is a six bit field that specifies the read offset for composing the ingress data fields to be placed on the multi-transport mode cell bus. This is due to the fact, as described above, that the DS0 data buffers 3912 of the memory structure in FIG. 39 are 64 bytes and the data section of the TDM cells is 48 bytes. Thus, the memory pointers need to know which PCM data byte 3914 to point to within the DS0 data buffers 3912 of the memory structure 3902 of FIG. 39. The six bit field corresponds to one of the 64 PCM data bytes 3914. Similarly, the egress write offset 4016 is a six bit field that specifies the write offset for composing the PCM data bytes 3914 within the DS0 data buffers 3912 of the memory structure 3902. Thus, the memory pointers are told which PCM data bytes 3914 of the DS0 data buffers 3912 to write the PCM data to. TDM cells in a sequence are assigned differing ingress read offsets 4014 and egress write offsets 4016 based upon assignments to the multi-transport mode cell bus, which in turn are based upon air interface burst assignments.

Signaling, such as CAS, is read/written at the DS0 signaling bytes 3920 at the same time as corresponding PCM data is read/written from the DS0 data bytes 3914.

Referring next to FIG. 41 a cell format is shown for a TDM cell used in TDM buffering in the TDM-based service specific interface modules to pack the pulse-code-modulated (PCM) data and signaling from a single DS0 (digital signal level zero) into the TDM cell in accordance with the embodiments shown in FIGS. 39 and 40. The TDM-based SSI modules are shown in FIGS. 20, 21, 25A, and 25B. The TDM cell 4100 includes a header section 4102 (also referred to as an overhead) and data section 4104 (which is the same as data section 2904 of FIG. 29). The header section 4102 contains an even virtual path identifier 4106 (hereinafter referred to as the even VPI) and an odd virtual path identifier 4108 (hereinafter referred to as the odd VPI) and a spare section 4110. Together, the even VPI 4106 and the odd VPI 4108 comprise the ATM VPI 2906 as shown in FIG. 29 which is used in ATM address filtering as described above. The header section 4102 also contains signaling sets 4105, which are 4 bits of signaling (CAS) from one DS0.

In practice, the TDM cell 4100 is one of the cell types defined by the cell type 4010 of the PCM mapping control structures 4002 of FIG. 40. In the ingress, the TDM cell formatter packs 48 bytes of PCM data from the DS0 data byte 3914 of a particular DS0 into the data section 4104 and 3 bytes of signaling from the DS0 signaling byte 3920 of the particular DS0 into the signaling sets 4105 of the TDM cell 4100. Alternatively, in the egress, the TDM cell formatter unpacks the PCM data and signaling from the TDM cell 4100 and writes it to the correct DS0 data byte 3014 and DS0 signaling byte 3920 for the respective DS0. Once formatted, the TDM data cells 4100 are copied onto the multi-transport mode cell bus (see FIGS. 15–17) within a CB-Data traffic cell (see FIG. 17).

Note the signaling and the PCM data are both uniquely packed into the TDM cell 4100, whereas a prior art TDM cell uses separate TDM packets for the signaling and the PCM data. Furthermore, the TDM cell 4100 includes a unique header section 4102, whereas a prior art TDM packet does not include a header section since it is routed according to which timeslot it is in, not according to header information. Additionally, the TDM cell 4100 uniquely includes an ATM header, the odd VPI 4108 and the even VPI 4106, i.e. the VPI, used in the ATM filtering techniques described above in the specification.

As an example, based on a 6 msec air frame, the TDM cell 4100 provides a buffering delay of 6 msec (i.e. the length of the 6 msec bus frame format) in packing 48 bytes of PCM data from one DS0 into the TDM cell 4100. The header section 4102 includes 6 signaling data sets 4105 or 3 bytes of signaling (containing CAS from the DS0 signaling buffer 3918 of the memory structure of FIG. 39) corresponding to the 48 bytes of PCM samples (taken from the DS0 data buffer 3912 of the memory structure of FIG. 39). The TDM cell 4100 can only be used for structured DS0s. Structured DS0s and unstructured DS0s are well known in the art of digital telecommunications, and thus, no further explanation is required.

Referring next to FIG. 42, a cell format is shown for a TDM cell used in the TDM buffering in the TDM-based service specific interface modules to pack pulse-code-modulated (PCM) data and signaling from multiple DS0s into a single TDM cell in accordance with the embodiments shown in FIGS. 39 and 40. The TDM cell 4200 includes a header section 4202 containing an even VPI 4206, and odd VPI 4208, DS0 #1 signaling set 4216, DS0 #2 signaling set 4218, DS0 signaling sets 4222, and DS0 #n signaling set 4220. The TDM cell 4200 also contains a data section 4204 containing DS0 #1 data section 4210, DS0 #2 data section 4212, and a DS0 #n data section 4214.

In practice, the TDM cell 4200 is generically shown as a TDM cell that is capable of carrying PCM data and signaling from multiple DS0s in the same data section 4204. This is a departure from prior art TDM cells or packets that pack PCM data from one DS0 into a single TDM cell or packet. As stated above, this also departs from a prior art TDM cell in that PCM data and signaling are packed into the same TDM cell 4200. The TDM cell 4200 has the same general design as shown in FIG. 41 except that the TDM cell 4100 in FIG. 41 carries PCM data and signaling from only one DS0. Also, the TDM cell 4200 represents several different TDM cell types defined by the cell type 4010 of the PCM mapping control structure 4002 shown in FIG. 40. Thus, the TDM cell formatter uses the PCM mapping control structure to determine which TDM cell type to format for each timeslot on the multi-transport mode cell bus.

The TDM-based SSI modules, advantageously, are configured to format TDM data cells into one of the available formats shown in FIGS. 41, 42, and 43. This minimizes the delay for certain types of traffic carried within certain DS0s. It is especially important to create several different cell types since the TDM data cell generally is confined to such a small size (i.e. 53 bytes) in this embodiment. A prior art TDM-based point to multipoint system does not have these delay concerns since the TDM cells or packets are designed much larger than 53 bytes, typically between 150 to 400 bytes.

The TDM cell 4200 can carry PCM data from more than one DS0 in the data section 4204. The PCM data is packed into DS0 #1 data section 4210 through DS0 #n data section 4214 for DS0 #1 through DS0 #n. For example, if only data from two DS0s were packed into the TDM cell 4200, there would only be two sections, DS0 #1 data section 4210 containing 24 bytes of PCM data from DS0 #1 and DS0 #2 data section 4212 containing 24 bytes from DS0 #2. The corresponding header section 4202 would contain more than one signaling set for each DS0. For example, there would be three DS0 #1 signaling sets 4216 and three DS0 #2 signaling sets 4218. A spare section would comprise the extra byte in the header section 4202. The spare section would be used if needed to fill the header section 4202 in order to maintain the 5 byte header section 4202 in the TDM cell 4200.

Again, using the example of a 6 msec frame format, the cell formatter takes a 3.0 msec time interval to pack the PCM data and signaling from two DS0s into the TDM cell 4200. Thus, the buffering delay is reduced from 6.0 msec in FIG. 41 to 3.0 msec in this example. Note that since the only 3 msec of PCM data is carried within the TDM cell 4200 in this example, two TDM cells 4200 are sent during the same 6 msec frame. This allows the same amount of PCM data to travel within the same 6 msec frame, while, advantageously, reducing the buffering delay from each TDM cell 4200. As should be obvious to the skilled artist, the more DS0s that are packed into the TDM cell the lower the buffering delay in packing and unpacking the TDM cell 4200. This is advantageous in order to minimize delay for certain traffic.

Another example of a cell type shown in FIG. 42 is a TDM cell 4200 that packs both PCM data and signaling from 8 DS0s into the TDM cell 4200. In this case, there are eight DS0 data sections within the data section 4204: DS0 #1 data section 4210, through DS0 #8 data section 4214. Each data section (e.g. DS0 #1 data section 4210) contains 6 bytes of PCM data (also referred to as PCM samples). This provides for only a 0.75 msec buffering delay to pack/unpack the PCM data and signaling to and from the TDM cell 4200. In this example, the corresponding header section 4202 would contain the even VPI 4206, odd VPI 4208, and eight signaling sets, one for each DS0, i.e. DS0 #1 signaling set 4216, DS0 #2 signaling set 4218, DS0 #3–7 signaling sets 4222, and DS0 #8 signaling set 4214. There is no spare section in this example since the signaling sets completely fill the available spaces in the header section 4202. Furthermore, in this example, since only 0.75 msec of PCM data is sent in TDM cell 4200, 8 TDM cells 4200 are assigned during the 6.0 msec frame to carry the PCM data from the 8 DS0s.

Thus, with a slightly different configuration of the data section 4204 and the header section 4202, the TDM cell 4200 may be configured to carry PCM data and signaling from more than one DS0. This, advantageously, reduces the buffering delay in order to minimize delay for certain traffic types. The two examples given (i.e. 2 DS0s and 8 DS0s) are only illustrative of the concept; thus, the skilled artist could implement the TDM cell 4200 to pack other numbers of DS0s for different buffering delays. Additionally, the DS0s that are packed in the TDM cell 4200 can be both structured and unstructured.

Referring next to FIG. 43, a cell format is shown for a TDM cell used in the TDM buffering in the TDM-based service specific interface modules to pack multiple DS0s with embedded framing in accordance with the embodiments shown in FIGS. 39 and 40. The TDM cell 4300 has a data section 4304 that is 50 bytes in length and supports up to 25 DS0s 4312, wherein each DS0 4312 has 2 samples (2 frames) of PCM data (a 0.25 msec time interval). The TDM cell 4300 provides a very low delay service for 24 DS0s 4312. The $25^{th}$ DS0 4314 contains G.802 embedded framing (line emulation). The buffering delay for TDM cell 4300 is reduced to 0.25 msec. Since the $25^{th}$ DS0 4314 is embedded framing, the header section 4302 does not need to contain any signaling. Thus, the header section 4302 is only three bytes containing the even VPI 4306, odd VPI 4308, and spare section 4310.

Thus, advantageously, different TDM cell types, as shown by TDM cells 4100, 4200, and 4300, may be created by the TDM cell formatters of the TDM-based SSI modules. This enables the TDM data from one or more DS0s and the corresponding signaling to be multiplexed in a variety of ways on to the multi-transport mode cell bus. Again, this departs from known prior art that only multiplexes a single DS0 into one TDM cell.

Referring next to FIGS. 44A and 44B, flowcharts are shown illustrating the TDM buffering as described in FIGS. 39 through 43, done at the TDM-based SSI modules of the point to multipoint system. FIG. 44A illustrates the steps carried out for traffic entering the TDM-based SSI module, either at the hub terminal or the remote terminal, through the transport lines (T1/E1 or DS3, for example) and being multiplexed onto the multi-transport mode cell bus. FIG. 44B illustrates the steps carried out for traffic received at the TDM-based SSI modules from the multi-transport mode cell bus and being switched to the either the subscribers or the backhaul depending on whether or not the TDM-based SSI module is at the remote terminal or the hub terminal.

For traffic flow from the T1 lines to the multi-transport mode cell bus of the point to multipoint system through the TDM-based SSI modules, the TDM-based SSI modules perform the following steps. The first step is to convert the DS0s, having already had the framing removed, that are received from the T1 lines from serial to parallel format so that the PCM data and signaling data (such as channel associated signaling) can be recovered (Step 4402 of FIG. 44A). This step is performed by the PCM interfaces that are described in FIGS. 20, 21, 25A, and 25B, e.g. PCM buffer controller 2516. Thus, the signaling data is separated from the PCM data of the received DS0s. Next, the PCM data (PCM samples) and signaling are buffered using a memory structure (Step 4404 of FIG. 44A). Such a memory structure is described with reference to FIG. 39 and may be implemented on each of the TDM-based SSI modules.

Next, in preparation for formatting the PCM data and signaling for the multi-transport mode cell bus, the TDM cell formatter obtains the correct PCM mapping control structure for each timeslot of the multi-transport mode cell bus (Step 4406 of FIG. 44A). The PCM mapping control structures are contained within the PCM mapping control structure memory, described in FIG. 40, and typically contained within the message buffer coupled to the TDM cell formatter, e.g. the message buffer 2508 shown in FIG. 25A. Then, the TDM cell formatter uses the PCM mapping control structure to determine the specific cell type of TDM cell that will be formatted for each timeslot of the multi-transport mode cell bus (Step 4408 of FIG. 44A). The specific cell types are shown in FIGS. 41 through 43.

Next, the TDM cell is formatted by packing the PCM data and signaling into the specific cell type (Step 4410 of FIG.

44A). The PCM mapping control structure further provides the TDM cell formatter with the proper offsets into the memory structure of FIG. 39 so that the TDM cell formatter can place the proper PCM data and signaling into the proper locations of the TDM cell. Furthermore, for ATM address filtering, the TDM cell formatter inserts an ATM header, the VPI, into the proper location within the header section (Step 4412 of FIG. 44A). Note that, advantageously, both PCM data and signaling are packed within the same TDM cell, as well as, PCM data and signaling from multiple DS0s. Again, this is a departure from the prior art TDM buffering techniques. Finally, the TDM cell, having been formatted, is multiplexed onto the multi-transport mode cell bus (within the data section 1704 of the traffic cell 1700) using the timeplan contained within the message buffer (Step 4414 of FIG. 44A).

For traffic flow from the multi-transport mode cell bus of the point to multipoint system to the T1 lines of the subscriber or backhaul through the TDM-based SSI modules, the following steps are performed for the TDM buffering. The cells, both ATM and TDM cells, arrive at the multi-transport mode cell bus. First, the TDM cell formatter uses the timeplan to extract the proper cells, only TDM cells destined for the particular TDM-based SSI module (Step 4416 of FIG. 44B). Then, the TDM cell formatter accesses the PCM mapping control structure for each TDM cell extracted to determine which cell type the TDM cell corresponds to (Step 4418 of FIG. 44B).

Once the cell type is determined, the TDM cell formatter unpacks the PCM data and the signaling from the received TDM cell and buffers them into the memory structure as described in FIG. 39 (Step 4420 of FIG. 44B). Note that the PCM mapping control structure provides the proper offsets into the memory structure so that the TDM cell formatter will know which data bytes 3914 or signaling bytes 3920 within the memory structure to write the PCM data and signaling for each DS0 into. Next, at the proper time, the PCM interface (e.g. PCM buffer controller 2516) extracts the PCM data and signaling from the memory structure and converts them back to serial DS0 form (Step 4424 of FIG. 44B). Finally, the DS0s are framed for transmission and transmitted through the proper DS0 of the proper T1 line (Step 4426 of FIG. 44B).

While the invention herein disclosed has been described by means of specific embodiments and applications thereof, numerous modifications and variations could be made thereto by those skilled in the art without departing from the scope of the invention set forth in the claims.

What is claimed is:

1. An extension system for expanding the number of interface modules that interface with a communications system comprising:

a communications terminal including a first multi-transport mode bus, wherein the first multi-transport mode bus carries signals comprising a plurality of transport mode signals;

a plurality of interface ports coupled to the first multi-transport mode bus;

a first extension interface module coupled to one of the plurality of interface ports, wherein the first extension interface module converts the transmission format of the signals to a transmission format of an extension communications link;

the extension communications link coupled to the first extension interface module, wherein the extension communications link functions as an extension of the first multi-transport mode bus;

a second extension interface module coupled to the extension communications link;

an extension unit coupled to the second extension interface module containing a second multi-transport mode bus, wherein the second multi-transport mode bus carries the signals; and a plurality of expansion interface ports coupled to the second multi-transport mode bus of the extension unit.

2. The extension system of claim 1 wherein said signals comprise said synchronous signals and asynchronous signals.

3. The extension system of claim 1 wherein said signals comprise said time division multiplexed signals and asynchronous transfer mode signals.

4. The extension system of claim 1 wherein said first multi-transport mode bus is a first multi-transport mode time division multiplexed bus.

5. The extension system of claim 4 wherein said second multi-transport mode bus is a second multi-transport mode time division multiplexed cell bus.

6. The extension system of claim 1 wherein said extension communications link is a fiber optic link.

7. The extension system of claim 6 wherein said fiber optic link comprises a multi-mode fiber link.

8. The extension system of claim 1 wherein said extension communications link is greater than 10 feet in length.

9. A method of extending a bus of a communications system through an extension link comprising:

receiving signals from the bus, wherein the signals comprise a plurality of transport mode signals contained within cells on a bus frame format, and said receiving comprises receiving said signals from a multi-transport mode bus;

buffering the signals;

detecting a beginning of said bus frame format;

inserting a frame identification code into said bus frame format, wherein the frame identification code identifies the beginning of said bus frame format;

converting the signals from said bus frame format to an extension link transmission format of said extension link;

receiving said signals from said extension link;

converting said signals from said extension link transmission format back to said bus frame format; transmitting said signals on a second bus, transmitting the signals having been converted through the extension link, wherein the extension link functions as an extension of the bus, wherein said transmitting said signals on said second bus comprises transmitting said signals on a second multi-transport mode bus.

* * * * *